(12) United States Patent
Kim et al.

(10) Patent No.: US 11,996,705 B2
(45) Date of Patent: May 28, 2024

(54) WIRELESS POWER TRANSMITTER

(71) Applicant: LG ELECTRONICS INC., Seoul (KR)

(72) Inventors: Kyunghwan Kim, Seoul (KR); Jihyun Lee, Seoul (KR); Bongsik Kwak, Seoul (KR); Yongcheol Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 55 days.

(21) Appl. No.: 17/664,400

(22) Filed: May 20, 2022

(65) Prior Publication Data

US 2022/0285991 A1 Sep. 8, 2022

Related U.S. Application Data

(63) Continuation-in-part of application No. 17/256,624, filed as application No. PCT/KR2018/007358 on Jun. 28, 2018, now Pat. No. 11,355,281.

(51) Int. Cl.
| | |
|---|---|
| *H02J 50/12* | (2016.01) |
| *H01F 5/00* | (2006.01) |
| *H01F 38/14* | (2006.01) |
| *H02J 50/40* | (2016.01) |

(52) U.S. Cl.
CPC ............. *H02J 50/12* (2016.02); *H01F 5/00* (2013.01); *H01F 38/14* (2013.01); *H02J 50/40* (2016.02)

(58) Field of Classification Search
CPC .. H02J 50/12; H02J 50/40; H01F 5/00; H01F 38/14
USPC ......................................................... 307/104
See application file for complete search history.

(56) References Cited

U.S. PATENT DOCUMENTS

| | | | |
|---|---|---|---|
| 2013/0307468 A1 | 11/2013 | Lee et al. | |
| 2015/0115723 A1 | 4/2015 | Levo | |
| 2016/0126750 A1* | 5/2016 | Yasuda | B60L 53/12 307/104 |
| 2016/0325632 A1* | 11/2016 | Ichikawa | B60L 53/65 |
| 2017/0155286 A1 | 6/2017 | Kato | |
| 2017/0214275 A1* | 7/2017 | Katanoda | H02J 50/80 |
| 2018/0137971 A1 | 5/2018 | Jang | |

(Continued)

FOREIGN PATENT DOCUMENTS

| | | |
|---|---|---|
| KR | 101450115 | 10/2014 |
| KR | 1020160057278 | 5/2016 |

(Continued)

OTHER PUBLICATIONS

United States Patent and Trademark Office U.S. Appl. No. 17/256,624, Office Action dated Sep. 2, 2021, 19 pages.

(Continued)

*Primary Examiner* — Alfonso Perez Borroto
(74) *Attorney, Agent, or Firm* — LEE, HONG, DEGERMAN, KANG & WAIMEY

(57) ABSTRACT

A wireless power transmitter according to one embodiment of the present disclosure comprises a primary coil forming magnetic coupling with a secondary coil provided in a wireless power receiver and transmitting wireless power to the wireless power receiver, wherein the primary coil is formed by spirally winding a plurality of subcoils connected electrically in parallel while keeping the subcoils in contact with each other, and the subcoil is litz wire consisting of several conducting wires packed in a bundle.

15 Claims, 45 Drawing Sheets

(56) References Cited

U.S. PATENT DOCUMENTS

| | | |
|---|---|---|
| 2018/0138746 A1 | 5/2018 | Jang |
| 2018/0219400 A1* | 8/2018 | Jin .......................... H01F 38/14 |
| 2018/0219427 A1* | 8/2018 | Baek ....................... H01Q 7/00 |
| 2018/0248255 A1* | 8/2018 | Noh ........................ H02J 50/70 |
| 2018/0272884 A1* | 9/2018 | Kojima ................ B60L 53/665 |
| 2021/0265108 A1 | 8/2021 | Kim et al. |

FOREIGN PATENT DOCUMENTS

| | | |
|---|---|---|
| KR | 101865540 | 6/2018 |
| WO | 2018057346 | 3/2018 |

OTHER PUBLICATIONS

United States Patent and Trademark Office U.S. Appl. No. 17/256,624, Notice of Allowance dated Jan. 21, 2022, 10 pages.
PCT International Application No. PCT/KR2018/007358, International Search Report dated Mar. 26, 2019, 4 pages.

\* cited by examiner

FIG. 8

| Preamble | ZERO | Response | Type | Info | Parity |

Response
'00' : no comms
'01' : comms error
'10' : NAK
'11' : ACK

Type
ZERO : slot sync
ONE : frame sync

Parity : odd

Info (Type is ZERO)
'00' : allocated
'01' : locked
'10' : free
'11' : reserved

Info (Type is ONE)
'00' : slotted
'01' : frees format
'10' : reserved
'11' : reserved

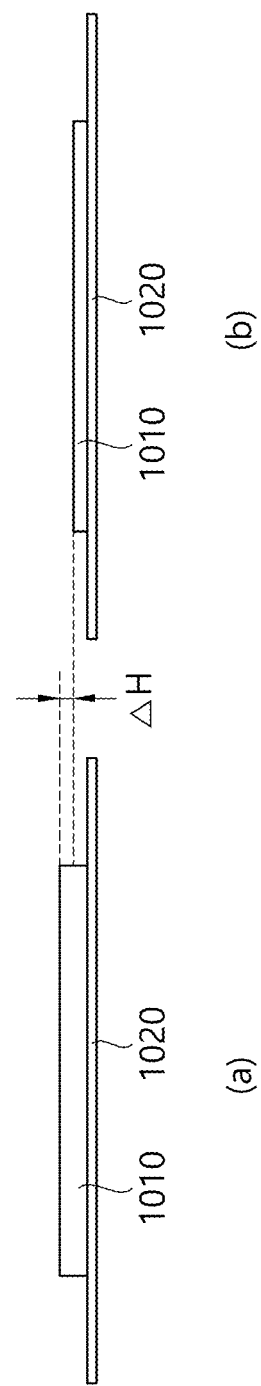

(Internal plane view of
wireless power transmitter used in experiment)

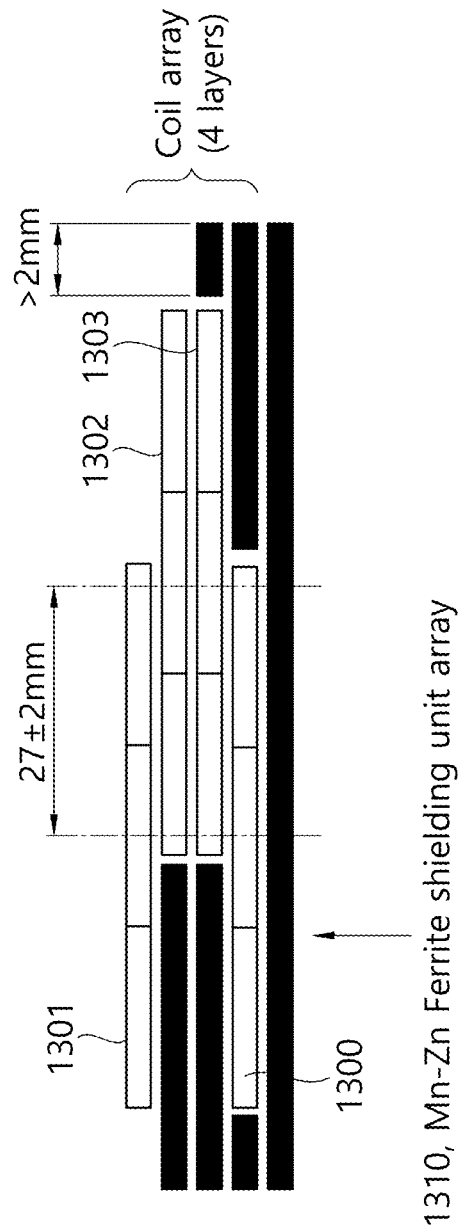

(c) Physical parameters of coil

FIG. 17
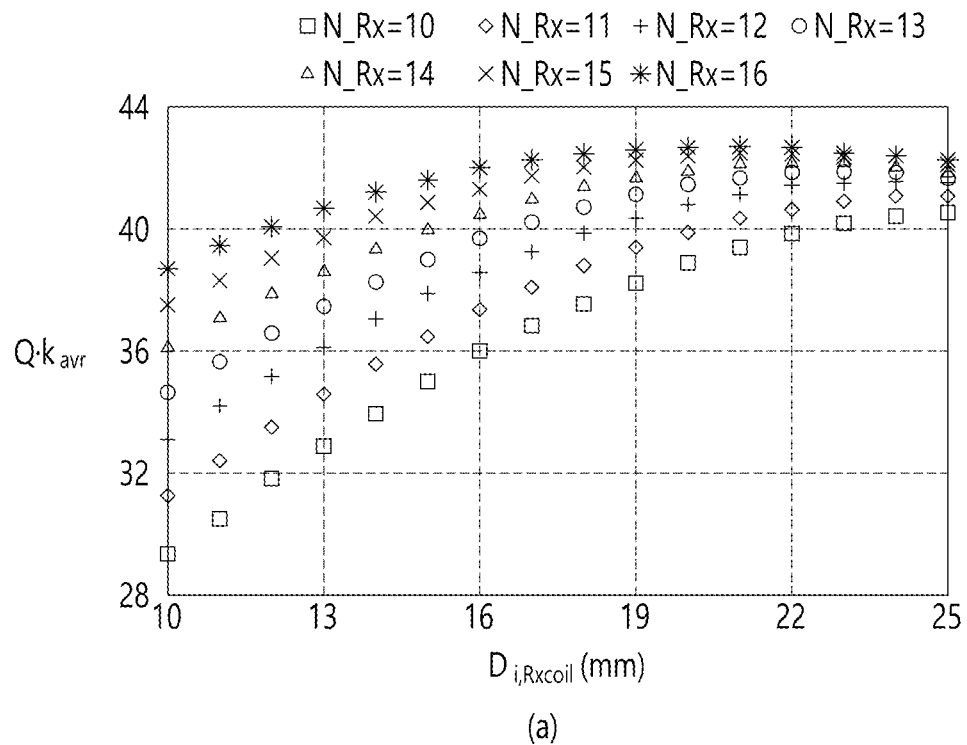
(a)
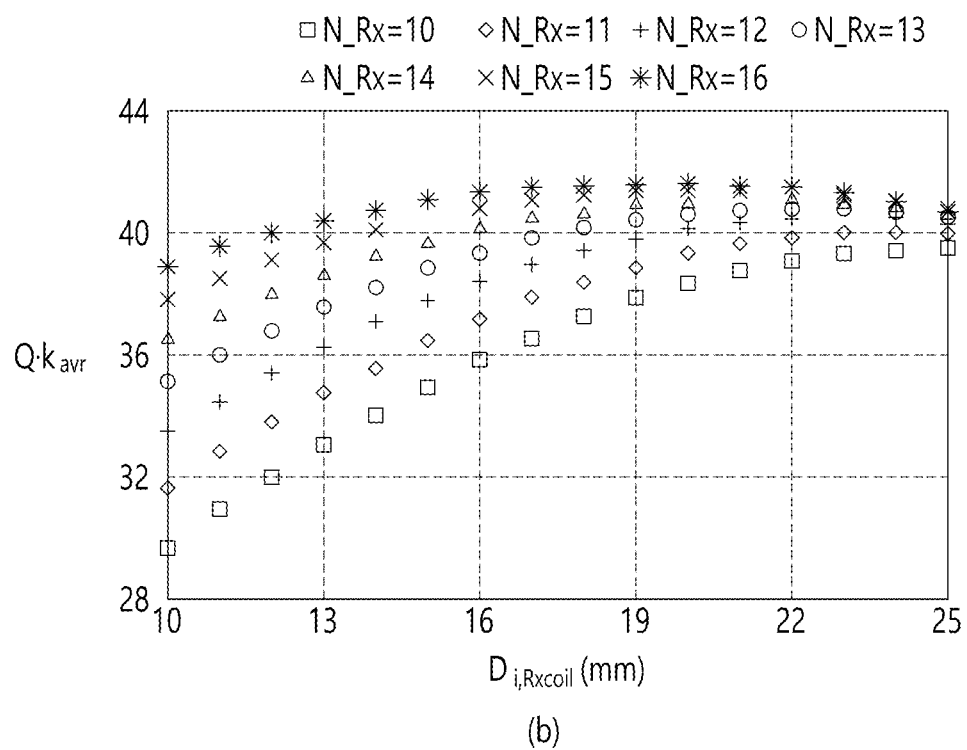
(b)

FIG. 18
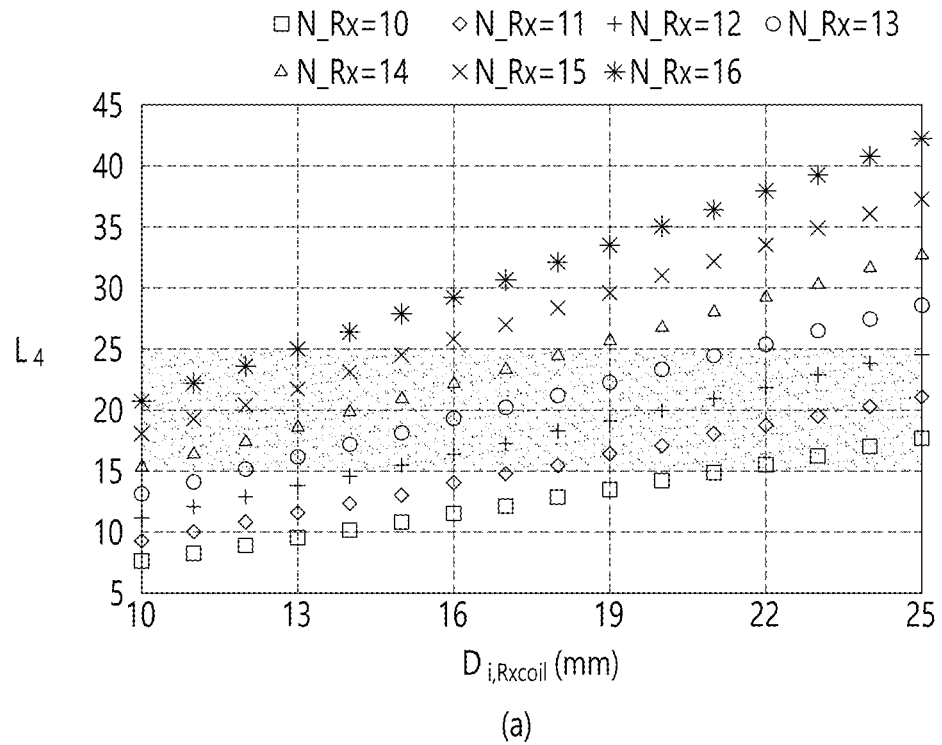
(a)
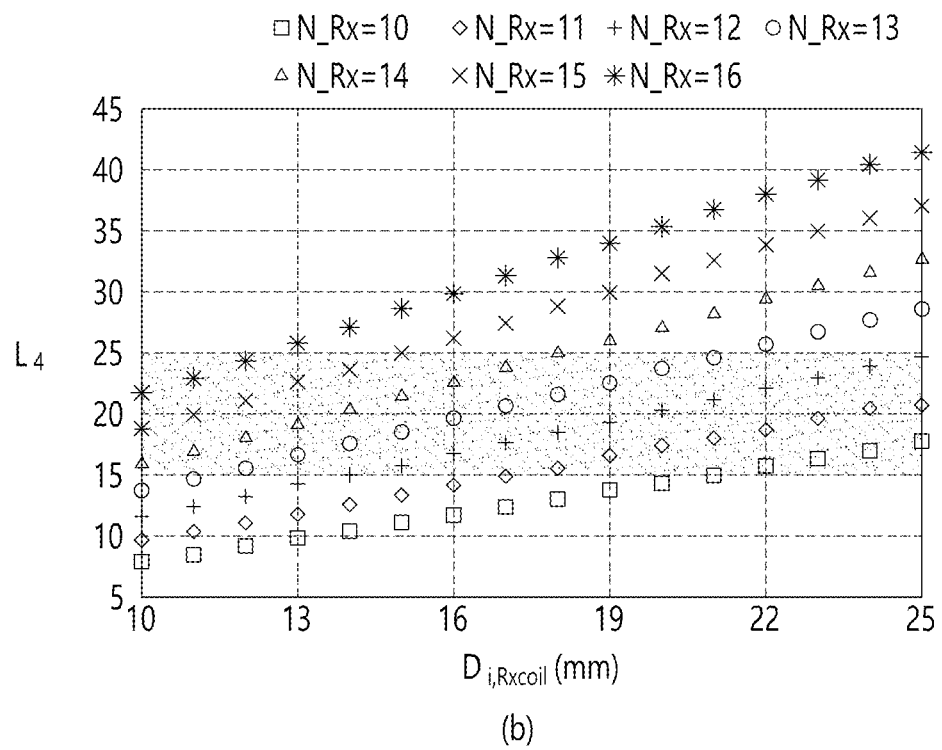
(b)

FIG. 19
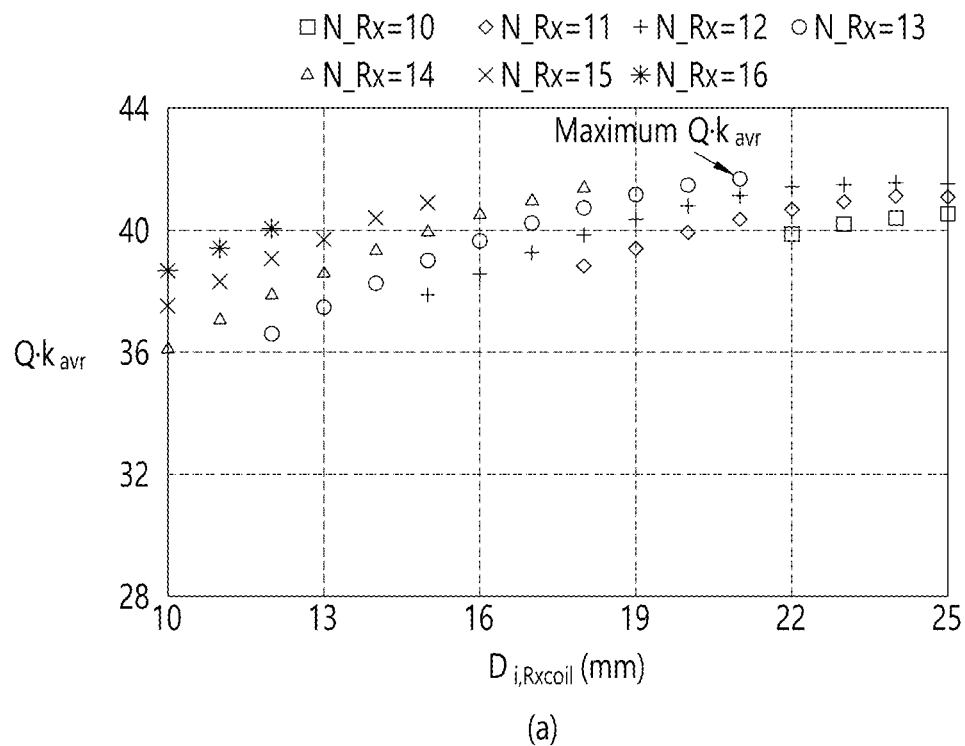
(a)
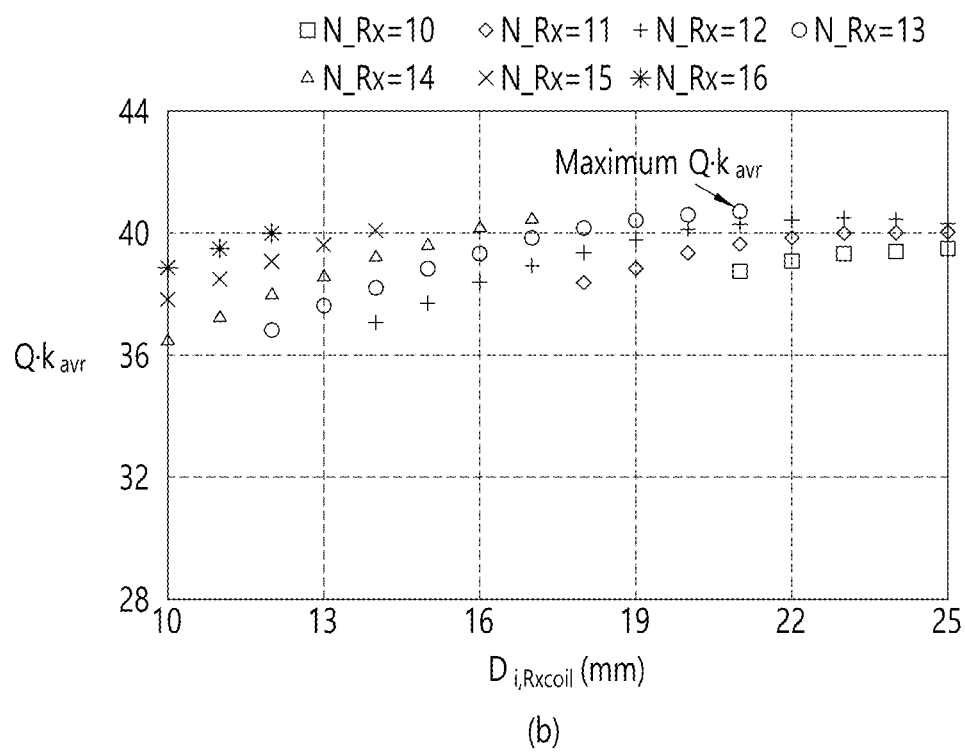
(b)

FIG. 20
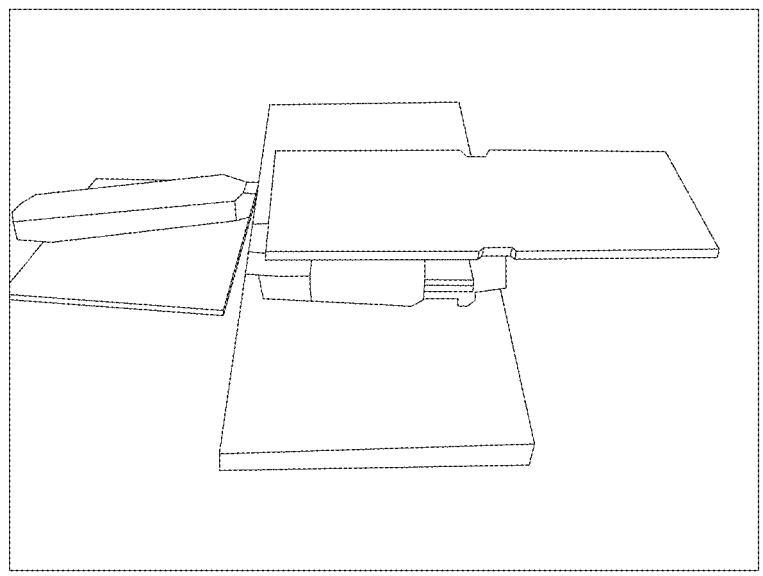
(a)
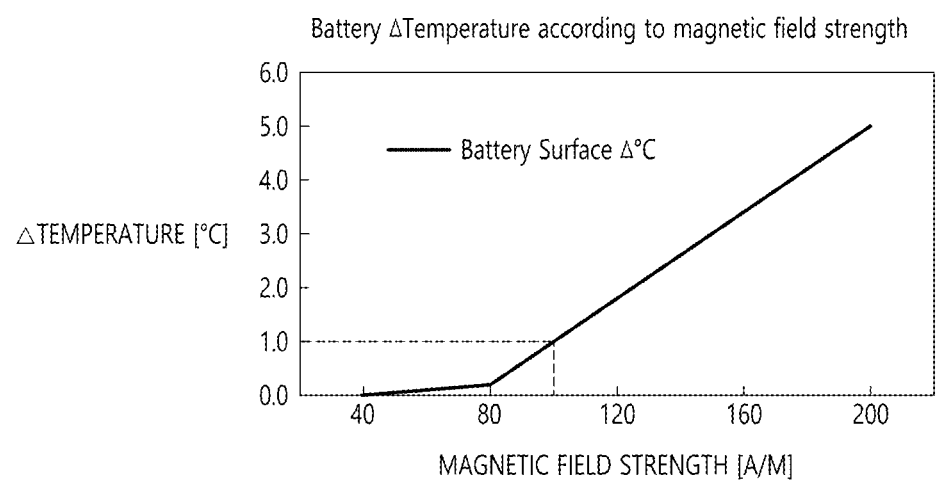
(b)

FIG. 24
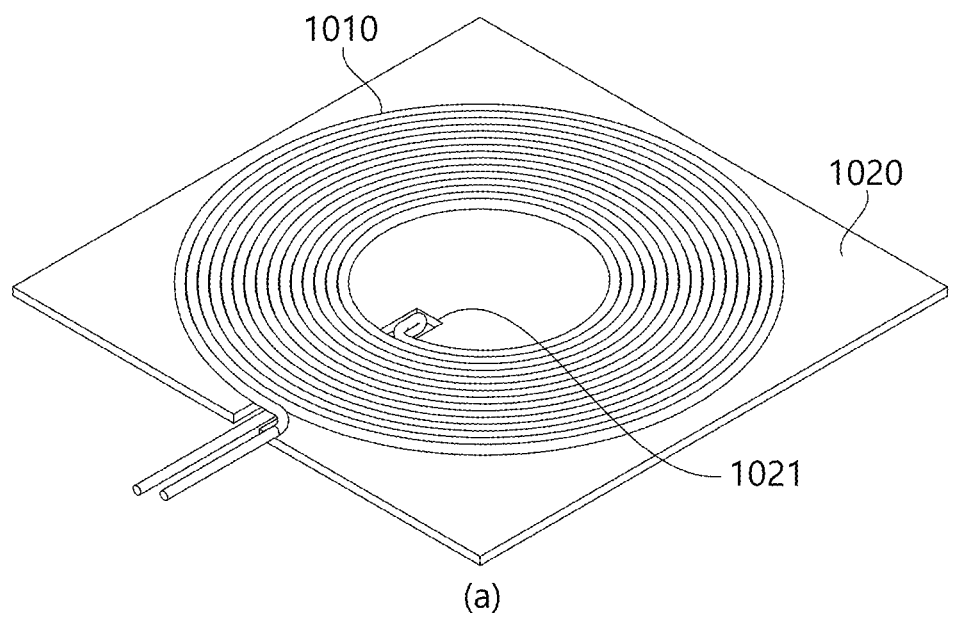
(a)
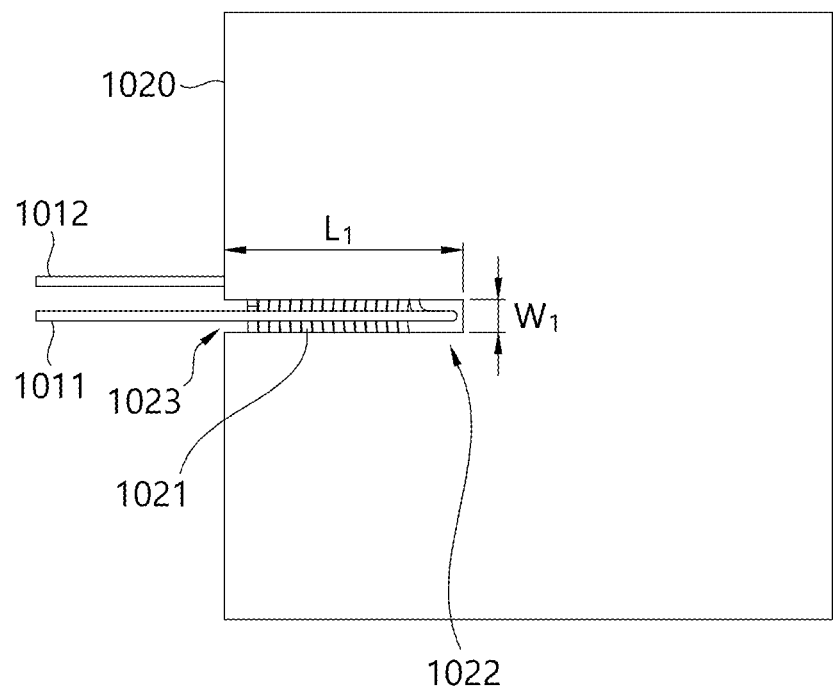
(b)

WIRELESS POWER TRANSMITTER

CROSS-REFERENCE TO RELATED APPLICATIONS

This application is a continuation-in-part of U.S. patent application Ser. No. 17/256,624 filed on Dec. 28, 2020, which is the National Stage filing under 35 U.S.C. 371 of International Application No. PCT/KR2018/007358, filed on Jun. 28, 2018, the contents of which are incorporated by reference herein in their entirety

BACKGROUND OF THE DISCLOSURE

Field of the Disclosure

The present disclosure relates to a wireless power transmitter transmitting wireless power to a wireless power receiver and the wireless power receiver receiving wireless power from the wireless power transmitter.

Related Art

A wireless power transmission technology is a technology that wirelessly transports (or delivers) power between a power source and an electronic device. For example, the wireless power transmission technology allows a battery of a wireless user equipment (or terminal) to be charged by simply placing a wireless user equipment (UE), such as a smartphone, a tablet computer, and so on, on a wireless charging pad, thereby providing more excellent mobility, convenience, and safety as compared to a wired charging environment, which uses the existing wired charging connector. Attention is rising on the wireless power transmission technology as a replacement for the existing wired power transmission environment in various fields, such as consumer home appliances, industrial devices, military devices, automobiles, infrastructures (infra), medical devices, and so on.

As an organization for leading the standardization of the wireless power transmission technology, the Wireless Power Consortium (WPC) categorizes electronic devices into several groups depending upon the amount of power transmitted and received to and from the electronic devices and establishes a standard for each group. For example, a first group establishes a low power (approximately 5 W or less or approximately 20 W or less) standard targeting wearable devices, such as Smart watch, Smart Glass, Head Mounted Display (HMD), and Smart ring, or mobile electronic devices (or portable electronic devices), such as earphones, remote controller, smart phone, PDA, tablet PC, and so on. A second group establishes a mid-power (approximately 50 W or less or approximately 200 W or less) standard targeting small and/or middle sized home appliances, such as laptop computer, robot vacuum cleaner, TV receiver, audio device, vacuum cleaner, monitor, and so on. A third group establishes a high power (approximately 2 kW or less or approximately 22 kW or less) standard targeting kitchen appliances, such as blender, microwave oven, electric rice cooker (or food processor), and so on, or personal transportation devices (or electronic devices and/or transportation means), such as wheel chair, electric kickboard (or scooter), electric bicycle (or e-bike), electric car, and so on.

The establishment of the low power standard has already been completed in various versions, and the standard is now being extensively commercialized. Discussions on the standards related to mid power and high power are gradually in progress. Unlike the low power wireless charging, various problems may occur in the mid power wireless charging due to a voltage being induced to a range between several tens of volts (V) to several hundreds of volts (V). And, since a size of a wireless charging module becomes larger, it may be difficult to apply such wireless charging module to laptop computers, which require more compact size and light weight. Therefore, in order to resolve such problems, a wireless power receiver is required.

SUMMARY OF THE DISCLOSURE

Technical Objects

A technical object of the present disclosure is to provide a wireless power receiver and a method therefor that can receive mid power.

Another technical object of the present disclosure is to provide a reception coil, a shielding unit, and a fabrication method of the same that can be applied to mid power wireless charging.

Another technical object of the present disclosure is to provide a wireless power transmitter with improved power transmission efficiency while enabling slim design of the transmitter.

Technical objects of the present disclosure are not limited to the object described above, and other objects not mentioned above may be clearly understood by those skilled in the art from the descriptions given below.

Technical Solutions

To achieve the technical object, a wireless power transmitter according to one embodiment of the present disclosure may comprise a primary coil forming magnetic coupling with a secondary coil provided in a wireless power receiver and transmitting wireless power to the wireless power receiver, wherein the primary coil is formed by spirally winding a plurality of subcoils connected electrically in parallel while keeping the subcoils in contact with each other, and the subcoil is litz wire consisting of several conducting wires packed in a bundle.

Other specific details of the present disclosure are provided in the detailed descriptions and accompanying drawings of the present disclosure.

Effects of the Disclosure

A wireless power transmitter according to the present disclosure may be designed in a slim structure while providing excellent power transmission efficiency at the same time.

The effects according to the present disclosure is not limited by the contents exemplified above, and more various effects are included in the present disclosure.

BRIEF DESCRIPTION OF THE DRAWINGS

FIG. 8 is a structure of a sync pattern according to an exemplary embodiment of the present disclosure.

FIG. 12 illustrates a side cross-sectional view of a secondary coil being wound by multiple strands of FIG. 11.

FIGS. 13a to 13c illustrate a wireless power transmitter used in an experiment of an embodiment of the present disclosure.

FIG. 17 illustrates a graph showing a correlation between an inner radius and a figure of merit (FOM) of a secondary coil.

FIG. 18 illustrates a graph showing a correlation between an inner radius and inductance of a secondary coil.

FIG. 19 illustrates markings of data corresponding to a number of turns of a valid section and inner radius of FIG. 18 among experiment data of FIG. 17.

FIG. 20 illustrates results of an experiments performed after equipping the secondary coil and shielding unit together with a battery according to an embodiment of the present disclosure.

FIG. 24 illustrates a perspective view and a bottom view of a secondary coil and a shielding unit according to an embodiment of the present disclosure.

DESCRIPTION OF EXEMPLARY EMBODIMENTS

The term "wireless power", which will hereinafter be used in this specification, will be used to refer to an arbitrary form of energy that is related to an electric field, a magnetic field, and an electromagnetic field, which is transferred (or transmitted) from a wireless power transmitter to a wireless power receiver without using any physical electromagnetic conductors. The wireless power may also be referred to as a wireless power signal, and this may refer to an oscillating magnetic flux that is enclosed by a primary coil and a secondary coil. For example, power conversion for wirelessly charging devices including mobile phones, cordless phones, iPods, MP3 players, headsets, and so on, within the system will be described in this specification. Generally, the basic principle of the wireless power transfer technique includes, for example, all of a method of transferring power by using magnetic coupling, a method of transferring power by using radio frequency (RF), a method of transferring power by using microwaves, and a method of transferring power by using ultrasound (or ultrasonic waves).

Figure 1:
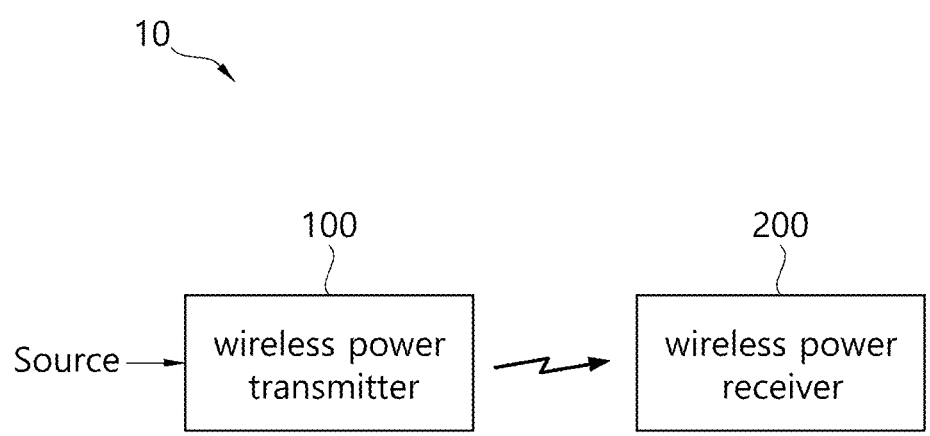
FIG. 1 is a block diagram of a wireless power system (10) according to an exemplary embodiment of the present disclosure.

FIG. 1 is a block diagram of a wireless power system (10) according to an exemplary embodiment of the present disclosure.

Referring to FIG. 1, the wireless power system (10) include a wireless power transmitter (100) and a wireless power receiver (200).

The wireless power transmitter (100) is supplied with power from an external power source (S) and generates a magnetic field. The wireless power receiver (200) generates electric currents by using the generated magnetic field, thereby being capable of wirelessly receiving power.

Additionally, in the wireless power system (10), the wireless power transmitter (100) and the wireless power receiver (200) may transceive (transmit and/or receive)

diverse information that is required for the wireless power transfer. Herein, communication between the wireless power transmitter (100) and the wireless power receiver (200) may be performed (or established) in accordance with any one of an in-band communication, which uses a magnetic field that is used for the wireless power transfer (or transmission), and an out-band communication, which uses a separate communication carrier.

Herein, the wireless power transmitter (100) may be provided as a fixed type or a mobile (or portable) type. Examples of the fixed transmitter type may include an embedded type, which is embedded in in-door ceilings or wall surfaces or embedded in furniture, such as tables, an implanted type, which is installed in out-door parking lots, bus stops, subway stations, and so on, or being installed in means of transportation, such as vehicles or trains. The mobile (or portable) type wireless power transmitter (100) may be implemented as a part of another device, such as a mobile device having a portable size or weight or a cover of a laptop computer, and so on.

Additionally, the wireless power receiver (200) should be interpreted as a comprehensive concept including diverse home appliances and devices that are operated by being wirelessly supplied with power instead of diverse electronic devices being equipped with a battery and a power cable. Typical examples of the wireless power receiver (200) may include portable terminals, cellular phones, smartphones, personal digital assistants (PDAs), portable media players (PDPs), Wibro terminals, tablet PCs, phablet, laptop computers, digital cameras, navigation terminals, television, electronic vehicles (EVs), and so on.

Figure 2:
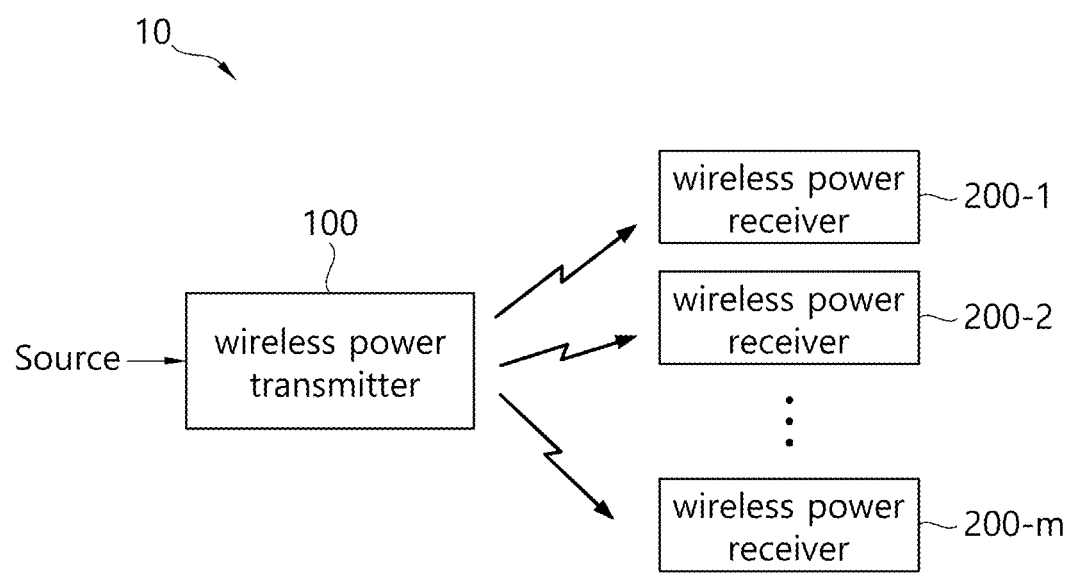
FIG. 2 is a block diagram of a wireless power system (10) according to another exemplary embodiment of the present disclosure.

In the wireless power system (10), one wireless power receiver (200) or a plurality of wireless power receivers may exist. Although it is shown in FIG. 1 that the wireless power transmitter (100) and the wireless power receiver (200) send and receive power to and from one another in a one-to-one correspondence (or relationship), as shown in FIG. 2, it is also possible for one wireless power transmitter (100) to simultaneously transfer power to multiple wireless power receivers (200-1, 200-2, . . . , 200-M). Most particularly, in case the wireless power transfer (or transmission) is performed by using a magnetic resonance method, one wireless power transmitter (100) may transfer power to multiple wireless power receivers (200-1, 200-2, . . . , 200-M) by using a synchronized transport (or transfer) method or a time-division transport (or transfer) method.

Additionally, although it is shown in FIG. 1 that the wireless power transmitter (100) directly transfers (or transmits) power to the wireless power receiver (200), the wireless power system (10) may also be equipped with a separate wireless power transceiver, such as a relay or repeater, for increasing a wireless power transport distance between the wireless power transmitter (100) and the wireless power receiver (200). In this case, power is delivered to the wireless power transceiver from the wireless power transmitter (100), and, then, the wireless power transceiver may transfer the received power to the wireless power receiver (200).

Hereinafter, the terms wireless power receiver, power receiver, and receiver, which are mentioned in this specification, will refer to the wireless power receiver (200). Also, the terms wireless power transmitter, power transmitter, and transmitter, which are mentioned in this specification, will refer to the wireless power transmitter (100).

Figure 3:
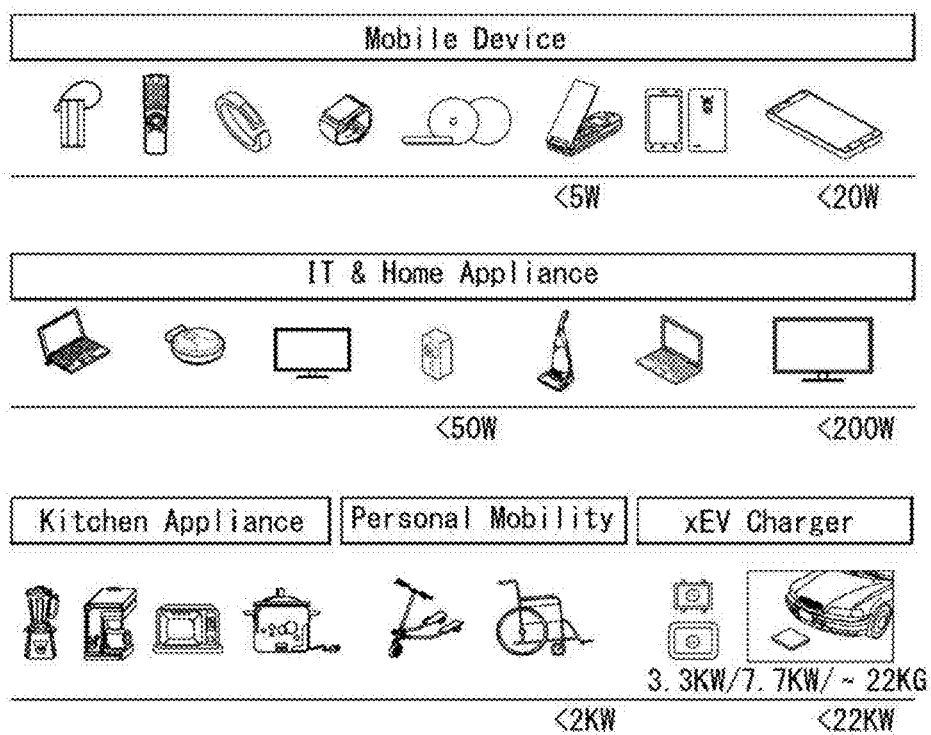
FIG. 3 shows an exemplary embodiment of diverse electronic devices adopting a wireless power transfer system.

FIG. 3 shows an exemplary embodiment of diverse electronic devices adopting a wireless power transfer system.

As shown in FIG. 3, the electronic devices included in the wireless power transfer system are sorted in accordance with the amount of transmitted power and the amount of received power. Referring to FIG. 3, wearable devices, such as smart watches, smart glasses, head mounted displays (HMDs), smart rings, and so on, and mobile electronic devices (or portable electronic devices), such as earphones, remote controllers, smartphones, PDAs, tablet PCs, and so on, may adopt a low-power (approximately 5 W or less or approximately 20 W or less) wireless charging method.

Small-sized/Mid-sized electronic devices, such as laptop computers, robot vacuum cleaners, TV receivers, audio devices, vacuum cleaners, monitors, and so on, may adopt a mid-power (approximately 50 W or less or approximately 200 W or less) wireless charging method. Kitchen appliances, such as mixers, microwave ovens, electric rice cookers, and so on, and personal transportation devices (or other electric devices or means of transportation), such as powered wheelchairs, powered kick scooters, powered bicycles, electric cars, and so on may adopt a high-power (approximately 2 kW or less or approximately 22 kW or less) wireless charging method.

The electric devices or means of transportation, which are described above (or shown in FIG. 1) may each include a wireless power receiver, which will hereinafter be described in detail. Therefore, the above-described electric devices or means of transportation may be charged (or re-charged) by wirelessly receiving power from a wireless power transmitter.

A standard for the wireless power transfer (or transmission) includes a wireless power consortium (WPC), an air fuel alliance (AFA), and a power matters alliance (PMA).

The WPC standard defines a baseline power profile (BPP) and an extended power profile (EPP). The BPP is related to a wireless power transmitter and a wireless power receiver supporting a power transfer of 5 W, and the EPP is related to a wireless power transmitter and a wireless power receiver supporting the transfer of a power range greater than 5 W and less than 30 W.

Diverse wireless power transmitters and wireless power receivers each using a different power level may be covered by each standard and may be sorted by different power classes or categories.

For example, the WPC may categorize (or sort) the wireless power transmitters and the wireless power receivers as PC-1, PC0, PC1, and PC2, and the WPC may provide a standard document (or specification) for each power class (PC). The PC-1 standard relates to wireless power transmitters and receivers providing a guaranteed power of less than 5 W. The application of PC-1 includes wearable devices, such as smart watches.

The PC0 standard relates to wireless power transmitters and receivers providing a guaranteed power of 5 W. The PC0 standard includes an EPP having a guaranteed power ranges that extends to 30 W. Although in-band (IB) communication corresponds to a mandatory communication protocol of PC0, out-of-band (OOB) communication that is used as an optional backup channel may also be used for PC0. The wireless power receiver may be identified by setting up an OOB flag, which indicates whether or not the OOB is supported, within a configuration packet. A wireless power transmitter supporting the OOB may enter an OOB handover phase by transmitting a bit-pattern for an OOB handover as a response to the configuration packet. The response to the configuration packet may correspond to an NAK, an ND, or an 8-bit pattern that is newly defined. The application of the PC0 includes smartphones.

The PC1 standard relates to wireless power transmitters and receivers providing a guaranteed power ranging from 30 W to 150 W. OOB corresponds to a mandatory communication channel for PC1, and D3 is used for initialization and link establishment to OOB. The wireless power transmitter may enter an OOB handover phase by transmitting a bit-pattern for an OOB handover as a response to the configuration packet. The application of the PC1 includes laptop computers or power tools.

The PC2 standard relates to wireless power transmitters and receivers providing a guaranteed power ranging from 200 W to 2 kW, and its application includes kitchen appliances.

As described above, the PCs may be differentiated in accordance with the respective power levels. And, information on whether or not the compatibility between the same PCs is supported may be optional or mandatory. Herein, the compatibility between the same PCs indicates that power transfer/reception between the same PCs is possible. For example, in case a wireless power transmitter corresponding to PC x is capable of performing charging of a wireless power receiver having the same PC x, it may be understood that compatibility is maintained between the same PCs. Similarly, compatibility between different PCs may also be supported. Herein, the compatibility between different PCs indicates that power transfer/reception between different PCs is also possible. For example, in case a wireless power transmitter corresponding to PC x is capable of performing charging of a wireless power receiver having PC y, it may be understood that compatibility is maintained between the different PCs.

The support of compatibility between PCs corresponds to an extremely important issue in the aspect of user experience and establishment of infrastructure. Herein, however, diverse problems, which will be described below, exist in maintaining the compatibility between PCs.

In case of the compatibility between the same PCs, for example, in case of a wireless power receiver using a lap-top charging method, wherein stable charging is possible only when power is continuously transferred, even if its respective wireless power transmitter has the same PC, it may be difficult for the corresponding wireless power receiver to stably receive power from a wireless power transmitter of the power tool method, which transfers power non-continuously. Additionally, in case of the compatibility between different PCs, for example, in case a wireless power transmitter having a minimum guaranteed power of 200 W transfers power to a wireless power receiver having a maximum guaranteed power of 5 W, the corresponding wireless power receiver may be damaged due to an over-voltage. As a result, it may be inappropriate (or difficult) to use the PS as an index/reference standard representing/indicating the compatibility.

Hereinafter, 'profiles' will be newly defined based on indexes/reference standards representing/indicating the compatibility. More specifically, it may be understood that by maintaining compatibility between wireless power transmitters and receivers having the same 'profile', stable power transfer/reception may be performed, and that power transfer/reception between wireless power transmitters and receivers having different 'profiles' cannot be performed. The 'profiles' may be defined in accordance with whether or not compatibility is possible and/or the application regardless of (or independent from) the power class.

For example, the profile may be sorted into 4 different categories, such as i) Mobile, ii) Power tool, iii) Kitchen, and iv) Wearable.

In case of the 'Mobile' profile, the PC may be defined as PC0 and/or PC1, the communication protocol/method may be defined as IB and OOB communication, and the operation frequency may be defined as 87 to 205 kHz, and smartphones, laptop computers, and so on, may exist as the exemplary application.

In case of the 'Power tool' profile, the PC may be defined as PC1, the communication protocol/method may be defined as IB communication, and the operation frequency may be defined as 87 to 145 kHz, and power tools, and so on, may exist as the exemplary application.

In case of the 'Kitchen' profile, the PC may be defined as PC2, the communication protocol/method may be defined as NFC-based communication, and the operation frequency may be defined as less than 100 kHz, and kitchen/home appliances, and so on, may exist as the exemplary application.

In case of the 'Wearable' profile, the PC may be defined as PC-1, the communication protocol/method may be defined as IB communication, and the operation frequency may be defined as 87 to 205 kHz, and wearable devices that are worn by the users, and so on, may exist as the exemplary application.

It may be mandatory to maintain compatibility between the same profiles, and it may be optional to maintain compatibility between different profiles.

The above-described profiles (Mobile profile, Power tool profile, Kitchen profile, and Wearable profile) may be generalized and expressed as first to nth profile, and a new profile may be added/replaced in accordance with the WPC standard and the exemplary embodiment.

In case the profile is defined as described above, the wireless power transmitter may optionally perform power transfer only to the wireless power receiving corresponding to the same profile as the wireless power transmitter, thereby being capable of performing a more stable power transfer. Additionally, since the load (or burden) of the wireless power transmitter may be reduced and power transfer is not attempted to a wireless power receiver for which compatibility is not possible, the risk of damage in the wireless power receiver may be reduced.

PC1 of the 'Mobile' profile may be defined by being derived from an optional extension, such as OOB, based on PC0. And, the 'Power tool' profile may be defined as a simply modified version of the PC1 'Mobile' profile. Additionally, up until now, although the profiles have been defined for the purpose of maintaining compatibility between the same profiles, in the future, the technology may be evolved to a level of maintaining compatibility between different profiles. The wireless power transmitter or the wireless power receiver may notify (or announce) its profile to its counterpart by using diverse methods.

In the AFA standard, the wireless power transmitter is referred to as a power transmitting unit (PTU), and the wireless power receiver is referred to as a power receiving unit (PRU). And, the PTU is categorized to multiple classes, as shown in Table 1, and the PRU is categorized to multiple classes, as shown in Table 2.

TABLE 1

| PTU | $P_{TX\_IN\_MAX}$ | Minimum category support requirement | Minimum value for a maximum number of supported devices |
|---|---|---|---|
| Class 1 | 2 W | 1x Category 1 | 1x Category 1 |
| Class 2 | 10 W | 1x Category 3 | 2x Category 2 |

TABLE 1-continued

| PTU | $P_{TX\_IN\_MAX}$ | Minimum category support requirement | Minimum value for a maximum number of supported devices |
|---|---|---|---|
| Class 3 | 16 W | 1x Category 4 | 2x Category 3 |
| Class 4 | 33 W | 1x Category 5 | 3x Category 3 |
| Class 5 | 50 W | 1x Category 6 | 4x Category 3 |
| Class 6 | 70 W | 1x Category 7 | 5x Category 3 |

TABLE 2

| PRU | $P_{RX\_OUT\_MAX}$ | Exemplary application |
|---|---|---|
| Category 1 | TBD | Bluetooth headset |
| Category 2 | 3.5 W | Feature phone |
| Category 3 | 6.5 W | Smartphone |
| Category 4 | 13 W | Tablet PC, Phablet |
| Category 5 | 25 W | Small form factor laptop |
| Category 6 | 37.5 W | General laptop |
| Category 7 | 50 W | Home appliance |

As shown in Table 1, a maximum output power capability of Class n PTU may be equal to or greater than the $P_{TX\_IN\_MAX}$ of the corresponding class. The PRU cannot draw a power that is higher than the power level specified in the corresponding category.

Figure 4:
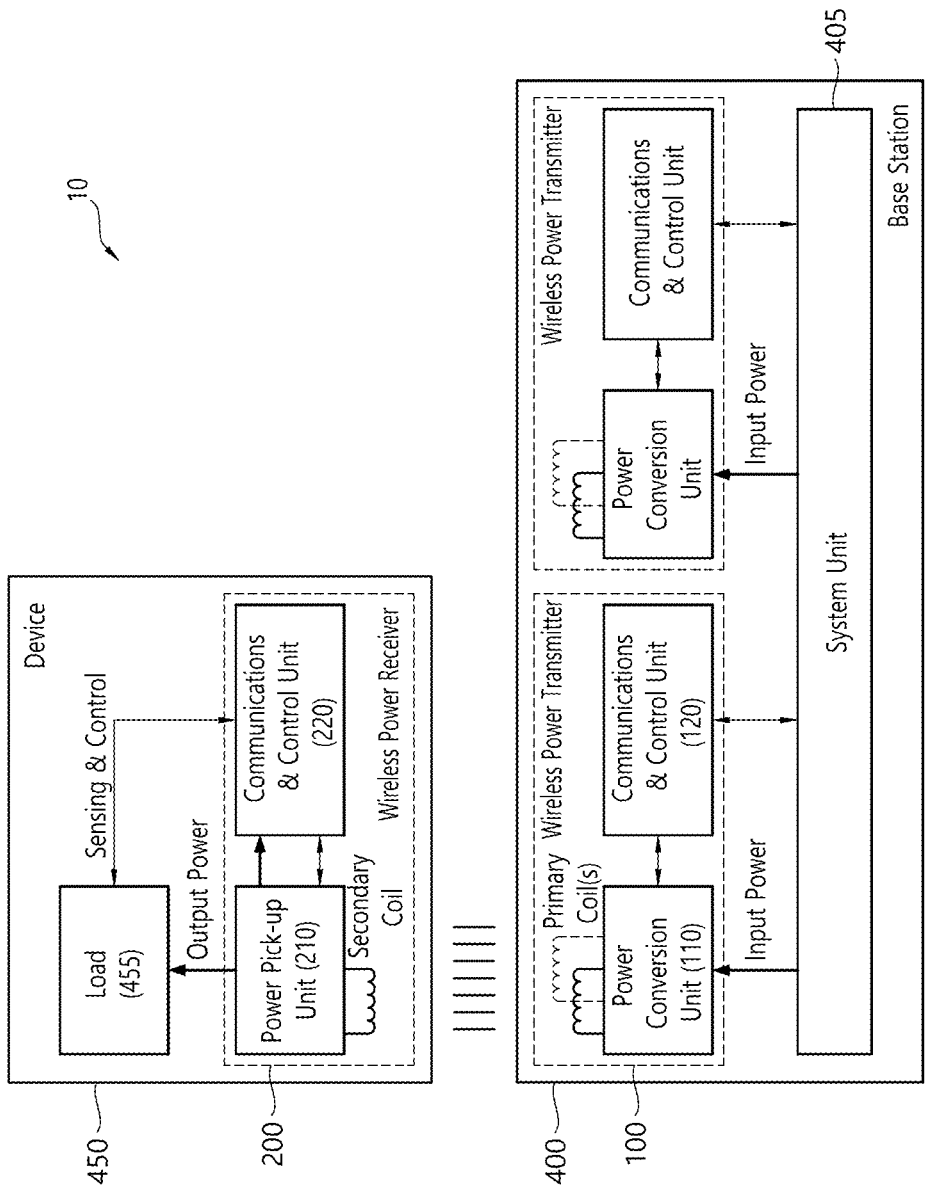
FIG. 4 is a block diagram of a wireless power transfer system according to another exemplary embodiment of the present disclosure.

FIG. 4 is a block diagram of a wireless power transfer system according to another exemplary embodiment of the present disclosure.

Referring to FIG. 4, the wireless power transfer system (10) includes a device (450), which wirelessly receives power, and a base station (400), which wirelessly transmits power. The device 450 may include various electronic devices introduced in FIG. 3.

As a device providing induction power or resonance power, the base station (400) may include at least one of a wireless power transmitter (100) and a system unit (405). The wireless power transmitter (100) may transmit induction power or resonance power and may control the transmission. The wireless power transmitter (100) may include a power conversion unit (110) converting electric energy to a power signal by generating a magnetic field through a primary coil (or primary coils), and a communications & control unit (120) controlling the communication and power transfer between the wireless power receiver (200) in order to transfer power at an appropriate (or suitable) level. The system unit (405) may perform input power provisioning, controlling of multiple wireless power transmitters, and other operation controls of the base station (400), such as user interface control.

The primary coil may generate an electromagnetic field by using an alternating current power (or voltage or current). The primary coil is supplied with an alternating current power (or voltage or current) of a specific frequency, which is being outputted from the power conversion unit (110). And, accordingly, the primary coil may generate a magnetic field of the specific frequency. The magnetic field may be generated in a non-radial shape or a radial shape. And, the wireless power receiver (200) receives the generated magnetic field and then generates an electric current. In other words, the primary coil wirelessly transmits power.

In the magnetic induction method, a primary coil and a secondary coil may have randomly appropriate shapes. For example, the primary coil and the secondary coil may correspond to copper wire being wound around a high-permeability formation, such as ferrite or a non-crystalline metal. The primary coil may also be referred to as a transmitting coil, a primary core, a primary winding, a primary loop antenna, and so on. Meanwhile, the secondary coil may also be referred to as a receiving coil, a secondary core, a secondary winding, a secondary loop antenna, a pickup antenna, and so on.

Although it is not shown in the drawing, the wireless power transmitter (100) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (120) may transmit and/or receive information to and from the wireless power receiver (200). The communications & control unit (120) may include at least one of an IB communication module and an OOB communication module.

The IB communication module may transmit and/or receive information by using a magnetic wave, which uses a specific frequency as its center frequency. For example, the communications & control unit (120) may perform in-band (IB) communication by transmitting information on the magnetic wave through the primary coil or by receiving information on the magnetic wave through the primary coil. At this point, the communications & control unit (120) may load information in the magnetic wave or may interpret the information that is carried by the magnetic wave by using a modulation scheme, such as binary phase shift keying (BPSK) or amplitude shift keying (ASK), and so on, or a coding scheme, such as Manchester coding or non-return-to-zero level (NZR-L) coding, and so on. By using the above-described IB communication, the communications & control unit (120) may transmit and/or receive information to distances of up to several meters at a data transmission rate of several kbps.

The OOB communication module may also perform out-of-band communication through a communication antenna. For example, the communications & control unit (120) may be provided to a near field communication module. Examples of the near field communication module may include communication modules, such as Wi-Fi, Bluetooth, Bluetooth LE, ZigBee, NFC, and so on.

The communications & control unit (120) may control the overall operations of the wireless power transmitter (100). The communications & control unit (120) may perform calculation and processing of diverse information and may also control each configuration element of the wireless power transmitter (100).

The communications & control unit (120) may be implemented in a computer or a similar device as hardware, software, or a combination of the same. When implemented in the form of hardware, the communications & control unit (120) may be provided as an electronic circuit performing control functions by processing electrical signals. And, when implemented in the form of software, the communications & control unit (120) may be provided as a program that operates the communications & control unit (120).

By controlling the operating point, the communications & control unit (120) may control the transmitted power. The operating point that is being controlled may correspond to a combination of a frequency (or phase), a duty cycle, a duty ratio, and a voltage amplitude. The communications & control unit (120) may control the transmitted power by adjusting any one of the frequency (or phase), the duty cycle, the duty ratio, and the voltage amplitude. Additionally, the wireless power transmitter (100) may supply a consistent level of power, and the wireless power receiver (200) may control the level of received power by controlling the resonance frequency.

The device (450) includes a load (455), which stores the power received through the secondary coil and supplies the stored power to the device.

The wireless power receiver (200) may include a power pick-up unit (210) and a communications/control unit (220). The power pick-up unit (210) may receive wireless power through the secondary coil and may convert the received power to electric energy. The power pick-up unit (210) includes a rectification circuit rectifying a direct current signal, which is obtained through the secondary coil, and converting the rectified direct current signal to an alternating current signal. In order to convert direct currents to alternating currents, the rectification circuit may perform full-wave rectification on electric currents. The rectification circuit may be implemented as a full bridge rectification circuit, which is configured of four diodes, for example, or as a circuit using active components. Moreover, the rectification circuit may further include a regulator, which regulates the rectified electric currents to more even and stable direct currents. Additionally, an output power of the rectification circuit is supplied to each configuration element of the device (450). Furthermore, in order to match the outputted direct current power with power needed by each configuration element (e.g., charging circuit), the rectification circuit may further include a direct current (DC)-to-direct current (DC) (DC-DC) converter converting the power to an appropriate voltage.

The communications & control unit (220) may control the transmission and reception of the wireless power (transfer and reception of power).

The secondary coil may receive wireless power that is being transmitted from the wireless power transmitter (100). The secondary coil may receive power by using the magnetic field that is generated in the primary coil. Herein, in case the specific frequency corresponds a resonance frequency, magnetic resonance may occur between the primary coil and the secondary coil, thereby allowing power to be transferred with greater efficiency.

Although it is not shown in FIG. 4, the communications & control unit (220) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (220) may transmit and/or receive information to and from the wireless power transmitter (100). The communications & control unit (220) may include at least one of an IB communication module and an OOB communication module.

The IB communication module may transmit and/or receive information by using a magnetic wave, which uses a specific frequency as its center frequency. For example, the communications & control unit (220) may perform IB communication by loading information in the magnetic wave and by transmitting the information through the secondary coil or by receiving a magnetic wave carrying information through the secondary coil. At this point, the communications & control unit (120) may load information in the magnetic wave or may interpret the information that is carried by the magnetic wave by using a modulation scheme, such as binary phase shift keying (BPSK) or amplitude shift keying (ASK), and so on, or a coding scheme, such as Manchester coding or non-return-to-zero level (NZR-L) coding, and so on. By using the above-described IB communication, the communications & control unit (220) may transmit and/or receive information to distances of up to several meters at a data transmission rate of several kbps.

The OB communication module may also perform out-of-band communication through a communication antenna. For example, the communications & control unit (220) may be provided to a near field communication module.

Examples of the near field communication module may include communication modules, such as Wi-Fi, Bluetooth, Bluetooth LE, ZigBee, NFC, and so on.

The communications & control unit (220) may control the overall operations of the wireless power receiver (200). The communications & control unit (220) may perform calculation and processing of diverse information and may also control each configuration element of the wireless power receiver (200).

The communications & control unit (220) may be implemented in a computer or a similar device as hardware, software, or a combination of the same. When implemented in the form of hardware, the communications & control unit (220) may be provided as an electronic circuit performing control functions by processing electrical signals. And, when implemented in the form of software, the communications & control unit (220) may be provided as a program that operates the communications & control unit (220).

The load (455) may correspond to a battery. The battery may store energy by using the power that is being outputted from the power pick-up unit (210). Meanwhile, the battery is not mandatorily required to be included in the device (450). For example, the battery may be provided as a detachable external feature. As another example, the wireless power receiver may include an operating means that may execute diverse functions of the electronic device instead of the battery.

As shown in the drawing, although the device (450) is illustrated to be included in the wireless power receiver (200) and the base station (400) is illustrated to be included in the wireless power transmitter (100), in a broader meaning, the wireless power receiver (200) may be identified (or regarded) as the device (450), and the wireless power transmitter (100) may be identified (or regarded) as the base station (400).

Hereinafter, the coil or coil unit includes a coil and at least one device being approximate to the coil, and the coil or coil unit may also be referred to as a coil assembly, a coil cell, or a cell.

Figure 5:
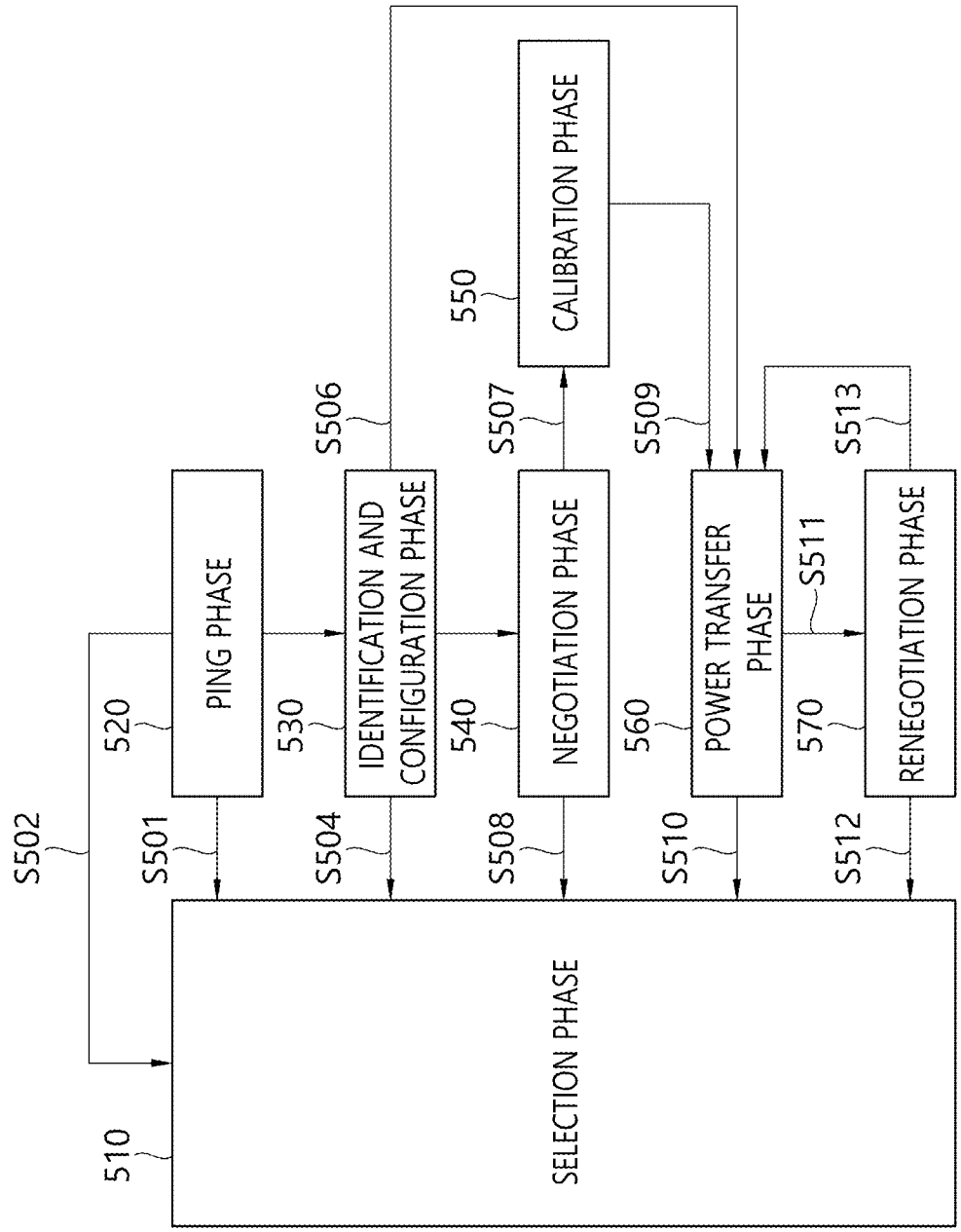
FIG. 5 is a state transition diagram for describing a wireless power transfer procedure.

FIG. 5 is a state transition diagram for describing a wireless power transfer procedure.

Referring to FIG. 5, the power transfer (or transfer) from the wireless power transmitter to the wireless power receiver according to an exemplary embodiment of the present disclosure may be broadly divided into a selection phase (510), a ping phase (520), an identification and configuration phase (530), a negotiation phase (540), a calibration phase (550), a power transfer phase (560), and a renegotiation phase (570).

If a specific error or a specific event is detected when the power transfer is initiated or while maintaining the power transfer, the selection phase (510) may include a shifting phase (or step)—reference numerals S502, S504, S508, S510, and S512. Herein, the specific error or specific event will be specified in the following description. Additionally, during the selection phase (510), the wireless power transmitter may monitor whether or not an object exists on an interface surface. If the wireless power transmitter detects that an object is placed on the interface surface, the process step may be shifted to the ping phase (520). During the selection phase (510), the wireless power transmitter may transmit a very short pulse of an analog ping signal, and may detect whether or not an object exists within an active area of the interface surface based on a current change in the transmitting coil or the primary coil.

In case an object is sensed (or detected) in the selection phase (510), the wireless power transmitter may measure a quality factor of a wireless power resonance circuit (e.g., power transfer coil and/or resonance capacitor). According to the exemplary embodiment of the present disclosure, during the selection phase (510), the wireless power transmitter may measure the quality factor in order to determine whether or not a foreign object exists in the charging area along with the wireless power receiver. In the coil that is provided in the wireless power transmitter, inductance and/or components of the series resistance may be reduced due to a change in the environment, and, due to such decrease, a value of the quality factor may also be decreased. In order to determine the presence or absence of a foreign object by using the measured quality factor value, the wireless power transmitter may receive from the wireless power receiver a reference quality factor value, which is measured in advance in a state where no foreign object is placed within the charging area. The wireless power transmitter may determine the presence or absence of a foreign object by comparing the measured quality factor value with the reference quality factor value, which is received during the negotiation phase (540). However, in case of a wireless power receiver having a low reference quality factor value—e.g., depending upon its type, purpose, characteristics, and so on, the wireless power receiver may have a low reference quality factor value—in case a foreign object exists, since the difference between the reference quality factor value and the measured quality factor value is small (or insignificant), a problem may occur in that the presence of the foreign object cannot be easily determined. Accordingly, in this case, other determination factors should be further considered, or the present or absence of a foreign object should be determined by using another method.

According to another exemplary embodiment of the present disclosure, in case an object is sensed (or detected) in the selection phase (510), in order to determine whether or not a foreign object exists in the charging area along with the wireless power receiver, the wireless power transmitter may measure the quality factor value within a specific frequency area (e.g., operation frequency area). In the coil that is provided in the wireless power transmitter, inductance and/or components of the series resistance may be reduced due to a change in the environment, and, due to such decrease, the resonance frequency of the coil of the wireless power transmitter may be changed (or shifted). More specifically, a quality factor peak frequency that corresponds to a frequency in which a maximum quality factor value is measured within the operation frequency band may be moved (or shifted).

In the ping phase (520), if the wireless power transmitter detects the presence of an object, the transmitter activates (or Wakes up) a receiver and transmits a digital ping for identifying whether or not the detected object corresponds to the wireless power receiver. During the ping phase (520), if the wireless power transmitter fails to receive a response signal for the digital ping—e.g., a signal intensity packet—from the receiver, the process may be shifted back to the selection phase (510). Additionally, in the ping phase (520), if the wireless power transmitter receives a signal indicating the completion of the power transfer—e.g., charging complete packet—from the receiver, the process may be shifted back to the selection phase (510).

If the ping phase (520) is completed, the wireless power transmitter may shift to the identification and configuration phase (530) for identifying the receiver and for collecting configuration and status information.

In the identification and configuration phase (530), if the wireless power transmitter receives an unwanted packet (i.e., unexpected packet), or if the wireless power transmitter fails to receive a packet during a predetermined period of time (i.e., out of time), or if a packet transmission error occurs (i.e., transmission error), or if a power transfer contract is not configured (i.e., no power transfer contract), the wireless power transmitter may shift to the selection phase (510).

The wireless power transmitter may confirm (or verify) whether or not its entry to the negotiation phase (540) is needed based on a Negotiation field value of the configuration packet, which is received during the identification and configuration phase (530). Based on the verified result, in case a negotiation is needed, the wireless power transmitter enters the negotiation phase (540) and may then perform a predetermined FOD detection procedure. Conversely, in case a negotiation is not needed, the wireless power transmitter may immediately enter the power transfer phase (560).

In the negotiation phase (540), the wireless power transmitter may receive a Foreign Object Detection (FOD) status packet that includes a reference quality factor value. Or, the wireless power transmitter may receive an FOD status packet that includes a reference peak frequency value. Alternatively, the wireless power transmitter may receive a status packet that includes a reference quality factor value and a reference peak frequency value. At this point, the wireless power transmitter may determine a quality coefficient threshold value for FO detection based on the reference quality factor value. The wireless power transmitter may determine a peak frequency threshold value for FO detection based on the reference peak frequency value.

The wireless power transmitter may detect the presence or absence of an FO in the charging area by using the determined quality coefficient threshold value for FO detection and the currently measured quality factor value (i.e., the quality factor value that was measured before the ping phase), and, then, the wireless power transmitter may control the transmitted power in accordance with the FO detection result. For example, in case the FO is detected, the power transfer may be stopped. However, the present disclosure will not be limited only to this.

The wireless power transmitter may detect the presence or absence of an FO in the charging area by using the determined peak frequency threshold value for FO detection and the currently measured peak frequency value (i.e., the peak frequency value that was measured before the ping phase), and, then, the wireless power transmitter may control the transmitted power in accordance with the FO detection result. For example, in case the FO is detected, the power transfer may be stopped. However, the present disclosure will not be limited only to this.

In case the FO is detected, the wireless power transmitter may return to the selection phase (510). Conversely, in case the FO is not detected, the wireless power transmitter may proceed to the calibration phase (550) and may, then, enter the power transfer phase (560). More specifically, in case the FO is not detected, the wireless power transmitter may determine the intensity of the received power that is received by the receiving end during the calibration phase (550) and may measure power loss in the receiving end and the transmitting end in order to determine the intensity of the power that is transmitted from the transmitting end. In other words, during the calibration phase (550), the wireless power transmitter may estimate the power loss based on a difference between the transmitted power of the transmitting end and the received power of the receiving end. The wireless power transmitter according to the exemplary embodiment of the present disclosure may calibrate the threshold value for the FOD detection by applying the estimated power loss.

In the power transfer phase (560), in case the wireless power transmitter receives an unwanted packet (i.e., unexpected packet), or in case the wireless power transmitter fails to receive a packet during a predetermined period of time (i.e., time-out), or in case a violation of a predetermined power transfer contract occurs (i.e., power transfer contract violation), or in case charging is completed, the wireless power transmitter may shift to the selection phase (510).

Additionally, in the power transfer phase (560), in case the wireless power transmitter is required to reconfigure the power transfer contract in accordance with a status change in the wireless power transmitter, the wireless power transmitter may shift to the renegotiation phase (570). At this point, if the renegotiation is successfully completed, the wireless power transmitter may return to the power transfer phase (560).

The above-described power transfer contract may be configured based on the status and characteristic information of the wireless power transmitter and receiver. For example, the wireless power transmitter status information may include information on a maximum amount of transmittable power, information on a maximum number of receivers that may be accommodated, and so on. And, the receiver status information may include information on the required power, and so on.

Figure 6:
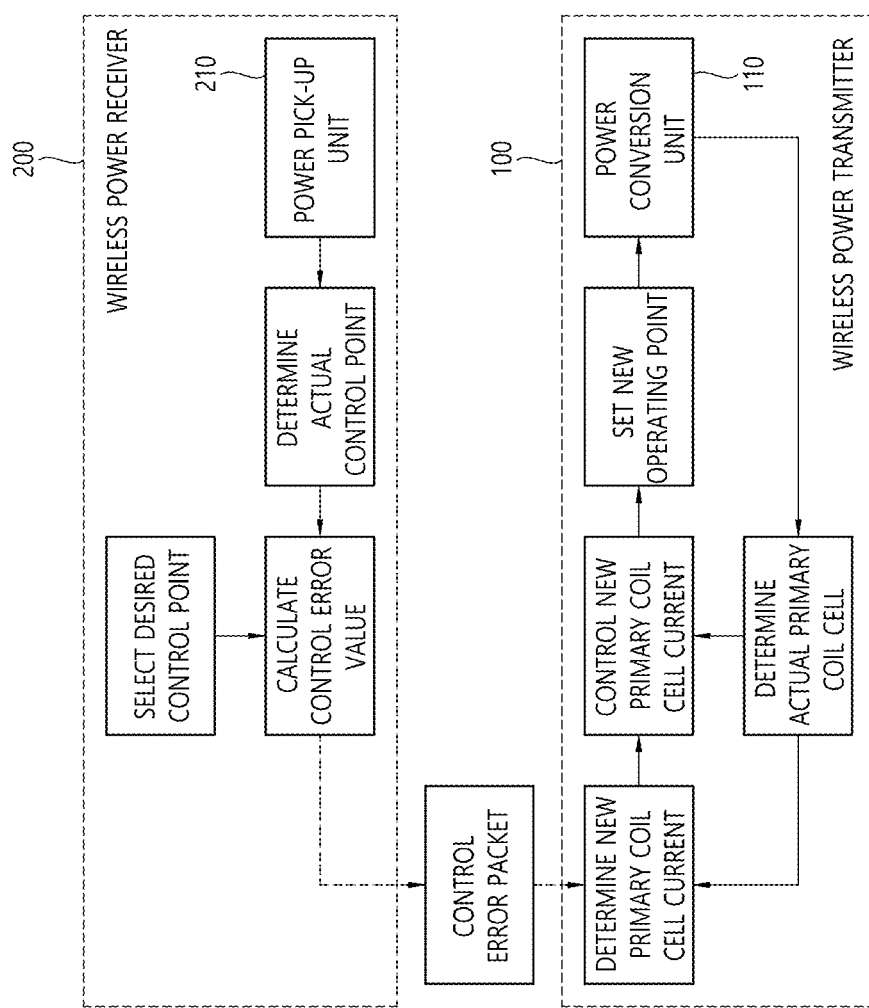
FIG. 6 shows a power control method according to an exemplary embodiment of the present disclosure.

FIG. 6 shows a power control method according to an exemplary embodiment of the present disclosure.

As shown in FIG. 6, in the power transfer phase (560), by alternating the power transfer and/or reception and communication, the wireless power transmitter (100) and the wireless power receiver (200) may control the amount (or size) of the power that is being transferred. The wireless power transmitter and the wireless power receiver operate at a specific control point. The control point indicates a combination of the voltage and the electric current that are provided from the output of the wireless power receiver, when the power transfer is performed.

More specifically, the wireless power receiver selects a desired control point, a desired output current/voltage, a temperature at a specific location of the device, and so on, and additionally determines an actual control point at which the receiver is currently operating. The wireless power receiver calculates a control error value by using the desired control point and the actual control point, and, then, the wireless power receiver may transmit the calculated control error value to the wireless power transmitter as a control error packet.

Also, the wireless power transmitter may configure/control a new operating point—amplitude, frequency, and duty cycle—by using the received control error packet, so as to control the power transfer. Therefore, the control error packet may be transmitted/received at a constant time interval during the power transfer phase, and, according to the exemplary embodiment, in case the wireless power receiver attempts to reduce the electric current of the wireless power transmitter, the wireless power receiver may transmit the control error packet by setting the control error value to a negative number. And, in case the wireless power receiver intends to increase the electric current of the wireless power transmitter, the wireless power receiver transmit the control error packet by setting the control error value to a positive number. During the induction mode, by transmitting the control error packet to the wireless power transmitter as described above, the wireless power receiver may control the power transfer.

Figure 7:
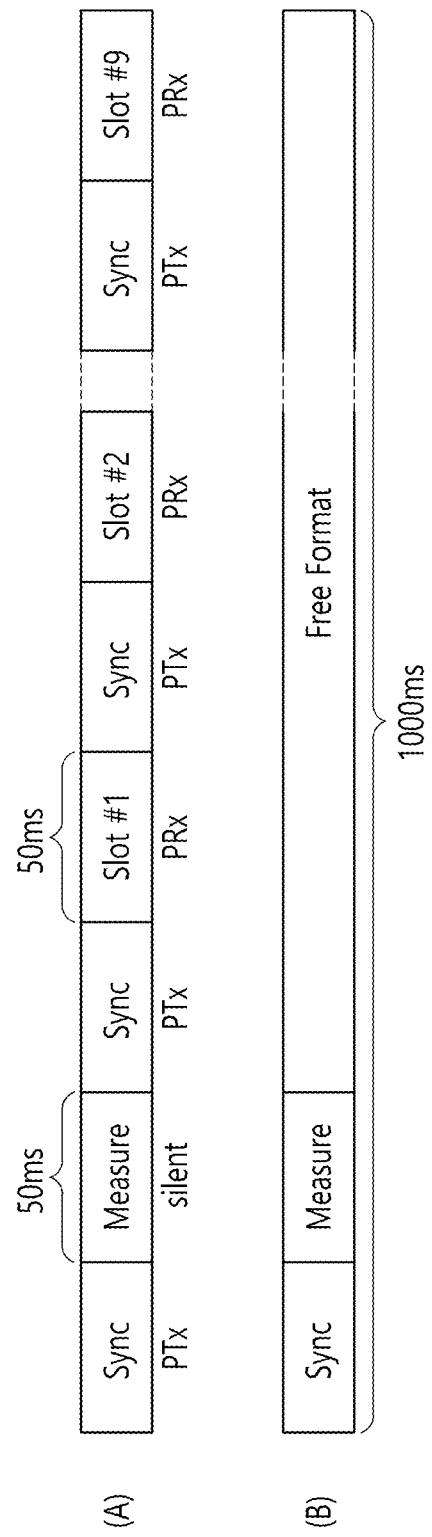
FIG. 7 shows a communication frame structure according to an exemplary embodiment of the present disclosure.

FIG. 7 shows a communication frame structure according to an exemplary embodiment of the present disclosure. This may correspond to a communication frame structure in a shared mode.

Referring to FIG. 7, in the shared mode, different forms of frames may be used along with one another. For example, in the shared mode, a slotted frame having a plurality of slots, as shown in (A), and a free format frame that does not have a specified format, as shown in (B), may be used. More specifically, the slotted frame corresponds to a frame for transmitting short data packets from the wireless power receiver (200) to the wireless power transmitter (100). And, since the free format frame is not configured of a plurality of slots, the free format frame may correspond to a frame that is capable of performing transmission of long data packets.

Meanwhile, the slotted frame and the free format frame may be referred to other diverse terms by anyone skilled in the art. For example, the slotted frame may be alternatively referred to as a channel frame, and the free format frame may be alternatively referred to as a message frame.

More specifically, the slotted frame may include a sync pattern indicating the starting point (or beginning) of a slot, a measurement slot, nine slots, and additional sync patterns each having the same time interval that precedes each of the nine slots.

Herein, the additional sync pattern corresponds to a sync pattern that is different from the sync pattern that indicates the starting point of the above-described frame. More specifically, the additional sync pattern does not indicate the starting point of the frame but may indicate information related to the neighboring (or adjacent) slots (i.e., two consecutive slots positioned on both sides of the sync pattern).

Among the nine slots, each sync pattern may be positioned between two consecutive slots. In this case, the sync pattern may provide information related to the two consecutive slots.

Additionally, the nine slots and the sync patterns being provided before each of the nine slots may have the same time interval. For example, the nine slots may have a time interval of 50 ms. And, the nine sync patterns may have a time length of 50 ms.

Meanwhile, the free format frame, as shown in (B) may not have a specific format apart from the sync pattern indicating the starting point of the frame and the measurement slot. More specifically, the free format frame is configured to perform a function that is different from that of the slotted frame. For example, the free format frame may be used to perform a function of performing communication of long data packets (e.g., additional owner information packets) between the wireless power transmitter and the wireless power receiver, or, in case of a wireless power transmitter being configured of multiple coils, to perform a function of selecting any one of the coils.

Hereinafter, a sync pattern that is included in each frame will be described in more detail with reference to the accompanying drawings.

FIG. 8 is a structure of a sync pattern according to an exemplary embodiment of the present disclosure.

Referring to FIG. 8, the sync pattern may be configured of a preamble, a start bit, a response field, a type field, an info field, and a parity bit. In FIG. 8, the start bit is illustrated as ZERO.

More specifically, the preamble is configured of consecutive bits, and all of the bits may be set to 0. In other words, the preamble may correspond to bits for matching a time length of the sync pattern.

The number of bits configuring the preamble may be subordinate to the operation frequency so that the length of the sync pattern may be most approximate to 50 ms but within a range that does not exceed 50 ms. For example, in case the operation frequency corresponds to 100 kHz, the sync pattern may be configured of two preamble bits, and, in case the operation frequency corresponds to 105 kHz, the sync pattern may be configured of three preamble bits.

The start bit may correspond to a bit that follows the preamble, and the start bit may indicate ZERO. The ZERO may correspond to a bit that indicates a type of the sync pattern. Herein, the type of sync patterns may include a frame sync including information that is related to a frame, and a slot sync including information of the slot. More specifically, the sync pattern may be positioned between consecutive frames and may correspond to a frame sync that indicate a start of the frame, or the sync pattern may be positioned between consecutive slots among a plurality of slots configuring the frame and may correspond to a sync slot including information related to the consecutive slots.

For example, in case the ZERO is equal to 0, this may indicate that the corresponding slot is a slot sync that is positioned in-between slots. And, in case the ZERO is equal to 1, this may indicate that the corresponding sync pattern is a frame sync being located in-between frames.

A parity bit corresponds to a last bit of the sync pattern, and the parity bit may indicate information on a number of bits configuring the data fields (i.e., the response field, the type field, and the info field) that are included in the sync pattern. For example, in case the number of bits configuring the data fields of the sync pattern corresponds to an even number, the parity bit may be set to when, and, otherwise (i.e., in case the number of bits corresponds to an odd number), the parity bit may be set to 0.

The response field may include response information of the wireless power transmitter for its communication with the wireless power receiver within a slot prior to the sync pattern. For example, in case a communication between the wireless power transmitter and the wireless power receiver is not detected, the response field may have a value of '00'. Additionally, if a communication error is detected in the communication between the wireless power transmitter and the wireless power receiver, the response field may have a value of '01'. The communication error corresponds to a case where two or more wireless power receivers attempt to access one slot, thereby causing collision to occur between the two or more wireless power receivers.

Additionally, the response field may include information indicating whether or not the data packet has been accurately received from the wireless power receiver. More specifically, in case the wireless power transmitter has denied the data packet, the response field may have a value of "10" (10—not acknowledge (NAK)). And, in case the wireless power transmitter has confirmed the data packet, the response field may have a value of "11" (11—acknowledge (ACK)).

The type field may indicate the type of the sync pattern. More specifically, in case the sync pattern corresponds to a first sync pattern of the frame (i.e., as the first sync pattern, in case the sync pattern is positioned before the measurement slot), the type field may have a value of '1', which indicates a frame sync.

Additionally, in a slotted frame, in case the sync pattern does not correspond to the first sync pattern of the frame, the type field may have a value of '0', which indicates a slot sync.

Moreover, the information field may determine the meaning of its value in accordance with the sync pattern type, which is indicated in the type field. For example, in case the type field is equal to 1 (i.e., in case the sync pattern type indicates a frame sync), the meaning of the information field may indicate the frame type. More specifically, the information field may indicate whether the current frame corresponds to a slotted frame or a free-format frame. For example, in case the information field is given a value of '00', this indicates that the current frame corresponds to a slotted frame. And, in case the information field is given a value of '01', this indicates that the current frame corresponds to a free-format frame.

Conversely, in case the type field is equal to 0 (i.e., in case the sync pattern type indicates a slot sync), the information field may indicate a state of a next slot, which is positioned after the sync pattern. More specifically, in case the next slot corresponds to a slot that is allocated (or assigned) to a specific wireless power receiver, the information field is given a value of '00'. In case the next slot corresponds to a slot that is locked, so as to be temporarily used by the specific wireless power receiver, the information field is given a value of '01'. Alternatively, in case the next slot corresponds to a slot that may be freely used by a random wireless power receiver, the information field is given a value of '10'.

Figure 9:
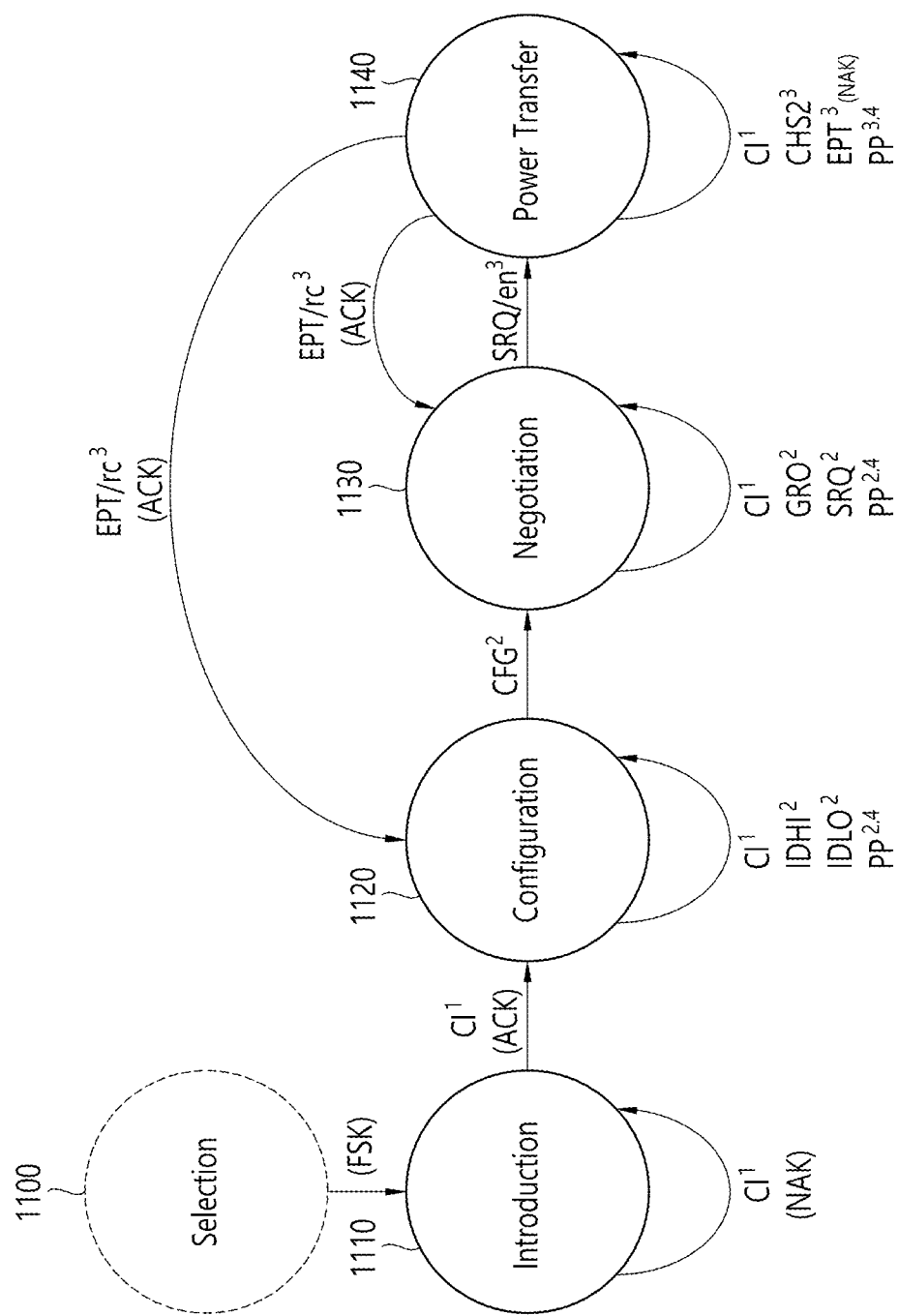
FIG. 9 shows operation statuses of a wireless power transmitter and a wireless power receiver in a shared mode according to an exemplary embodiment of the present disclosure.

FIG. 9 shows operation statuses of a wireless power transmitter and a wireless power receiver in a shared mode according to an exemplary embodiment of the present disclosure.

Referring to FIG. 9, the wireless power receiver operating in the shared mode may be operated in any one of a selection phase (1100), an introduction phase (1110), a configuration phase (1120), a negotiation phase (1130), and a power transfer phase (1140).

Firstly, the wireless power transmitter according to the exemplary embodiment of the present disclosure may transmit a wireless power signal in order to detect the wireless power receiver. More specifically, a process of detecting a wireless power receiver by using the wireless power signal may be referred to as an Analog ping.

Meanwhile, the wireless power receiver that has received the wireless power signal may enter the selection phase (1100). As described above, the wireless power receiver that has entered the selection phase (1100) may detect the presence or absence of an FSK signal within the wireless power signal.

In other words, the wireless power receiver may perform communication by using any one of an exclusive mode and a shared mode in accordance with the presence or absence of the FSK signal.

More specifically, in case the FSK signal is included in the wireless power signal, the wireless power receiver may operate in the shared mode, and, otherwise, the wireless power receiver may operate in the exclusive mode.

In case the wireless power receiver operates in the shared mode, the wireless power receiver may enter the introduction phase (1110). In the introduction phase (1110), the wireless power receiver may transmit a control information (CI) packet to the wireless power transmitter in order to transmit the control information packet during the configuration phase, the negotiation phase, and the power transfer phase. The control information packet may have a header and information related to control. For example, in the control information packet, the header may correspond to 0X53.

In the introduction phase (1110), the wireless power receiver performs an attempt to request a free slot for transmitting the control information (CI) packet during the following configuration phase, negotiation phase, and power transfer phase. At this point, the wireless power receiver selects a free slot and transmits an initial CI packet. If the wireless power transmitter transmits an ACK as a response to the corresponding CI packet, the wireless power receiver enters the configuration phase. If the wireless power transmitter transmits a NACK as a response to the corresponding CI packet, this indicates that another wireless power receiver is performing communication through the configuration and negotiation phase. In this case, the wireless power receiver re-attempts to perform a request for a free slot.

If the wireless power receiver receives an ACK as a response to the CI packet, the wireless power receiver may determine the position of a private slot within the frame by counting the remaining sync slots up to the initial frame sync. In all of the subsequent slot-based frames, the wireless power receiver transmits the CI packet through the corresponding slot.

If the wireless power transmitter authorizes the entry of the wireless power receiver to the configuration phase, the wireless power transmitter provides a locked slot series for the exclusive usage of the wireless power receiver. This may ensure the wireless power receiver to proceed to the configuration phase without any collision.

The wireless power receiver transmits sequences of data packets, such as two identification data packets (IDHI and IDLO), by using the locked slots. When this phase is completed, the wireless power receiver enters the negotiation phase. During the negotiation state, the wireless power transmitter continues to provide the locked slots for the exclusive usage of the wireless power receiver. This may ensure the wireless power receiver to proceed to the negotiation phase without any collision.

The wireless power receiver transmits one or more negotiation data packets by using the corresponding locked slot, and the transmitted negotiation data packet(s) may be mixed with the private data packets. Eventually, the corresponding sequence is ended (or completed) along with a specific request (SRQ) packet. When the corresponding sequence is completed, the wireless power receiver enters the power transfer phase, and the wireless power transmitter stops the provision of the locked slots.

In the power transfer phase, the wireless power receiver performs the transmission of a CI packet by using the allocated slots and then receives the power. The wireless power receiver may include a regulator circuit. The regulator circuit may be included in a communication/control unit. The wireless power receiver may self-regulate a reflected impedance of the wireless power receiver through the regulator circuit. In other words, the wireless power receiver may adjust the impedance that is being reflected for an amount of power that is requested by an external load. This may prevent an excessive reception of power and overheating.

In the shared mode, (depending upon the operation mode) since the wireless power transmitter may not perform the adjustment of power as a response to the received CI packet, in this case, control may be needed in order to prevent an overvoltage state.

Hereinafter, a new form of wireless power receiver that is capable of expanding an application range through a structural (or architectural) enhancement in the wireless charging system and increasing the efficiency in power transmission (or delivery).

In a wireless charging system for mid-power of several tens of watts (W), a primary coil and a secondary coil shall be equipped with high inductance properties (or characteristics) in order to achieve high efficiency and, even if a high voltage of several tens to hundreds of volts (V) is induced, the primary coil and the secondary coil shall not be overheated or electromagnetic wave interference shall not occur therein. In order to achieve this object, the thickness or size of the coils and the thickness of the shielding material essentially need to be increased. However, since such increase eventually causes an increase in the volume and weight of the wireless power receiver, there lies a problem in that, even though mid-power is used, the corresponding is not appropriate for usage in a product group (e.g., laptop computer (or notebook computer)), which requires compact size and light weight, thereby limiting the application range to a considerable level. Therefore, an enhanced wireless power receiver that is capable of expanding the application range by achieving compact size (or slimming) and light weight and minimizing overheating/electromagnetic wave interference, even in product groups using higher power levels, is required.

Hereinafter, although the embodiment of the present disclosure will be described based on a wireless power receiver for mid-power (i.e., 60 W), it will be apparent that the embodiment of the present disclosure may also be equally applied to wireless power receivers for low power and high power. Additionally, the wireless power receiver (200) of FIG. 4 may be the wireless power receiver that will hereinafter be disclosed.

Figure 10:
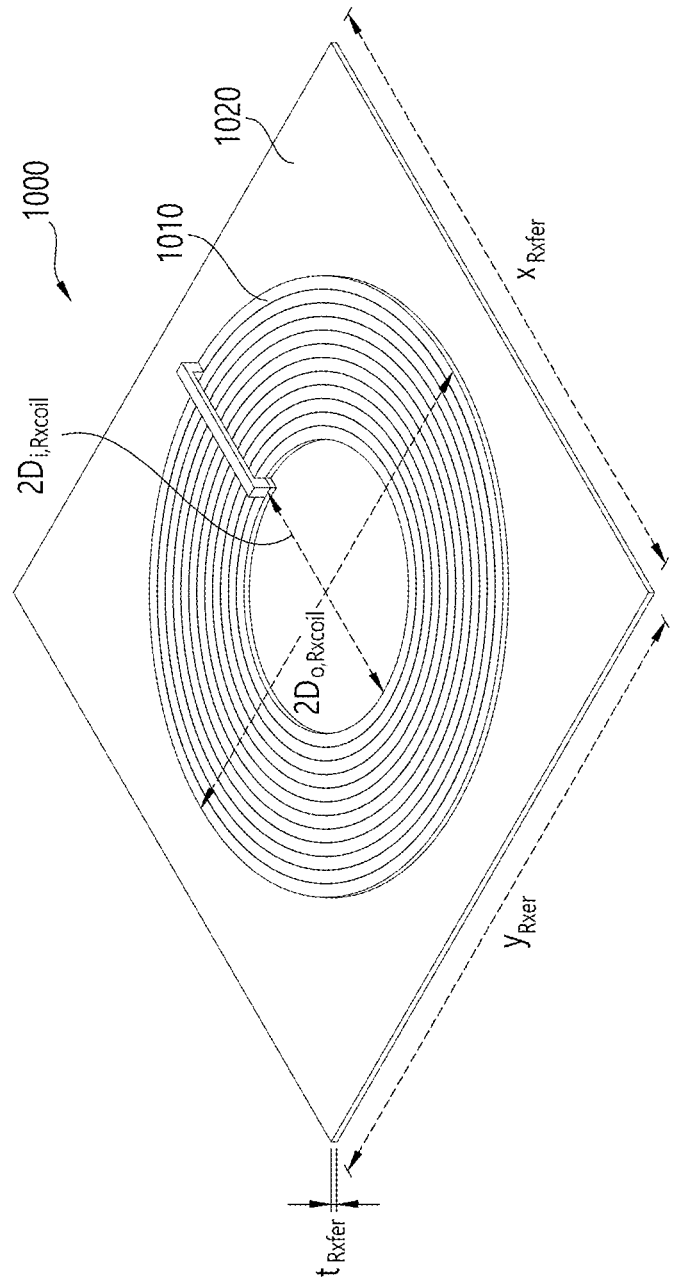
FIG. 10 illustrates a perspective view showing a secondary coil and a shielding unit of a wireless power receiver according to an embodiment of the present disclosure.

FIG. 10 illustrates a perspective view showing a secondary coil and a shielding unit of a wireless power receiver according to an embodiment of the present disclosure.

Referring to FIG. 10, the wireless power receiver (1000) is configured to include a secondary coil (1010) and a shielding unit (1020).

The secondary coil (1010) is wound in a planar spiral and arranged on a surface of the shielding unit (1020). A litz coil may be used as the secondary coil (1010).

In order to achieve a smaller size (i.e., to miniaturize) the wireless power receiver (1000), the secondary coil (1010) may be formed by winding a single coil being fabricated to have a thin thickness. However, since resistance has a property of being in inverse proportion to a cross-section of a wire, in case of configuring the secondary coil by using a coil having a thin thickness may lead to a problem of heating caused by an increase in resistance and a decrease in transmission efficiency.

The secondary coil (1010) according to the embodiment of the present disclosure is formed by a method of winding multiple subcoils in parallel on a same flat surface. By winding two or more subcoils each having a thickness of $T_{mm}$, in parallel, on a same flat surface while the subcoils are adjacent to one another, a secondary coil having an inner diameter of $2D_{i,Rxcoil}$ and an outer diameter of $2D_{O,Rxcoil}$ may be formed. The winding form of the secondary coil may be a planar spiral form. However, the winding form does not need to be limited only to this, and, therefore, it will be apparent that the secondary coil may be formed in various patterns, such as rectangular winding, ovular winding, triangular winding, and so on. Herein, a litz coil may be used as the secondary coil, or a single copper wire may be used as the secondary coil.

One end of each subcoil may be electrically connected to a first terminal on a substrate (not shown in the drawing) within the wireless power receiver (1000), and the other end of each subcoil may be electrically connected to a second terminal on the substrate. For example, in case of a secondary coil being equipped with two subcoils, one end of a first subcoil and one end of a second subcoil may both be connected to a first terminal, and the other end of the first subcoil and the other end of the second subcoil may both be connected to a second terminal. That is, the subcoils may have an electrical parallel connection structure.

Figure 11:
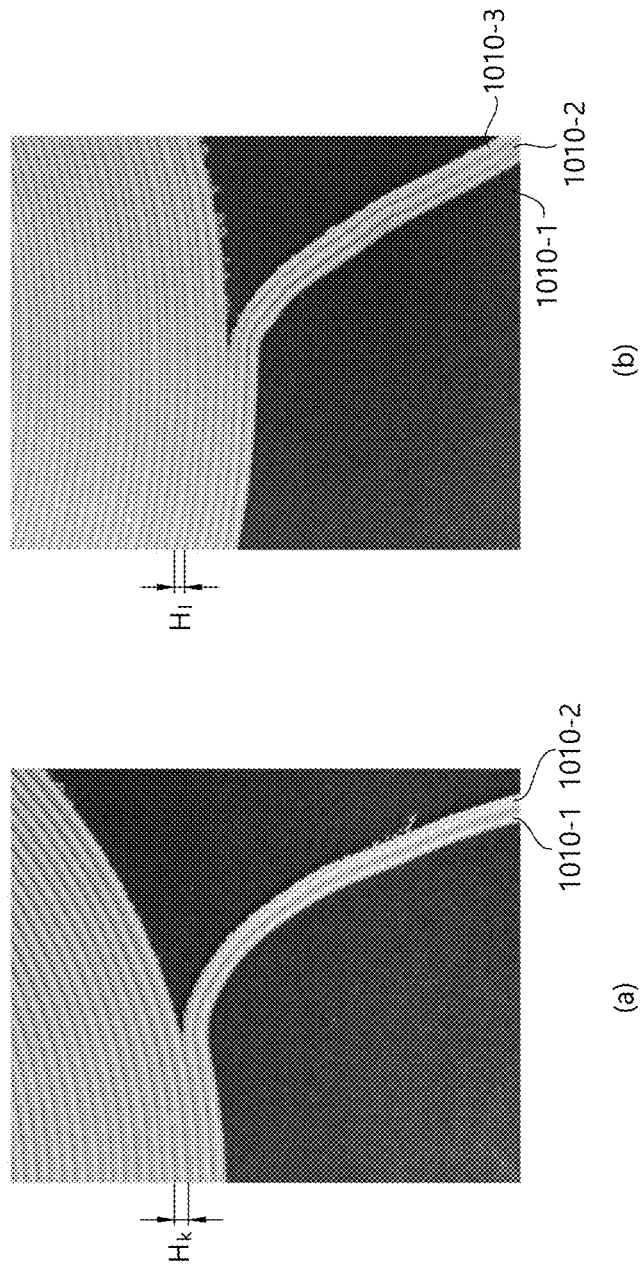
FIG. 11 illustrates a secondary coil being configured of multiple subcoils.

FIG. 11 illustrates a secondary coil being configured of multiple subcoils. (a) of FIG. 11 is part a secondary coil formed by 2 subcoils (1010-1, 1010-2), and (b) of FIG. 11 is part of a secondary coil formed by 3 subcoils (1010-1, 1010-2, 1010-3). Even if the number of turns is the same, an equivalent number of winding may vary in accordance with the number subcoils. For example, when 2 subcoils performs one turn together, although each subcoil makes one turn, a total number of turns is equal to 2. Thus, the equivalent number of winding is equal to 2. Similarly, when 3 subcoils each makes 1 turn, the equivalent number of winding is equal to 3.

According to a design method of a secondary coil according to an embodiment of the present disclosure, the thickness of the secondary coil is designed to be thin. However, the secondary coil is designed to be configured of a larger number of subcoils. For example, in case the subcoil is a litz coil, (a) is configured of 2 litz coils each having a thickness of Hk, which is formed of a wire bundle (or group) of a k strand, and the secondary coil is configured of 2 of the above-described litz coils. Meanwhile, (b) is configured of 3 litz coils each having a thickness of Hl, which is formed of a wire bundle (or group) of a strand smaller than k, and the secondary coil is configured of 3 of the above-described litz coils (Hk>Hl). That is, as the thickness of the subcoils is thinner, a larger number of subcoils may be used to configure the secondary coil. Herein, the wire configuring the litz coil may, for example, have a radius of 0.05 T.

According to a design method of a secondary coil according to another embodiment of the present disclosure, the equivalent number of winding of a secondary coil of a case where the thickness of the secondary coil is designed to be thin may be greater than the equivalent number of winding of a secondary coil of a case where the thickness of the secondary coil is designed to be thin. In (a) and (b), since the number of subcoils is equal to 2 and 3, respectively, even if the number of turns is equal to the same value N, the equivalent number of winding is equal to 2N and 3N, respectively. Since the power transmission efficiency decreases as the thickness of the secondary coil becomes thinner, in order to compensate for such decrease in the power transmission efficiency, a design that increases the equivalent number of winding is needed.

In one aspect, an increase in the equivalent number of winding may denote an increase in the diameter of the secondary coil. FIG. 12 illustrates a side cross-sectional view of a secondary coil being wound by multiple strands of FIG. 11. (a) of FIG. 12 is a cross-sectional view of the secondary coil of FIGS. 11(*a*), and (*b*) of FIG. 12 is a cross-sectional view of the secondary coil of FIG. 11(*b*). When comparing (a) and (b), the thickness of the secondary coil of (a) is thicker than the thickness of the secondary coil of (b) by ΔH. In case of forming a secondary coil having a thin thickness such as (b), the equivalent number of winding increases, thereby causing an increase in a horizontal diameter. However, a vertical thickness may relatively decrease.

A thickness of the secondary coil is a limitation element for reducing the thickness of a laptop (or notebook) computer, which requires, for example, slimming, whereas the horizontal diameter of the secondary coil has no significant relevance with the decrease in the thickness of the laptop computer. Therefore, when the same equivalent number of winding is assumed, as opposed to the secondary coil being configured by winding a single coil having a thick thickness of the related art, the secondary coil having a think thickness, such as (a) or (b), is more adequate for a slimming design for the product. That is, by configuring the secondary coil by winding multiple subcoils each having a thin thickness, the embodiment of the present disclosure may achieve slimming of the applied products and may implement the same target figure of merit (FOM) (required in the mid-power (e.g., 60 W) standard) as when designing the secondary coil with a single coil having a thick thickness.

The shielding unit (1020) is configured to have a flat plate form (or a sheet form) and arranged (or positioned) on one surface of the secondary coil (1010) and may be fixedly attached to the secondary coil (1010).

The wireless power receiver (1000) according to the embodiment of the present disclosure may interpose an adhesive unit between the secondary coil (1010) and the shielding unit (1020) so that the secondary coil (1010) and the shielding unit (1020) can be stably and fixedly attached (or adhered) to one another.

Apart from the squared shape of the shielding unit (1020), as shown in FIG. 10, depending upon the applied field, the shielding unit (1020) may be fabricated into various forms such as a rectangular shape, a circular shape, or an ovular shape.

The length of each side or diameter of the shielding unit (1020) is designed to cover at least one side (or surface) of the secondary coil (1010). Preferably, in order to achieve a sufficient shielding effect, the shielding unit (1020) is designed to have at least one exceeding part with reference to the outer diameter (2Do,Rxcoil) of the secondary coil (1010). For example, in case the outer diameter of the secondary coil (1010) is 80 mm, the length of each side of the shielding unit (1020) (in case the shielding unit (1020) is formed to have a squared shape or a rectangular shape) or diameter (in case the shielding unit (1020) is formed to have a circular shape) is designed to be equal to at least 80 mm or more. According to an embodiment, the length of one side of the shielding unit (1020) may be designed to be approximately 20-25% longer in comparison with the outer diameter of the secondary coil (1010). In this case, the shielding unit (1020) may be extended to approximately 15~20 mm from the outer diameter (2Do,Rxcoil) of the secondary coil (1010), so as to be positioned on one side of the secondary coil (1010).

Hereinafter, experiment and simulation results that were carried out for an optimal design of the subcoils and shielding unit according to the embodiment of the present disclosure will be disclosed.

1. Experiment Conditions

Figure 13A:
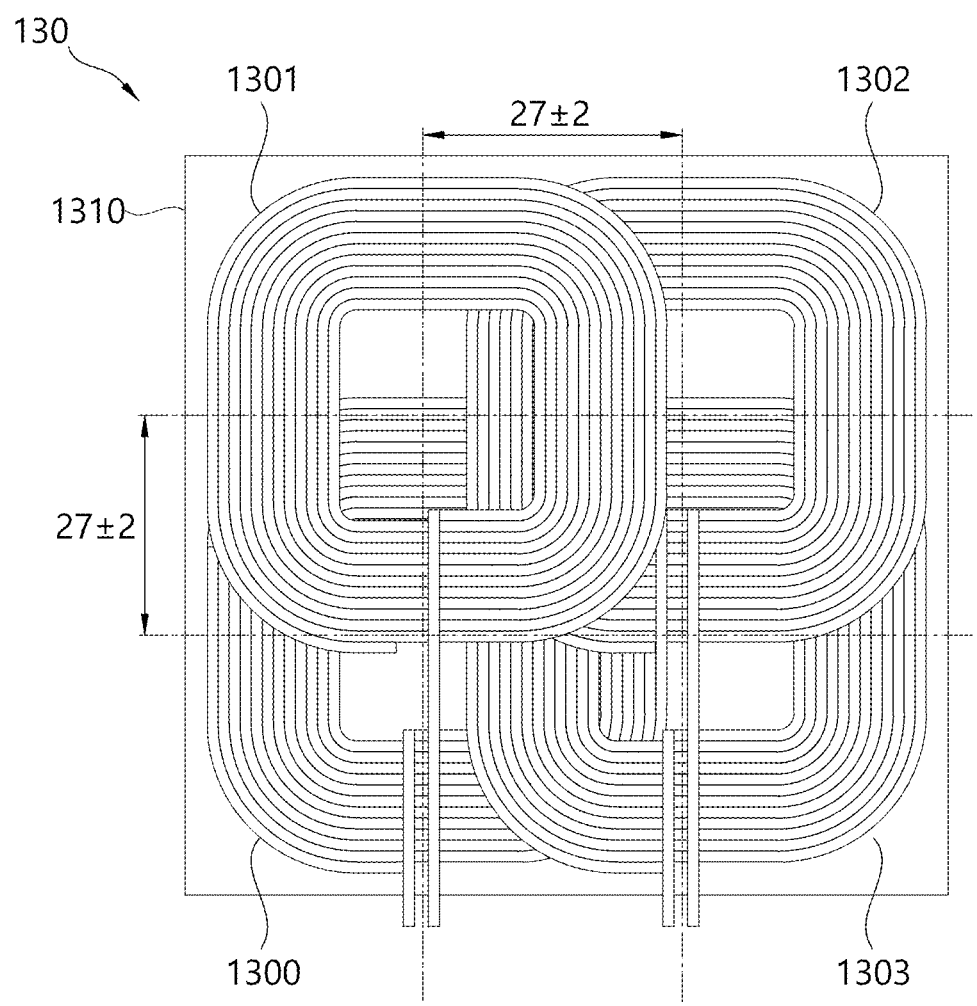
Figure 13C:
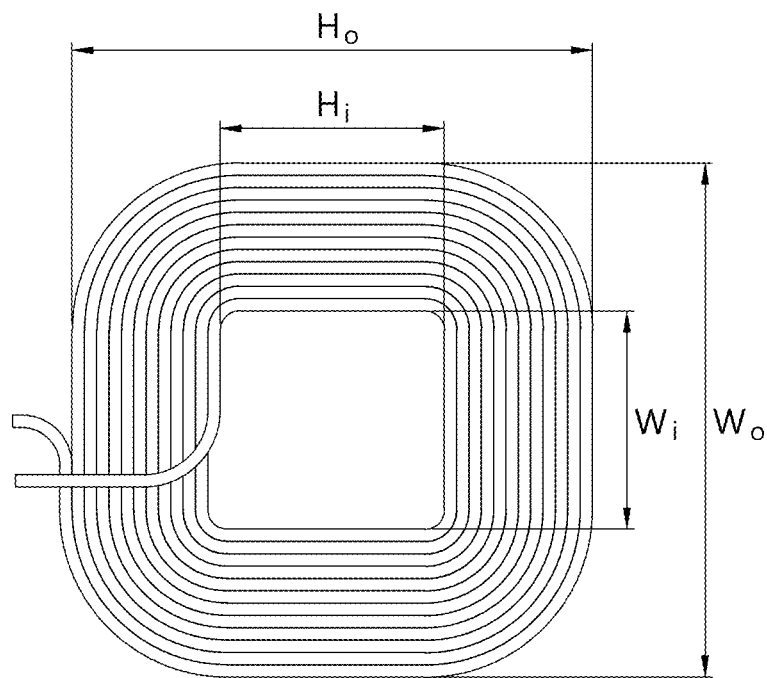

In this experiment and simulation, the wireless power transmitter shown in FIG. 13*a* to FIG. 13*b* was used. The wireless power transmitter shown in FIG. 13a to FIG. 13b may be a mid-power standard design of the WPC standard. This experiment was carried out in a state where the wireless power receiver (1000) is positioned on the wireless power transmitter, as shown in FIG. 15. Although the electrical elements used in this case are the same as FIG. 14, in FIG. 15, the description of the same elements has been omitted for simplicity.

Firstly, mechanical elements of the wireless power transmitter (130) used in the experiment include a shielding array (1310) configured of Mn—Zn ferrite and 4 primary coils (1300, 1301, 1302, 1303) configuring a 4-layer overlaying structure that is positioned on the shielding array (1310), and a distance between the center of each primary coils is equal to 27±2 mm. each of the primary coils has the same physical structure, and physical parameter values are as shown in Table 3, and the inductance of each primary coil is as shown in Table 4. The shielding array (1310) uses PM12 of TODAISU. A detailed spec of PM12 may be verified in http://www.todaisu.co.kr/download/material %20characteristics/PM12.pdf.

TABLE 3

| Physical parameter | Symbol | Value |
|---|---|---|
| Outer height | $H_o$ | 50 ± 1 mm |
| Inner height | $H_i$ | 21 ± 0.5 mm |
| Outer width | $W_o$ | 50 ± 0.5 mm |
| Inner width | $W_i$ | 21 ± 1 mm |
| Thickness | $d_c$ | 1.1 ± 0.2 mm |
| Number of turns per layer | N | 12 |
| Number of layers | — | 1 |
| Litz coil | — | φ0.08, 105 strand wire |

TABLE 4

| Coil number, symbol | Inductance |
|---|---|
| Zeroth coil (1300), $L_0$ | 11.3 ± 0.5 uH |
| First coil (1301), $L_1$ | 10.0 ± 0.5 uH |
| Second coil (1302), $L_2$ | 11.0 ± 0.5 uH |
| Third coil (1303), $L_3$ | 11.0 ± 0.5 uH |

Figure 14:
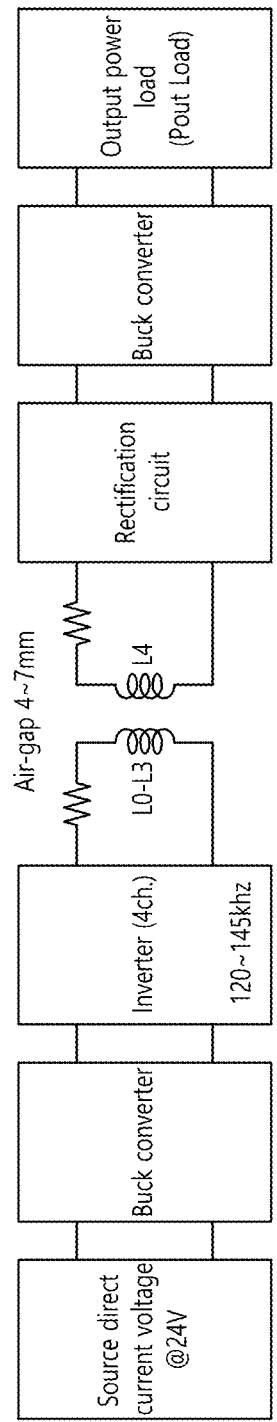
FIG. 14 illustrates an electric block view of a wireless power transmitter and a wireless power receiver used in an experiment of an embodiment of the present disclosure.
Figure 15:
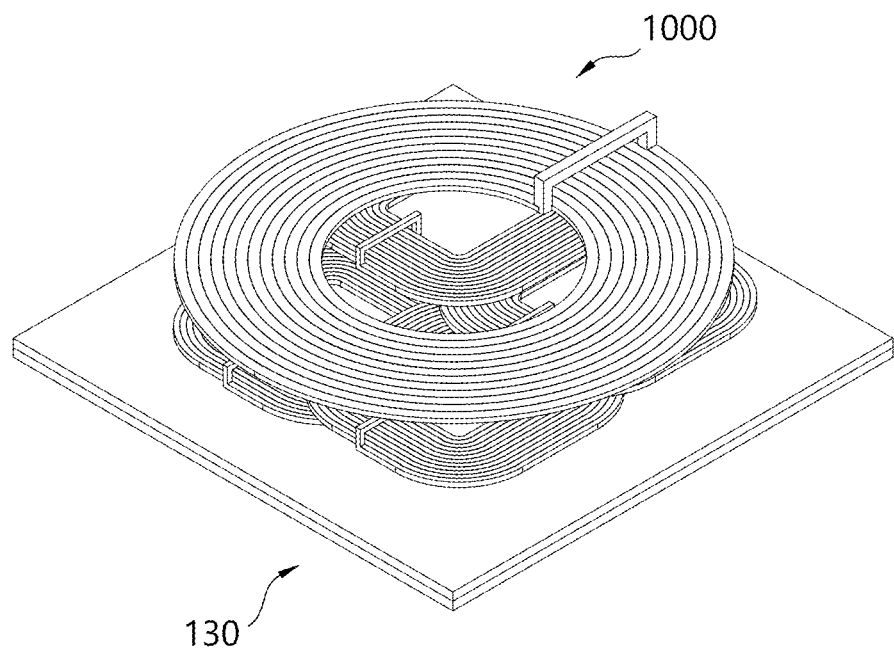
FIG. 15 illustrates wireless charging being performed between a wireless power transmitter and a wireless power receiver for an experiment of an embodiment of the present disclosure.

Additionally, the properties (or characteristics) of the electrical elements shown in FIG. 14, which are used in this experiment, are configured as shown in Table 5.

TABLE 5

| Electrical properties | Value |
|---|---|
| Inverter input voltage | 10~18 V |
| Inverter operating frequency | 120~145 kHz |
| Distance between primary coil and secondary coil | 4~7 mm |
| Self inductance of secondary coil | 15 uH~25 uH |
| Resonance frequency of wireless power receiver | 110 kHz~120 kHz |
| Rectification voltage of wireless power receiver | 20~40 V |

2. Experiment Results

This experiment derives physical and electrical properties of a secondary coil and shielding unit maximizing (or optimizing) Qk, which is a valid figure of merit (FOM) of a wireless power transmitting system. Herein, Q is a quality factor (Q factor), which may be indicated as shown in Equation 1.

$$Q = \frac{2\pi f L}{R} \quad \text{[Equation 1]}$$

Referring to Equation 1, herein, f represents frequency, L represents inductance, and R represents resistance.

Meanwhile, k is a coupling coefficient, which may be indicated as shown in Equation 2.

$$k = \frac{M}{\sqrt{L_1 L_2}} \quad \text{[Equation 2]}$$

Referring to Equation 2, M represents mutual inductance, and L1 and L2 respectively represent inductance of a primary coil and inductance of a secondary coil.

According to Equation 1 and Equation 2, in designing a wireless power transmitting system, the Q factor may be determined by i) a geometry of the coil, ii) a wire type and electrical properties, iii) an operating frequency, and iv) a magnetic material, such as ferrite. Most particularly, when the primary coil approaches the secondary coil, the Q factor of the primary coil changes. And, this is because the magnetic field changes due to the secondary coil and the magnetic material. The resistance R is dependent to i) a geometry of a loop, ii) the size of a wire and electrical properties, and iii) the frequency.

Additionally, in designing the wireless power transmitting system, a coupling coefficient k may be determined by 1) a geometry of the primary coil and secondary coil, ii) a magnetic material, and iii) a distance between the primary coil and the secondary coil. A self inductance L may be determined by i) a geometry of a loop, and ii) a neighboring magnetic material, and a mutual inductance M may be determined depending upon i) a geometry of a loop of the primary coil and a loop of the secondary coil, ii) a neighboring magnetic material, and iii) a distance between a primary coil loop and a secondary coil loop.

That is, it is apparent that the thickness and number of subcoils configuring the secondary coil, the number of turns, and the inner diameter (2Di,Rxcoil) are elements causing significant influence on the figure of merit (Qk). Therefore, this experiment checks how many number of turns and what inner diameter shall be designed for a specific number of subcoils having a specific thickness in order to maximize the figure of merit (FOM) under the above-described experiment conditions.

Firstly, in relation with the thickness and number of subcoils, a comparison experiment was carried out by differentiating subcoil type 1 and subcoil type 2. Subcoil type 1 is a secondary subcoil being configured of 2 relatively thick subcoils, and subcoil type 2 is a secondary subcoil being configured of 3 relatively thin subcoils. For example, 2 litz coils being configured of 100 strands of wire having a thickness of 0.05 T (0.05 T×100 strands×2 subcoils) were used as subcoil type 1, and 3 litz coils being configured of 65 strands of wire having a thickness of 0.05 T (0.05 T×65 strands×3 subcoils) were used as subcoil type 2.

Figure 16:
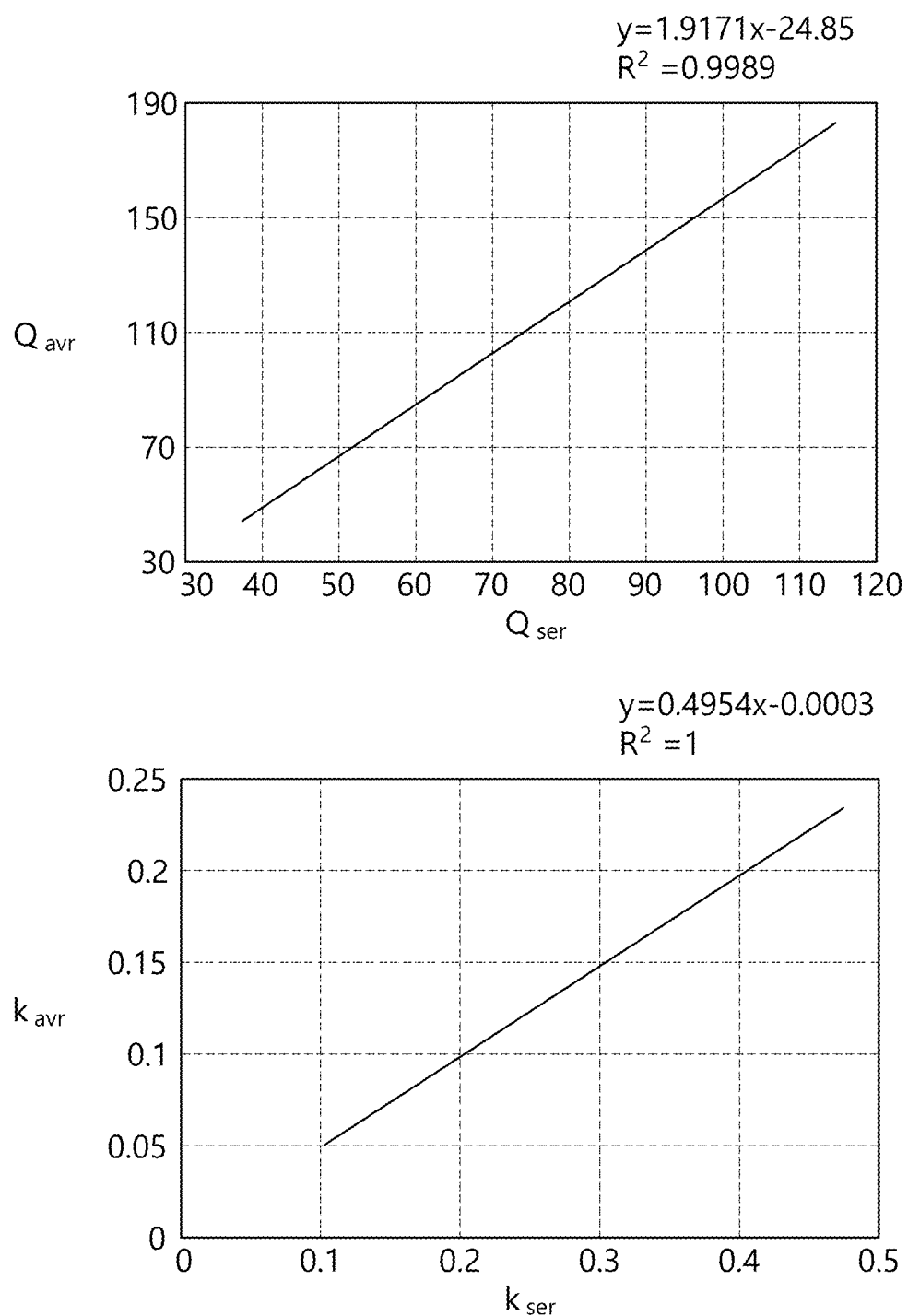
FIG. 16 illustrates a graph showing a relationship between Qavg and Qser and a relationship between kavg and kser.

Additionally, in relation with Q and k, a single Qavg and kavg representing 4 primary coils were used. Since 4 primary coils are used, essentially 4 Qs (Q0, Q1, Q2, Q3) and 4 ks (k0, k1, k2, k3) are defined. Herein, Qn and kn respectively denote Q and k between primary coil number n and secondary coil number n. Therefore, when this is indicated as a representative single Qavg and kavg, Qavg=(Q0+Q1+Q2+Q3)/4 and kavg=(k0+k1+k2+k3)/4. In order to compute Qavg and kavg, when Q and k of a case where all of the 4 primary coils are connected in series are respectively given as Qser and kser, as shown in FIG. 16, it has been checked that Qavg and kavg are linearly proportional to Qser and kser, respectively.

FIG. 17 illustrates a graph showing a correlation between an inner radius and a figure of merit (FOM) of a secondary coil.

Referring to FIG. 17, (a) illustrates experiment results showing changes in the figure of merit (Qk) according to an increase in the inner radius (Di,Rxcoil) of the secondary coil from 10 mm to 25 mm, in a case where the number of turns (N_Rx) of subcoil type 1 is equal to 10, 11, 12, 13, 14, 15, 16. And, (b) illustrates experiment results showing changes in the figure of merit (Qk) according to an increase in the inner radius (Di,Rxcoil) of the secondary coil from 10 mm to 25 mm, in a case where the number of turns (N_Rx) of subcoil type 2 is equal to 10, 11, 12, 13, 14, 15, 16.

It is apparent that as the number of turns and inner radius increases, the figure of merit generally increases. (a) shows an overall tendency of convergence between figure of merits 40~42 at all number of turns, and (b) shows an overall tendency of convergence between figure of merits 39~41 at all number of turns.

More specifically, in (a), in case of 16 number of turns, the figure of merit shows a tendency to increase as the inner radius increases, to reach a highest value of 43 when the inner radius is within a range of 19~22 mm, to gradually decrease afterwards, and to converge at the figure of merit 42. Generally, in all of the number of turns, if the inner radius of the secondary coil is approximately 20~21 mm, the figure of merit becomes equal to 39 or more (i.e., if 43 is given as the highest value, the figure of merit is 90% or more). However, in case of 10 number of turns, the figure of merit is equal to the lowest value of 39 or less when the inner radius is within the range of 20~21 mm. Herein, since the figure of merit is equal to 90% or less, it is preferable that the number of turns is equal to 11 or more.

In (b), in case of 16 number of turns, the figure of merit shows a tendency to increase as the inner radius increases, to reach a highest value of approximately 42 when the inner radius is within a range of 19~21 mm, to gradually decrease afterwards, and to converge at the figure of merit 40. Generally, in all of the number of turns, if the inner radius of the secondary coil is approximately 19~22 mm, the figure of merit becomes equal to 38 or more (i.e., if 41 is given as the highest value, the figure of merit is 90% or more). However, in case of 10 number of turns, the figure of merit is equal to the lowest value of 38 or less when the inner radius is within the range of 19~22 mm. Herein, since the figure of merit is equal to 90% or less, it is preferable that the number of turns is equal to 11 or more.

Hereinafter, in order to compute an optimal self inductance, a correlation between the inner radius and inductance of the secondary coil has been experimented.

FIG. 18 illustrates a graph showing a correlation between an inner radius and inductance of a secondary coil.

Referring to FIG. 18, (a) illustrates experiment results showing changes in the self inductance according to an increase in the inner radius (Di,Rxcoil) of the secondary coil from 10 mm to 25 mm, in case the number of turns (N_Rx) of subcoil type 1 is 10, 11, 12, 13, 14, 15, 16. And, (b) illustrates experiment results showing changes in the self inductance according to an increase in the inner radius (Di,Rxcoil) of the secondary coil from 10 mm to 25 mm, in case the number of turns (N_Rx) of subcoil type 2 is 10, 11, 12, 13, 14, 15, 16.

Basically, regardless of the subcoil type, the self inductance increases in proportion to the number of turns. However, under a condition where the operating frequency is 120~145 kHz, if the self inductance becomes lower than 15 uH, the charging area becomes very narrow, and, if the self inductance becomes higher than 25 uH, excessive electric currents may flow through the secondary coil, which may cause problems in efficiency and safety. Therefore, the self inductance being within the range of 15~25 uH is appropriate for actual commercialization in light of efficiency and safety. That is, a combination of the number of turns and inner radius that provides the self inductance of 15~25 uH may be referred to as a valid combination most appropriate for commercialization. The range corresponding to this valid combination (valid range) is marked as the shaded area in the graph shown in FIG. 18. Accordingly, a case where the number of turns is equal to 16 or more is not preferable, since the inductance becomes higher than 25 uH.

When following the experiment results of FIG. 17 and FIG. 18, it is apparent that the preferable inner radius and number of turns for providing valid self inductance and figure of merit are 19~23 mm and 11~15, respectively, as shown below in Table 6.

TABLE 6

| Physical properties | Range of optimal value | Unit | Detail |
|---|---|---|---|
| $L_{Rx}$ | 15~25 | uH | Self inductance of secondary coil |
| $D_{i,\ Rxcoil}$ | 19~23 | mm | Inner diameter of secondary coil/2 |
| $D_{O,\ Rxcoil}$ | 36~45 | mm | Outer diameter of secondary coil/2 |
| $N_{Rxcoil}$ | 11~15 | turn | Number of turns of secondary coil |

Herein, the outer diameter may be computed in accordance with the inner diameter and the number of turns.

Hereinafter, within the preferable inner radius and number of turns proposed in Table 6, reference will be made to FIG. 19 in order to check the value providing the maximum figure of merit.

FIG. 19 illustrates markings of data corresponding to a number of turns of a valid section and inner radius of FIG. 18 among experiment data of FIG. 17. Referring to FIG. 19, in case of subcoil type 1, when the figure of merit reaches its maximum point (maximum Qk), the number of turns is equal to 13, and the inner radius is equal to 21 mm. Also, in case of subcoil type 2, when the figure of merit reaches its maximum point (maximum Qk), the number of turns is equal to 13, and the inner radius is equal to 21 mm. That is, based on the results of this experiment, it may be concluded that, even within the optimal value range of Table 3, for the maximum figure of merit Qk, the number of turns is equal to 13, and the inner radius is equal to 21 mm.

In order to provide the maximum figure of merit Qk, when a secondary coil having a number of turns of 13 and an inner radius of 21 mm is designed to be configured of 2 subcoils, the self inductance and outer radius that may be obtained accordingly are shown below in Table 7. And, in order to provide the maximum figure of merit Qk, when a secondary coil having a number of turns of 13 and an inner radius of 21 mm is designed to be configured of 3 subcoils, the self inductance and outer radius that may be obtained accordingly are shown below in Table 8.

TABLE 7

| Symbol | Value | Unit | Detail |
|---|---|---|---|
| $L_{Rx}$ | 24.5 | uH | Self inductance of secondary coil |
| $D_{i,\ Rxcoil}$ | 21 | mm | Inner diameter of secondary coil/2 |

TABLE 7-continued

| Symbol | Value | Unit | Detail |
|---|---|---|---|
| $D_{O,\,Rxcoil}$ | 40.5 | mm | Outer diameter of secondary coil/2 |
| $N_{Rxcoil}$ | 13 | turn | Number of turns of secondary coil |

TABLE 8

| Symbol | Value | Unit | Detail |
|---|---|---|---|
| $L_{Rx}$ | 24.6 | uH | Self inductance of secondary coil |
| $D_{i,\,Rxcoil}$ | 21 | mm | Inner diameter of secondary coil/2 |
| $D_{O,\,Rxcoil}$ | 42.45 | mm | Outer diameter of secondary coil/2 |
| $N_{Rxcoil}$ | 13 | turn | Number of turns of secondary coil |

In the description presented above, the design of a subcoil providing optimal figure of merit by using a subcoil structure having a thin thickness for the slimming process has been described. Hereinafter, a design of a shielding unit providing optimal figure of merit by using a shielding unit structure having a thin thickness for the slimming process will be disclosed.

The shielding unit (1020) according to the embodiment of the present disclosure is designed to be configured of a material that can efficiently create a magnetic field by a winding pattern of the secondary coil (1010) and mid power according to the embodiment of the present disclosure and that can provide excellent thermal property and electromagnetic property for mid power even at a thin thickness of 1 mm or less.

Figure 21:
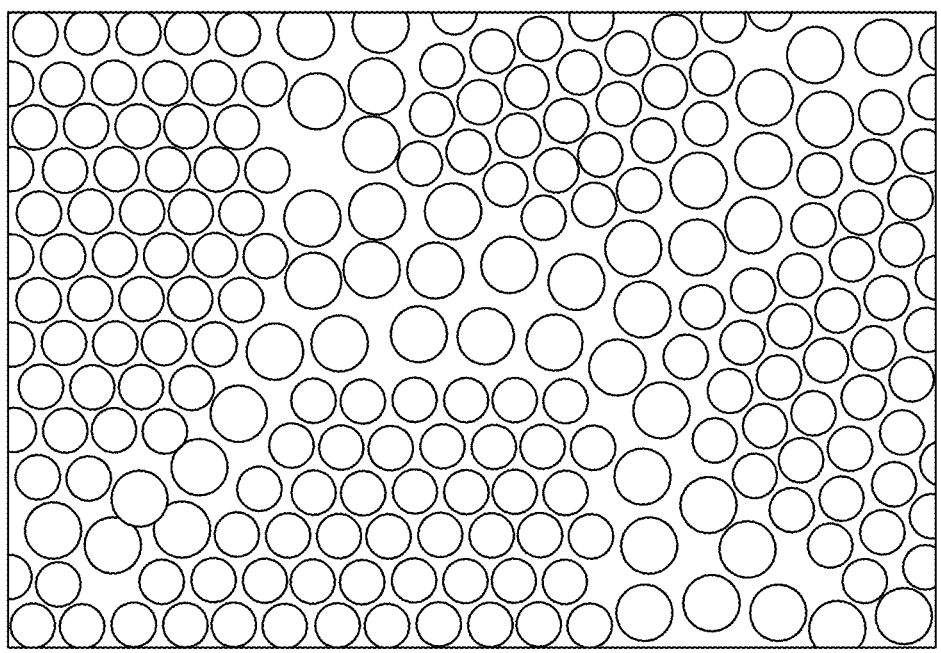
FIG. 21 illustrates a shielding unit of a nanocrystal sheet according to an embodiment of the present disclosure.

As a result of an experiment carried out by mounting the secondary coil and the shielding unit together with the battery, as shown in (a) of FIG. 20, it has been confirmed that the shielding unit (1020) is generally more easily overheated as a leakage flux intensity (leakage H-field) becomes higher, as shown in (b) of FIG. 20. The overheating of the battery of 1° C. or more at a mid power of several tens of watts (W) may lead to the danger of safety accidents (or negligent accidents). In FIG. 21(*b*), when it is provided that a marginal raising temperature of a battery is set to 1° C. for minimizing danger of safety accidents, such as battery explosion, the tolerated leakage flux intensity is 100 A/m.

Therefore, in a wireless power transmitting system of several tens of W, this experiment checks how thin the shielding unit can be fabricated within the leakage flux intensity of 100 A/m. By performing a comparison analysis of shielding units (1020) configured of materials having excellent electromagnetic and thermal properties, such as permeability, saturation flux density, conductivity, core loss, and so on, this embodiment seeks to compute an optimal thickness. Herein, the electromagnetic property becomes more excellent as the permeability becomes higher, the saturation flux density becomes higher, the conductivity becomes lower, and the core loss becomes lower.

According to an embodiment, the shielding unit (1020) may include a nanocrystal sheet, as shown in FIG. 21.

Figure 22:
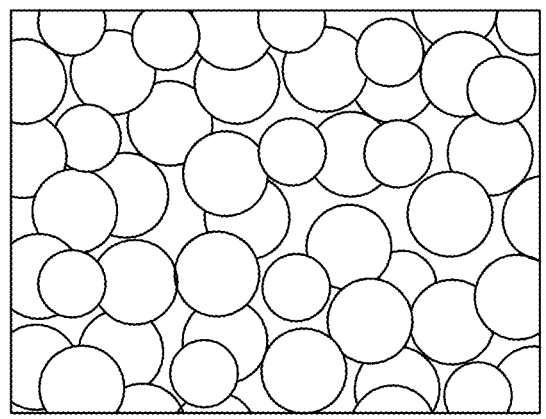
FIG. 22 illustrates a shielding unit of a nanocrystal sheet according to another embodiment of the present disclosure.

According to another embodiment, the shielding unit (1020) may include an amorphous sheet, as shown in FIG. 22.

And, according to another embodiment, the shielding unit (1020) may include a ferrite sheet. However, as compared to the nanocrystal sheet and the amorphous sheet, since the ferrite sheet has greater core loss, in the aspect of overheating in the secondary coil, the nanocrystal sheet and the amorphous sheet are more excellent than the ferrite sheet.

FIGS. 23*a* to 23*d* illustrate an example of a comparison experiment comparing correlations between a thickness and leakage flux intensity of a shielding unit of a nanocrystalline material, a shielding unit of an amorphous material, and a shielding unit of a ferrite material.

Figure 23A:
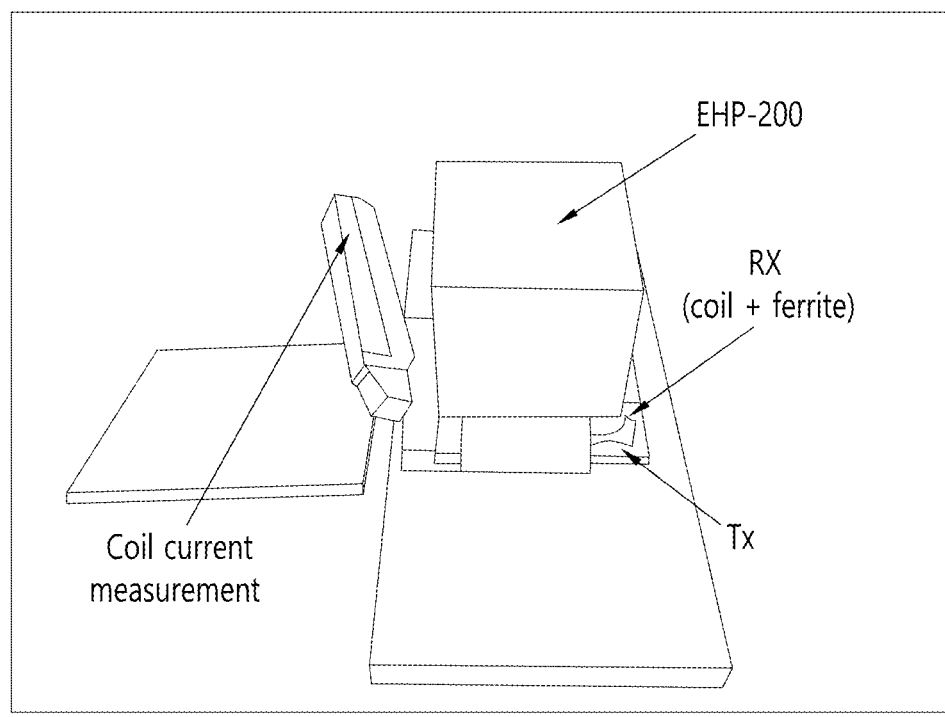
FIGS. 23a to 23d illustrate an example of a comparison experiment comparing correlations between a thickness and leakage flux intensity of a shielding unit of a nanocrystalline material, a shielding unit of an amorphous material, and a shielding unit of a ferrite material.
Figure 23B:
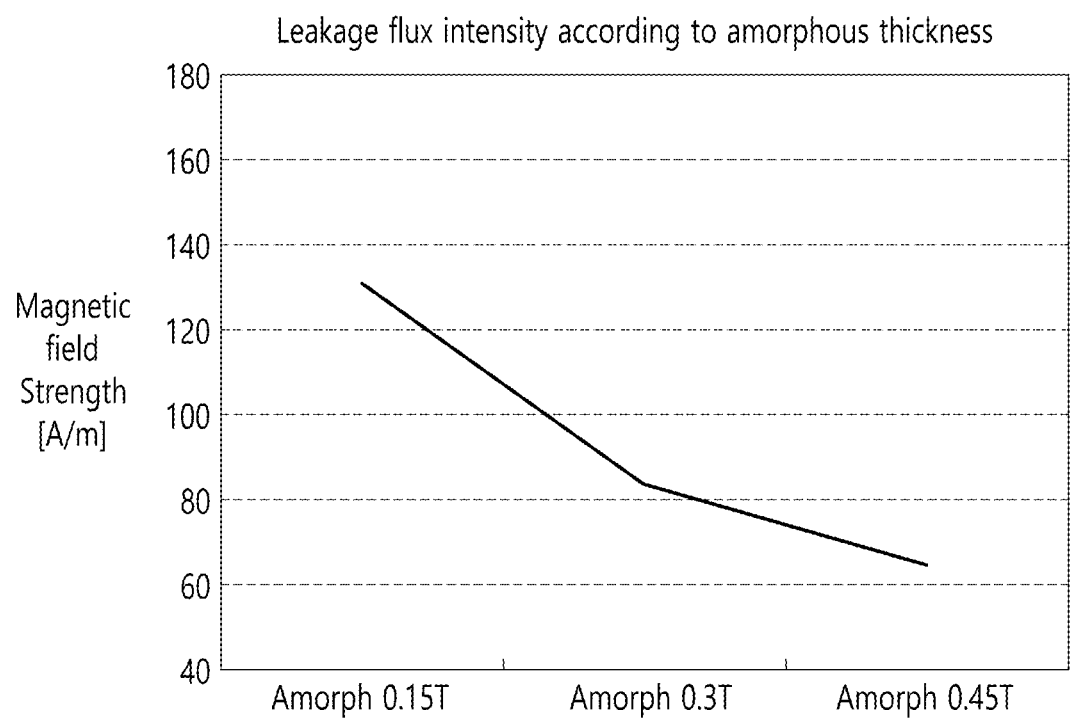
Figure 23C:
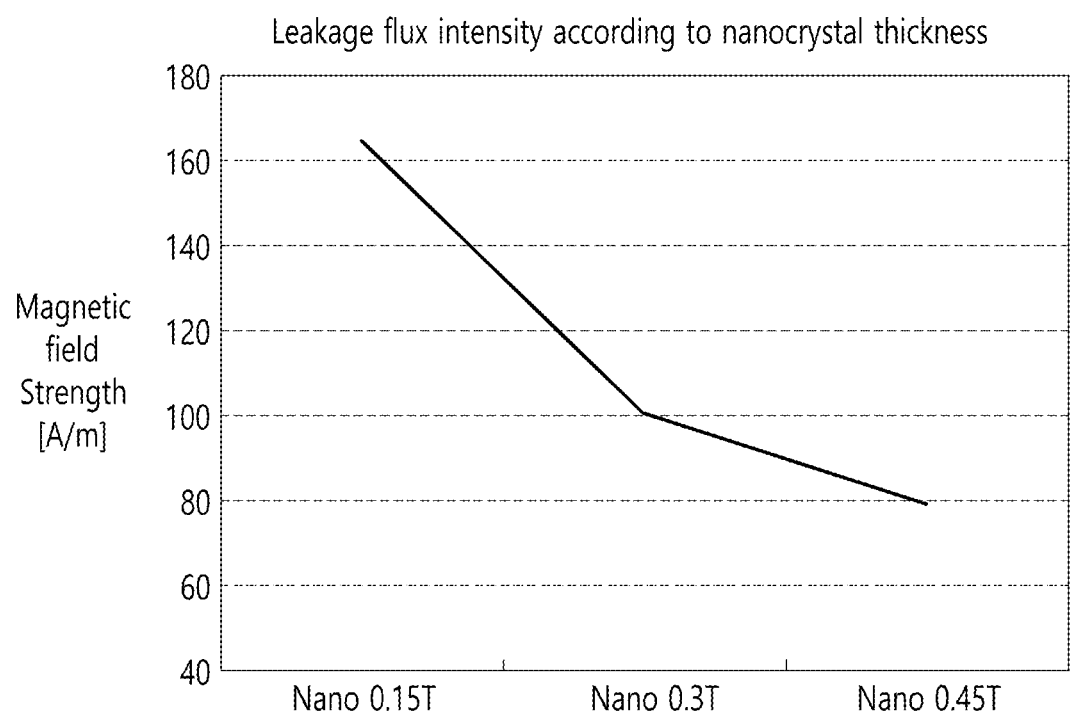
Figure 23D:
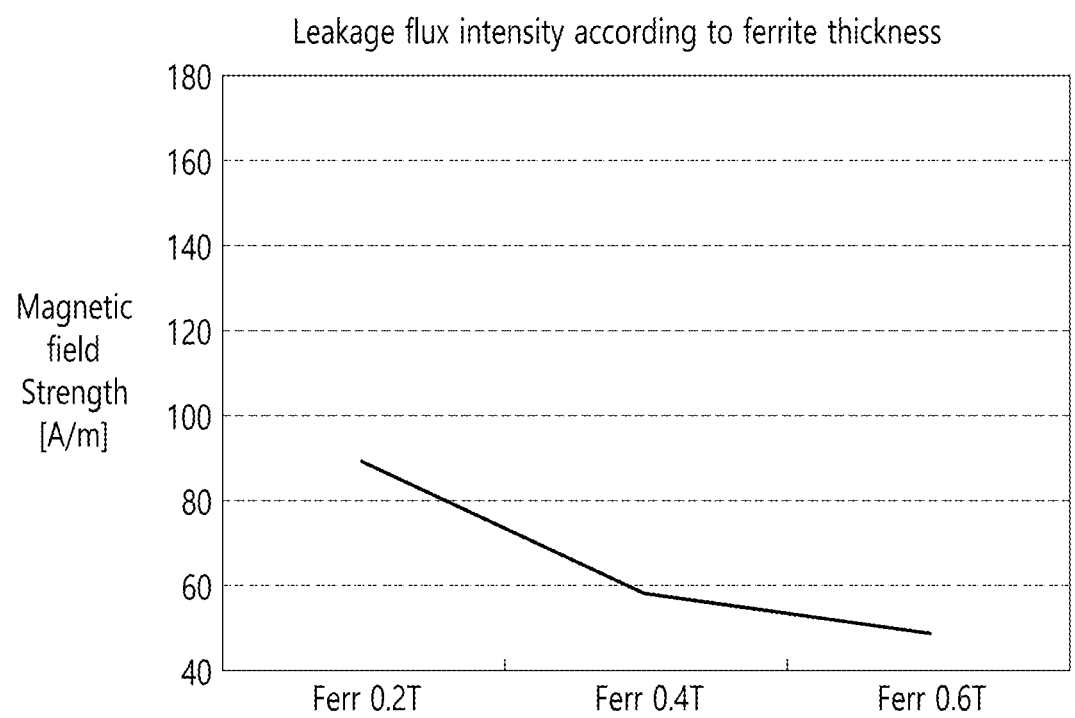

Referring to FIGS. 23*a* to 23*d*, FIG. 23*a* illustrates an experiment carried out on a leakage flux intensity per shielding unit using EHP-200, FIG. 23*b* illustrates experiment results on a correlation between the thickness of an amorphous shielding unit and the leakage flux intensity, FIG. 23*c* illustrates experiment results on a correlation between the thickness of a nanocrystal shielding unit and the leakage flux intensity, and FIG. 23*d* illustrates experiment results on a correlation between the thickness of a ferrite shielding unit and the leakage flux intensity. Herein, a shielding unit commonly having a surface area of 100 mm×100 mm has been used in this experiment.

In case of the amorphous shielding unit, the leakage flux intensity is approximately 85 A/m, when the thickness is 0.3 T (mm). In case of the nanocrystal shielding unit, the leakage flux intensity is 100 A/m, when the thickness is 0.3 T (mm). And, in case of the ferrite shielding unit, the leakage flux intensity is approximately 90 A/m, when the thickness is 0.2 T (mm).

Therefore, based on the results of the experiment, in the wireless power transmitting system of several tens of W having an operating frequency of 120~145 kHz, it has been verified that the thickness of a shielding unit that can be operated within a marginal raising temperature of 1° C. is equal to 0.2 T or more or 0.3 T or more. In case of the shielding unit configured of the nanocrystal material has a thickness of 0.2 T, the leakage flux intensity becomes 100 A/m or more. Therefore, preferably, the thickness that can be commonly applied to all shielding units being configured the nanocrystal material, the amorphous material, and the ferrite material is at least 0.3 T. Alternatively, it may be preferable for the thickness of the shielding unit to be within a range of 0.2 T–1 T or 0.3 T–1 T. When using the shielding unit (1020) according to the embodiment of the present disclosure, the slim-size (or slimming) and light-weight of the wireless power receiver (1000) may be achieved.

A combination of the optimal designs of the secondary coil and the shielding unit may be shown below in Table 9 and Table 10. Table 9 is a case where the secondary coil is configured of 2 subcoils, and Table 10 is a case where the secondary coil is configured of 3 subcoils.

TABLE 9

| Component | Symbol | Value | Unit | Detail |
|---|---|---|---|---|
| Secondary coil | $L_{Rx}$ | 24.5 | uH | Self inductance of secondary coil |
|  | $D_{i,\,Rxcoil}$ | 21 | mm | Inner diameter of secondary coil/2 |
|  | $D_{O,\,Rxcoil}$ | 40.5 | mm | Outer diameter of secondary coil/2 |
|  | $NR_{xcoil}$ | 13 | turn | Number of turns of secondary coil |
| Shielding unit | $x_{Rxfer}$ | 100 | mm | X-axis length of shielding unit |
|  | $y_{Rxfer}$ | 100 | mm | Y-axis length of shielding unit |
|  | $t_{Rxfer}$ | 0.3 | mm | Thickness of shielding unit |

TABLE 10

| Component | Symbol | Value | Unit | Detail |
|---|---|---|---|---|
| Secondary coil | $L_{Rx}$ | 24.6 | uH | Self inductance of secondary coil |
| | $D_{i, Rxcoil}$ | 21 | mm | Inner diameter of secondary coil/2 |
| | $D_{O, Rxcoil}$ | 42.45 | mm | Outer diameter of secondary coil/2 |
| | $NR_{xcoil}$ | 13 | turn | Number of turns of secondary coil |
| Shielding unit | $x_{Rxfer}$ | 100 | mm | X-axis length of shielding unit |
| | $y_{Rxfer}$ | 100 | mm | Y-axis length of shielding unit |
| | $t_{Rxfer}$ | 0.3 | mm | Thickness of shielding unit |

In the description presented above, an optimal design method of the secondary coil and the shielding unit for the slimming of the wireless power receiver (1000) has been disclosed. Hereinafter, additional embodiments for the slimming of the wireless power receiver (1000) will be disclosed.

Figure 25:
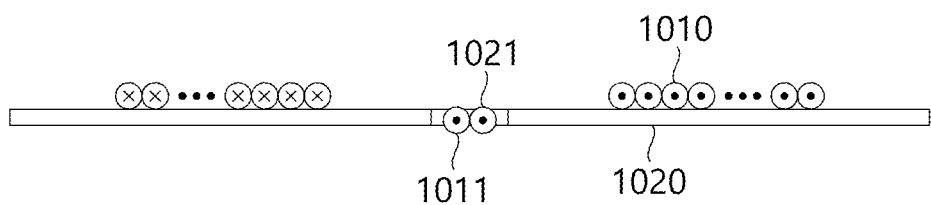
FIG. 25 illustrates a side cross-sectional view of a secondary coil and a shielding unit according to an embodiment of the present disclosure.

FIG. 24 illustrates a perspective view and a bottom view of a secondary coil and a shielding unit according to an embodiment of the present disclosure, and FIG. 25 illustrates a side cross-sectional view of a secondary coil and a shielding unit according to an embodiment of the present disclosure. (a) of FIG. 24 illustrates a perspective view of the secondary coil and the shielding unit, and (b) of FIG. 24 illustrates a bottom view of the secondary coil and the shielding unit.

Referring to FIG. 24 and FIG. 25, the shielding unit (1020) includes a coil accommodating slit (1021), which is formed on one side of the shielding unit (1020) so as to be exposed in order to accommodate at least part of the secondary coil (1010). That is, the coil accommodating slit (1021) passes through from an inside of the shielding unit (1020) to a side surface of the shielding unit (1020). The secondary coil (1010) includes 2 terminals, an inner terminal (1011) and an outer terminal (1012). The inner terminal (1011) is led into the shielding unit (1020) through a position corresponding to the inner radius of the secondary coil (1010), while being bent toward the bottom surface of the shielding unit (1010), so as to extendedly pass through one side surface of the shielding unit (1020) and then led out to the outside. That is, the coil accommodating slit (1021) includes an inlet (1022) through which the inner terminal (1011) of the secondary coil (1010) is led in, and an outlet (1023) through which the inner terminal (1011) is led out to the outside.

A width W1 of the coil accommodating slit (1021) may at least be equal to or thicker than the thickness of the secondary coil. For example, in case the secondary coil is configured of 2 subcoils, the width W1 of the coil accommodating slit (1021) may be equal to or thicker than the added thickness of the 2 subcoils.

A length L1 of the coil accommodating slit (1021) may be defined as a distance between the inlet (1022) and the outlet (1023). The length L1 may be equal to or greater than a track width (=outer diameter-inner diameter) of the secondary coil.

The shape (or form) of the coil accommodating slit (1021) is defined as an extended path from the inlet (1022) to the outlet (1023). For example, the shape (or form) of the coil accommodating slit (1021) may be formed in the shape of a straight line having the shortest distance, or may be formed as a zigzag-shape path or any other random shaped path.

According to the design requirement, the outlet (1023) may be positioned at any one vertex of the shielding unit (1020)

In case the shielding unit (1020) is not equipped with a coil accommodating slit (1021), since the inner terminal (1011) is led out to the outside along the surface of the secondary coil (1010), a thickness of the combination of the secondary coil (1010) and the shielding unit (1020) is defined as (thickness of secondary coil×2+ thickness of shielding unit). Conversely, as the coil accommodating slit (1021) according to the embodiment of the present disclosure accommodates the inner terminal (1011) of the secondary coil (1010), the thickness of the combination of the secondary coil (1010) and the shielding unit (1020) may be defined as (thickness of secondary coil×2). Thus, the gain of slimming may be achieved as much as the thickness of the shielding unit.

In what follows, a new type of wireless power transmitter capable of expanding the application range and increasing power transmission efficiency through a structural improvement in a wireless charging system will be disclosed.

As described above based on Eqs. 1 and 2, to improve the power transmission efficiency between a wireless power transmitter and a wireless power receiver, $Q_k$, which is an effective figure of merit (FOM) for a wireless power transmission system, should be maximized (or optimized).

In particular, between quality factor Q and coupling coefficient k, the quality factor Q becomes larger as the resistance R gets smaller according to Eq. 1. Therefore, if the resistance of a primary coil of a wireless power transmitter is designed to be small, the value of the quality factor Q becomes large to increase the figure of merit $Q_k$.

A wireless power transmitter according to the embodiments of the present disclosure described below is designed to have lower resistance for the primary coil compared to conventional wireless power transmitters, and thereby, the value of the quality factor Q is increased, which results in a higher figure of merit $Q_k$.

Figure 26:
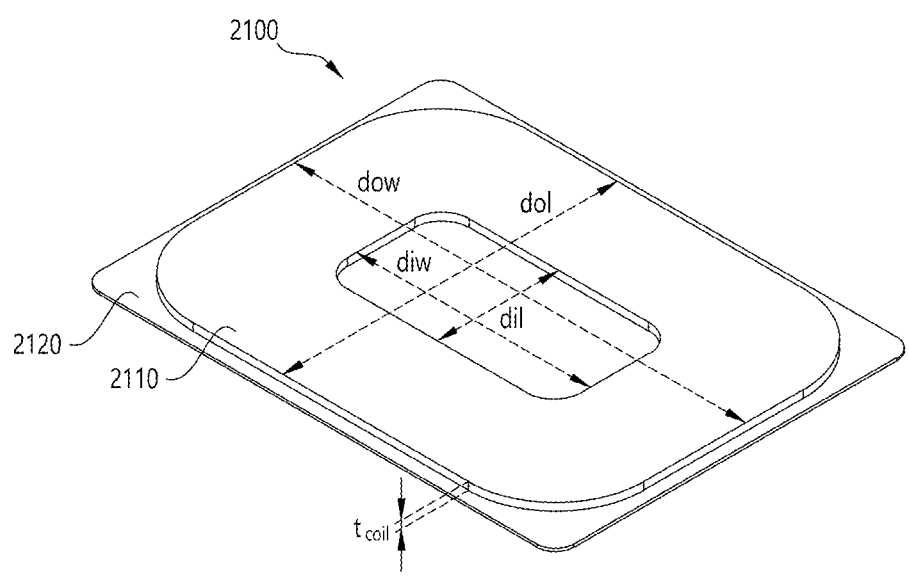
FIG. 26 is a perspective view of a primary coil and a shielding member of a wireless power transmitter according to one embodiment of the present disclosure.
Figure 27:
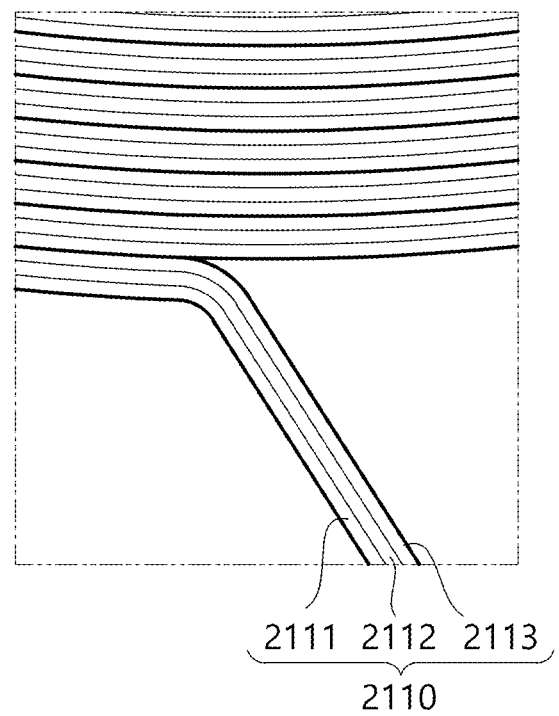
FIG. 27 shows a portion of a primary coil consisting of three subcoils.

FIG. 26 is a perspective view of a primary coil and a shielding member of a wireless power transmitter according to one embodiment of the present disclosure, and FIG. 27 shows a portion of a primary coil consisting of three subcoils.

Referring to FIG. 26, a wireless power transmitter 2100 according to one embodiment comprises a primary coil 2110 and a shielding member 2120.

The primary coil 2110 is wound in a planar spiral pattern and disposed on one surface of the shielding member 2120. The primary coil 2110 may be made of litz coil.

The primary coil 2110 may be formed by winding a single thin coil for miniaturization and thin fabrication of the wireless power transmitter. However, since the coil resistance is inversely proportional to the cross-section of a conducting wire, when the primary coil is made up of only one thin coil, increased resistance may cause heat to be generated and power transmission efficiency to be decreased.

Referring to FIGS. 26 and 27, the primary coil 2110 of the wireless power transmitter 2100 according to the present disclosure is formed by parallelly winding several thin subcoils 2111, 2112, 2113 on the same plane. In other words, a plurality of subcoils 2111, 2112, 2113 having a thickness of T mm are wound in parallel on the same plane while being in contact with each other to form the primary coil 2110 having an inner diameter and an outer diameter. The winding pattern for the primary coil may be a planar spiral shape; however, it does not necessarily have to be limited to the specific shape, and various patterns based on a square, oval, or triangular shape are equally allowed.

One end of the subcoils 2111, 2112, 2113 may be electrically connected to a first terminal on a substrate (not shown in the figure) within the wireless power transmitter 2100, and the other end may be electrically connected to a second terminal on the substrate. Each subcoil 2111, 2112, 2113 may be electrically connected in parallel. For example, in the case of a primary coil consisting of three subcoils 2111, 2112, 2113, one end of the first subcoil, one end of the second subcoil, and one end of the third subcoil are connected together to the first terminal; and the other end of the first subcoil, the other end of the second subcoil, and the other end of the third subcoil may be connected together to the second terminal.

Referring to FIG. 27, the primary coil 2110 of the wireless power transmitter 2100 according to the present embodiment may consist of three subcoils 2111, 2112, 2113 electrically connected in parallel with each other. Each subcoil 2111, 2112, 2113 may be a litz wire composed of 100 strands of conducting wires having a diameter of 0.05 mm. The primary coil 2110 may be formed by winding the three subcoils 2111, 2112, 2113 packed into one bundle.

Referring to FIG. 26, detailed specifications of the primary coil 2110 of the wireless power transmitter 2100 according to the present embodiment may be configured as shown in Table 11 below.

TABLE 11

| Symbol | Value | Unit | Parameter |
|---|---|---|---|
| $d_{ow}$ | 80 | mm | Outer length of major axis |
| $d_{ol}$ | 60 | mm | Outer length of minor axis |
| $d_{iw}$ | 41 | mm | Inner length of major axis |
| $d_{il}$ | 21 | mm | Inner length of minor axis |
| $t_{coil}$ | 0.75 | mm | Thickness of each subcoil |
| $W_{coil}$ | 0.65 | mm | Width of each sub coil |
| N | 10 | Turns | Number of turns |

That the number of turns of the primary coil 2110 is 10 means that the three subcoils 2111, 2112, 2113 have been wound 10 times.

From the simulation based on the physical parameters according to Table 11, it was determined that the inductance of the primary coil 2110 was 10.8 pH, and the quality factor Q at 100 kHz was 330.8.

Since the primary coil 2110 is formed using the thin subcoils 2111, 2112, 2113 having a thickness of about 0.75 mm, the primary coil 2110 may be made to have a thin overall thickness. Since the primary coil 2110 is formed by winding three subcoils 2111, 2112, 2113 electrically connected in parallel, the equivalent cross-sectional area of the primary coil 2110 is enlarged to make the thickness of the primary coil 2110 thinner, thereby preventing the resistance of the primary coil 2110 from being increased.

As a result, since the wireless power transmitter 2100 according to the present embodiment keeps the resistance of the primary coil 2110 low or lowers the resistance while forming the thickness $t_{coil}$ of the primary coil 2110 to be thin, the figure of merit $Q_k$ may be improved.

In what follows, a reference secondary coil for determining the figure of merit $Q_k$ of the wireless power transmitter 2100 described above will be described.

Figure 28:
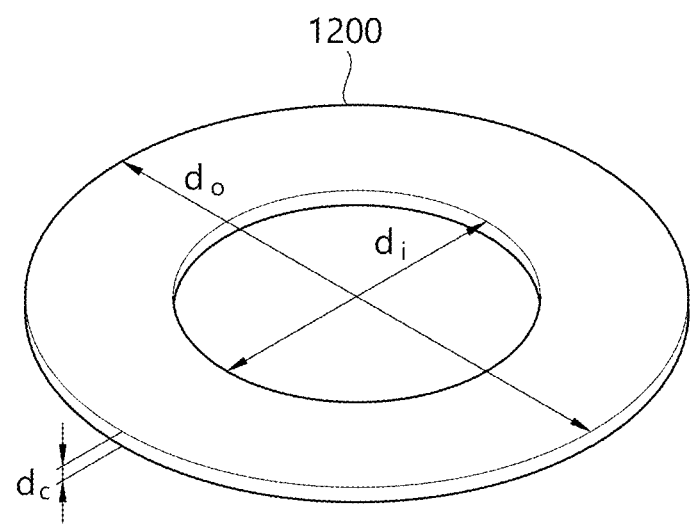
FIG. 28 is a perspective view of a reference secondary coil.

FIG. 28 is a perspective view of a reference secondary coil. The reference secondary coil 1200 of FIG. 28 is a model defined as Test Power Receiver #MP1B (TPR #MP1B) in the $Q_i$ specification.

Table 12 shows the parameters of TPR #MP1B.

TABLE 12

| Parameter | Symbol | Minimum | Target | Maximum | Unit |
|---|---|---|---|---|---|
| Outer diameter | do | 45 | 47 | 49 | mm |
| Inner diameter | di | 27.75 | 28 | 28.25 | mm |
| Thickness | dc | 1.7 | 1.8 | 1.9 | mm |
| Number of turns per layer | N | 9.8 | 10 | 10.2 | N/A |
| Number of layers | — | 2 | 2 | 2 | N/A |

Figure 29:
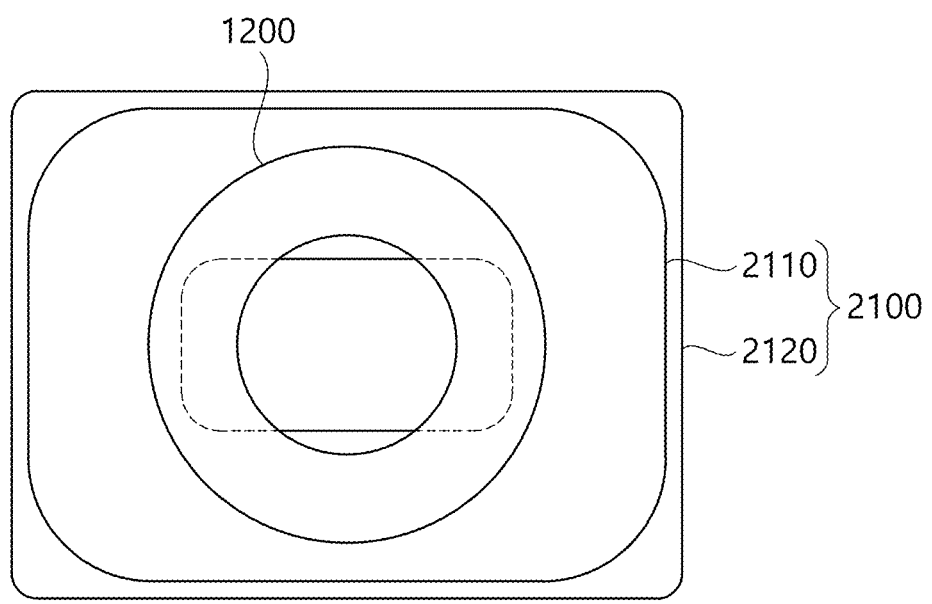
FIG. 29 illustrates a method for determining a figure of merit of a wireless power transmitter according to one embodiment using a reference secondary coil.
Figure 30:
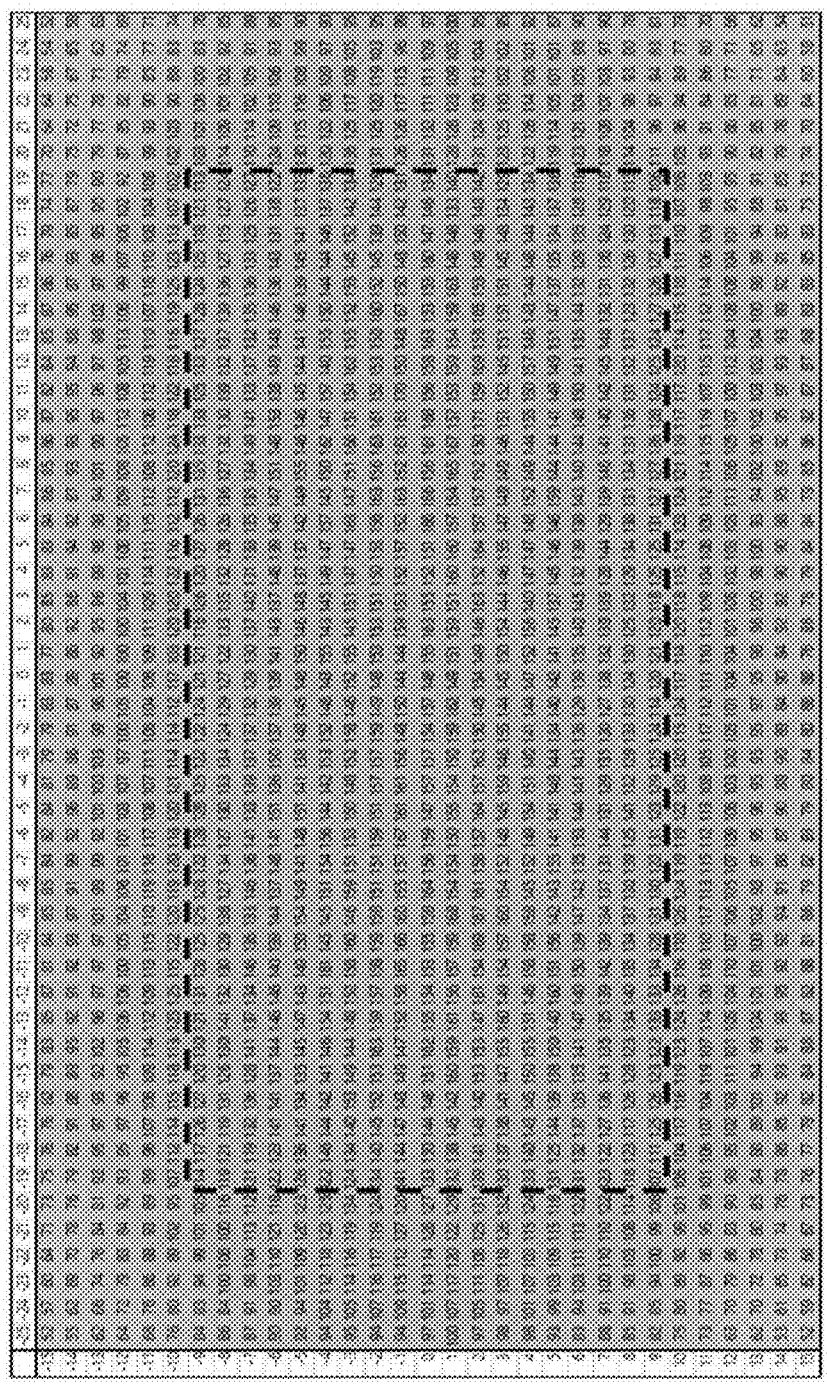
FIG. 30 shows the figure of merit of a wireless power transmitter according to one embodiment, which is measured based on the method of FIG. 29.

FIG. 29 illustrates a method for determining a figure of merit of a wireless power transmitter according to one embodiment using a reference secondary coil, and FIG. 30 shows the figure of merit of a wireless power transmitter according to one embodiment, which is measured based on the method of FIG. 29.

Referring to FIG. 29, after the reference secondary coil 1200 was positioned on top of the wireless power transmitter 2100 so that the centers of the reference secondary coil 1200 and the primary coil 2110 coincide with each other, the reference secondary coil 1200 was moved at intervals of 1 mm within a range of ±15 mm in the forward and backward directions and within a range of ±25 mm in the left and right directions in parallel to the wireless power transmitter 2100 while the distance between the reference secondary coil 1200 and the primary coil 2110 was maintained at 4 mm, and the figure of merit $Q_k$ was measured at each movement point. Referring to FIG. 30, the figure of merit $Q_k$ was measured at a total of 1500 points (50*30).

Referring to FIG. 30, the figure of merit $Q_k$ was measured to be 50 or higher at every movement point, and the figure of merit $Q_k$ was measured to be equal to or greater than 100 in the area indicated by a dotted line.

Figure 31:
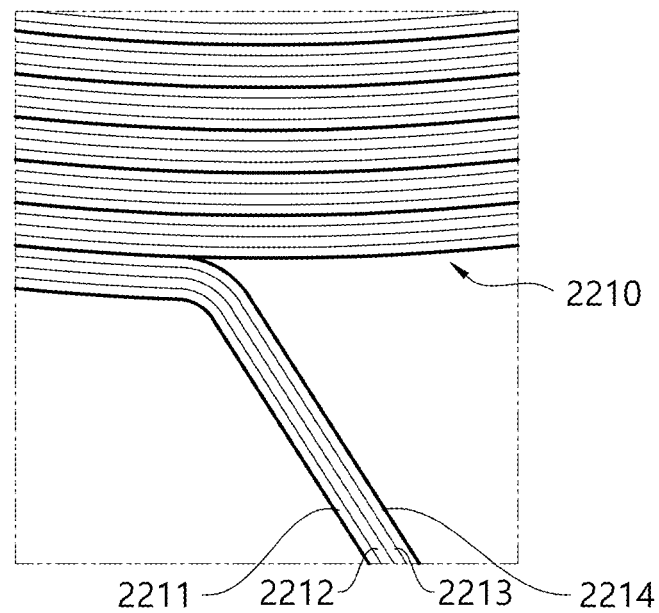
FIG. 31 shows a portion of a primary coil consisting of four subcoils according to another embodiment.

FIG. 31 shows a portion of a primary coil consisting of four subcoils according to another embodiment.

Compared to the primary coil 2110 described with reference to FIGS. 26 and 27, the primary coil 2210 according to the present embodiment may consist of four subcoils 2211, 2212, 2213, 2214 electrically connected in parallel with each other. Each subcoil 2211, 2212, 2213, 2214 may be a litz wire composed of 65 strands of conducting wires having a diameter of 0.05 mm. The primary coil 2210 may be formed by winding the four subcoils 2211, 2212, 2213, 2214 packed into one bundle.

Detailed specifications of the primary coil 2210 of the wireless power transmitter according to the present embodiment may be configured as shown in Table 13 below.

TABLE 13

| Symbol | Value | Unit | Parameter |
|---|---|---|---|
| $d_{ow}$ | 80 | mm | Outer length of major axis |
| $d_{ol}$ | 60 | mm | Outer length of minor axis |
| $d_{iw}$ | 41.6 | mm | Inner length of major axis |
| $d_{il}$ | 21.6 | mm | Inner length of minor axis |
| $t_{coil}$ | 0.55 | mm | Thickness of each subcoil |
| $w_{coil}$ | 0.48 | mm | Width of each subcoil |
| N | 10 | Turns | Number of turns |

Comparing Tables 11 and 13, the primary coil 2210 according to the present embodiment differs from the primary coil 2110 described above in terms of the inner length of major axis $d_{iw}$, inner length of minor axis $d_{il}$, thickness of each subcoil $t_{coil}$, and width of each subcoil $w_{coil}$.

While each of the subcoils 2111, 2112, 2113 of the primary coil 2110 described above consists of 100 strands of conducting wires having a diameter of 0.05 mm, each of the subcoils 2211, 2212, 2213, 2214 of the primary coil 2210 according to the present embodiment consists of 65 strands of conducting wires having a diameter of 0.05 mm. Accordingly, the thickness $t_{coil}$ of each subcoil and the width $w_{coil}$ of each subcoil of the primary coil 2210 according to the present embodiment are smaller than those of the primary coil 2110 described above.

Also, while the primary coil 2110 described above is formed by winding the three subcoils 2111, 2112, 2113 packed into one bundle five times, the primary coil 2210 according to the present embodiment is formed by winding the four subcoils 2211, 2212, 2213, 2214 packed into one bundle five times. Therefore, the inner length $d_{iw}$ of major axis and the inner length $d_{il}$ of minor axis of the primary coil 2210 according to the present embodiment differ from those of the primary coil 2110 described above.

From the simulation based on the physical parameters according to Table 13, it was determined that the inductance of the primary coil 2210 was 11.1 pH, and the quality factor Q at 100 kHz was 244.2.

Figure 32:
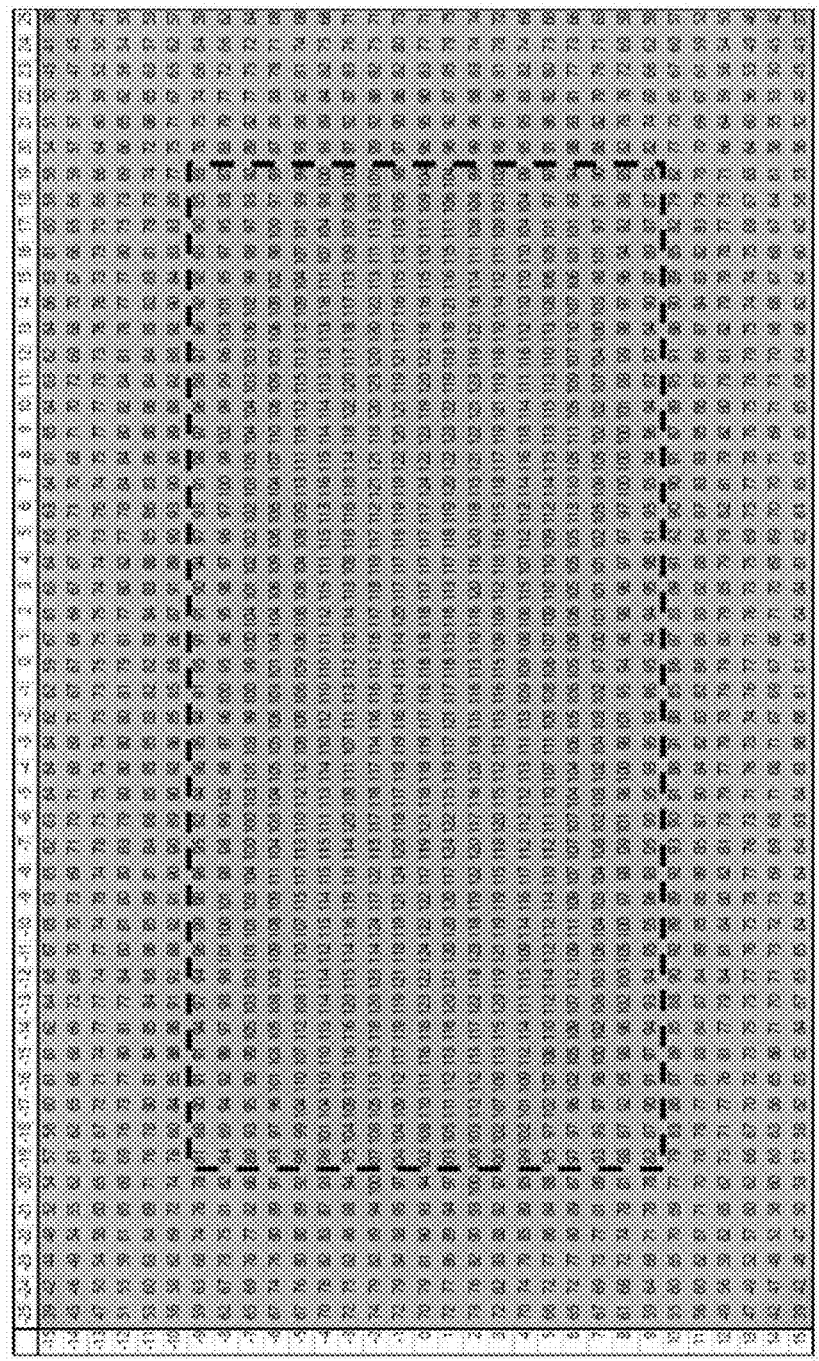
FIG. 32 shows the figure of merit of a wireless power transmitter including the primary coil of FIG. 31.

FIG. 32 shows the figure of merit of a wireless power transmitter including the primary coil of FIG. 31. FIG. 32 shows the figure of merit $Q_k$ measured at a total of 1500 points using the method for measuring figure of merit described with reference to FIG. 29.

Referring to FIG. 32, the figure of merit $Q_k$ was measured to be 35 or higher at every movement point, and the figure of merit $Q_k$ was measured to be equal to or greater than 80 in the area the same as the rectangular area of FIG. 30 indicated by a dotted line.

Figure 33:
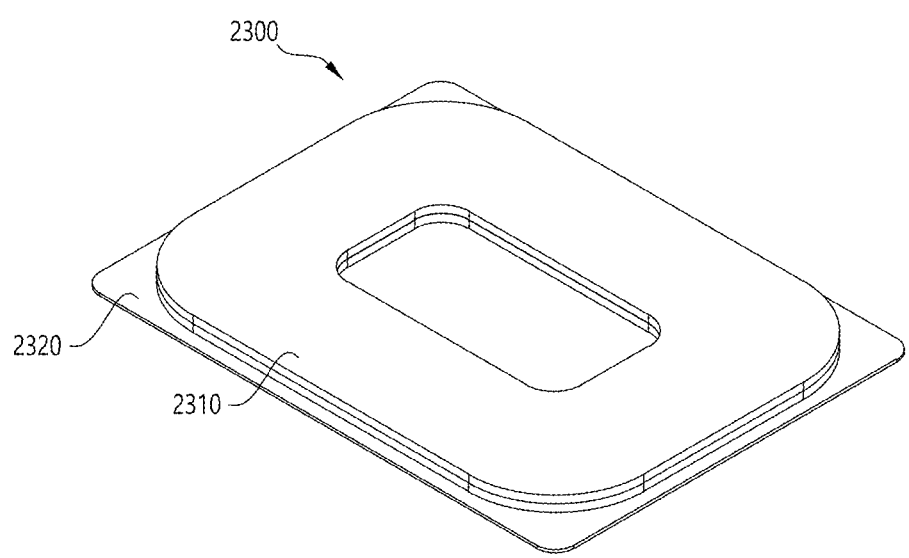
FIG. 33 is a perspective view of a primary coil and a shielding member of a wireless power transmitter according to another embodiment.
Figure 34:
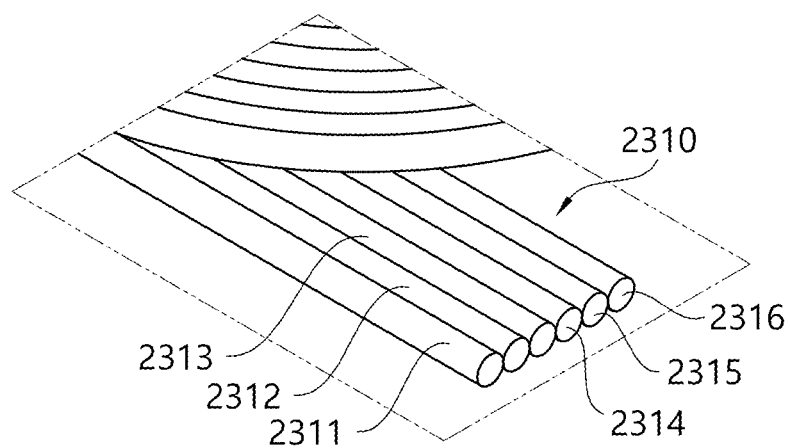
FIG. 34 shows a portion of the primary coil of FIG. 33.

FIG. 33 is a perspective view of a primary coil and a shielding member of a wireless power transmitter according to another embodiment, and FIG. 34 shows a portion of the primary coil of FIG. 33.

Referring to FIG. 33, the wireless power transmitter 2300 according to the present embodiment also comprises a primary coil 2310 and a shielding member 2320.

Referring to FIG. 33, however, it should be noted that compared with the primary coil 2110 described with reference to FIGS. 26 and 27, the primary coil 2310 according to the present embodiment consists of two layers.

Also, referring to FIG. 34, the primary coil 2310 according to the present embodiment may consist of six subcoils 2311, 2312, 2313, 2314, 2315, 2316 electrically connected in parallel with each other. Each subcoil 2311, 2312, 2313, 2314, 2315, 2316 may be a litz wire composed of 100 strands of conducting wires having a diameter of 0.05 mm. The primary coil 2310 may be formed by winding the six subcoils 2311, 2312, 2313, 2314, 2315, 2316 packed into one bundle.

Detailed specifications of the primary coil 2310 of the wireless power transmitter according to the present embodiment may be configured as shown in Table 14 below.

TABLE 14

| Symbol | Value | Unit | Parameter |
| --- | --- | --- | --- |
| $d_{ow}$ | 80 | mm | Outer length of major axis |
| $d_{ol}$ | 60 | mm | Outer length of minor axis |
| $d_{iw}$ | 41 | mm | Inner length of major axis |
| $d_{il}$ | 21 | mm | Inner length of minor axis |
| $t_{coil}$ | 0.75 | mm | Thickness of each subcoil |
| $w_{coil}$ | 0.65 | mm | Width of each sub coil |
| N | 5 | Turns | Number of turns per layer |

Comparing Tables 11 and 14, the primary coil 2310 according to the present embodiment differs from the primary coil 2110 described above in terms of the number of turns per layer.

While the primary coil 2110 described above consists of three subcoils 2111, 2112, 2113 made of 10 turns, the primary coil 2310 according to the present embodiment is made up of two layers in which six subcoils 2311, 2312, 2313, 2314, 2315, 2316 are in contact with each other and wound spirally in parallel with each other, where the six subcoils 2311, 2312, 2313, 2314, 2315, 2316 are made of 5 turns in each layer. Accordingly, the outer length $d_{ow}$ of major axis, outer length $d_{ol}$ of minor axis, inner length $d_{iw}$ of major axis, and inner length $d_{il}$ of minor axis of the primary coil 2310 according to the present embodiment are the same as those of the primary coil 2110 described above.

From the simulation based on the physical parameters according to Table 14, it was determined that the inductance of the primary coil 2310 was 10.5 μH, and the quality factor Q at 100 kHz was 641.1.

Figure 35:
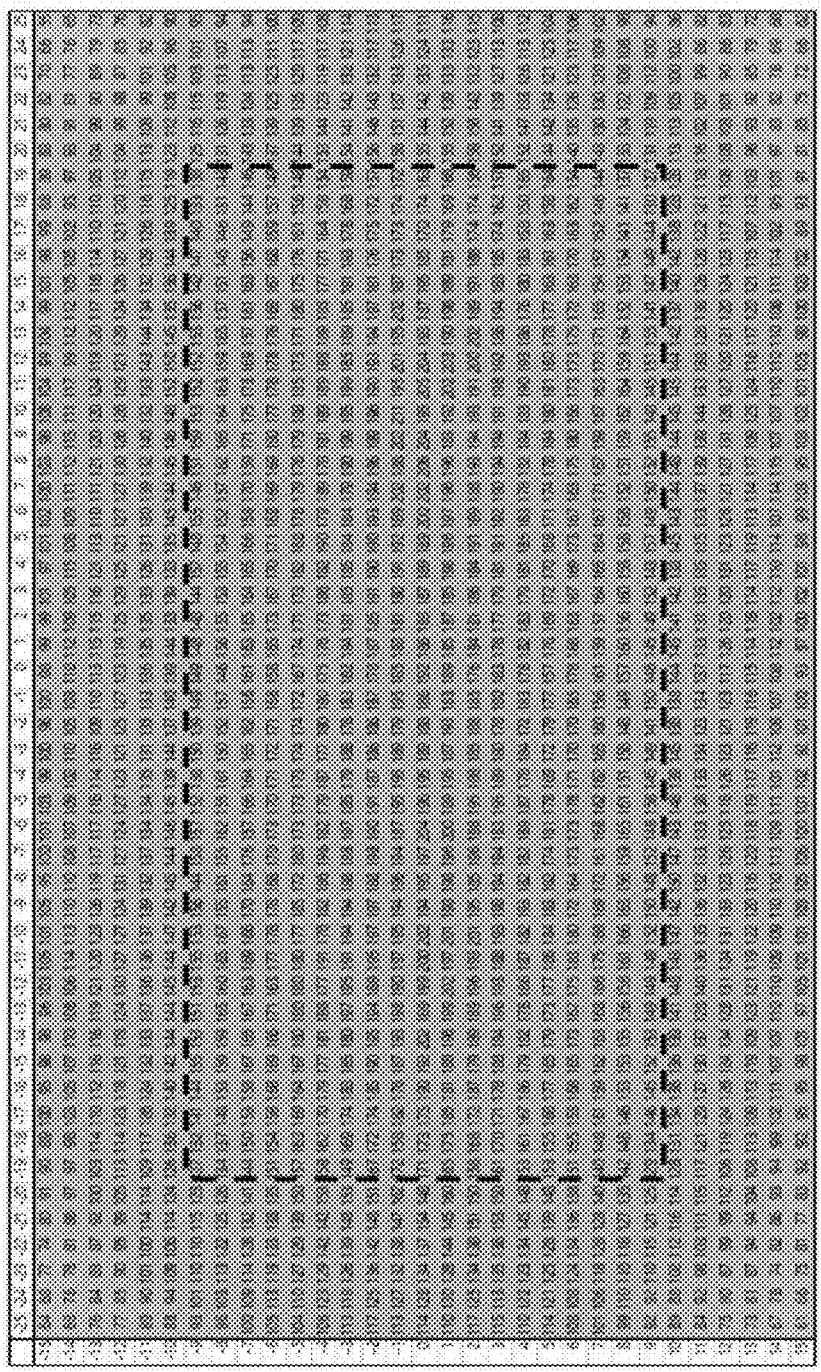
FIG. 35 shows the figure of merit of a wireless power transmitter including the primary coil of FIG. 34.

FIG. 35 shows the figure of merit of a wireless power transmitter including the primary coil of FIG. 34. FIG. 35 shows the figure of merit $Q_k$ measured at a total of 1500 points using the method for measuring figure of merit described with reference to FIG. 29.

Referring to FIG. 35, the figure of merit $Q_k$ was measured to be 35 or higher at every movement point, and the figure of merit $Q_k$ was measured to be equal to or greater than 120 in the area the same as the rectangular area of FIG. 30 indicated by a dotted line.

Figure 36:
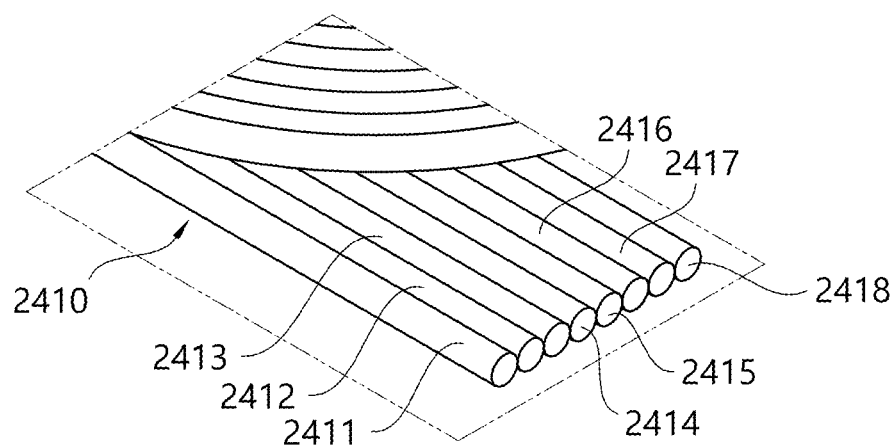
FIG. 36 shows a portion of a primary coil consisting of eight subcoils according to yet another embodiment.

FIG. 36 shows a portion of a primary coil consisting of eight subcoils according to yet another embodiment.

Compared to the primary coil 2310 described with reference to FIGS. 33 and 34, the primary coil 2410 according to the present embodiment may consist of eight subcoils 2411, 2412, 2413, 2414, 2415, 2416, 2417, 2418 electrically connected in parallel with each other.

The primary coil 2410 according to the present embodiment is also made up of two layers in which eight subcoils 2411, 2412, 2413, 2414, 2415, 2416, 2417, 2418 are in contact with each other and wound spirally in parallel with each other.

Each subcoil 2411, 2412, 2413, 2414, 2415, 2416, 2417, 2418 may be a litz wire composed of 65 strands of conducting wires having a diameter of 0.05 mm. The primary coil 2410 may be formed by winding the eight subcoils 2411, 2412, 2413, 2414, 2415, 2416, 2417, 2418 packed into one bundle.

Detailed specifications of the primary coil 2410 of the wireless power transmitter according to the present embodiment may be configured as shown in Table 15 below.

TABLE 15

| Symbol | Value | Unit | Parameter |
| --- | --- | --- | --- |
| $d_{ow}$ | 80 | mm | Outer length of major axis |
| $d_{ol}$ | 60 | mm | Outer length of minor axis |
| $d_{iw}$ | 41.6 | mm | Inner length of major axis |
| $d_{il}$ | 21.6 | mm | Inner length of minor axis |
| $t_{coil}$ | 0.55 | mm | Thickness of each subcoil |
| $w_{coil}$ | 0.48 | mm | Width of each subcoil |
| N | 5 | Turns | Number of turns per layer |

Comparing Tables 14 and 15, the primary coil 2410 according to the present embodiment differs from the primary coil 2310 described above in terms of the inner length $d_{iw}$ of major axis, inner length $d_{il}$ of minor axis, thickness $t_{coil}$ of each subcoil, and width $w_{coil}$ of each subcoil.

While each of the subcoils 2311, 2312, 2313, 2314, 2315, 2316 of the primary coil 2310 described above consists of 100 strands of conducting wires having a diameter of 0.05 mm, each of the subcoils 2411, 2412, 2413, 2414, 2415, 2416, 2417, 2418 of the primary coil 2410 according to the present embodiment consists of 65 strands of conducting wires having a diameter of 0.05 mm. Accordingly, the thickness $t_{coil}$ of each subcoil and the width $w_{coil}$ of each subcoil of the primary coil 2410 according to the present embodiment are smaller than those of the primary coil 2310 described above.

Also, while the primary coil 2310 described above is formed by winding the six subcoils 2311, 2312, 2313, 2314, 2315, 2316 packed into one bundle five times, the primary coil 2410 according to the present embodiment is formed by winding the eight subcoils 2411, 2412, 2413, 2414, 2415, 2416, 2417, 2418 packed into one bundle five times. Therefore, the inner length $d_{iw}$ of major axis and the inner length $d_{il}$ of minor axis of the primary coil 2410 according to the present embodiment differ from those of the primary coil 2310 described above.

From the simulation based on the physical parameters according to Table 15, it was determined that the inductance of the primary coil 2410 was 10.8 μH, and the quality factor Q at 100 kHz was 472.5.

Figure 37:
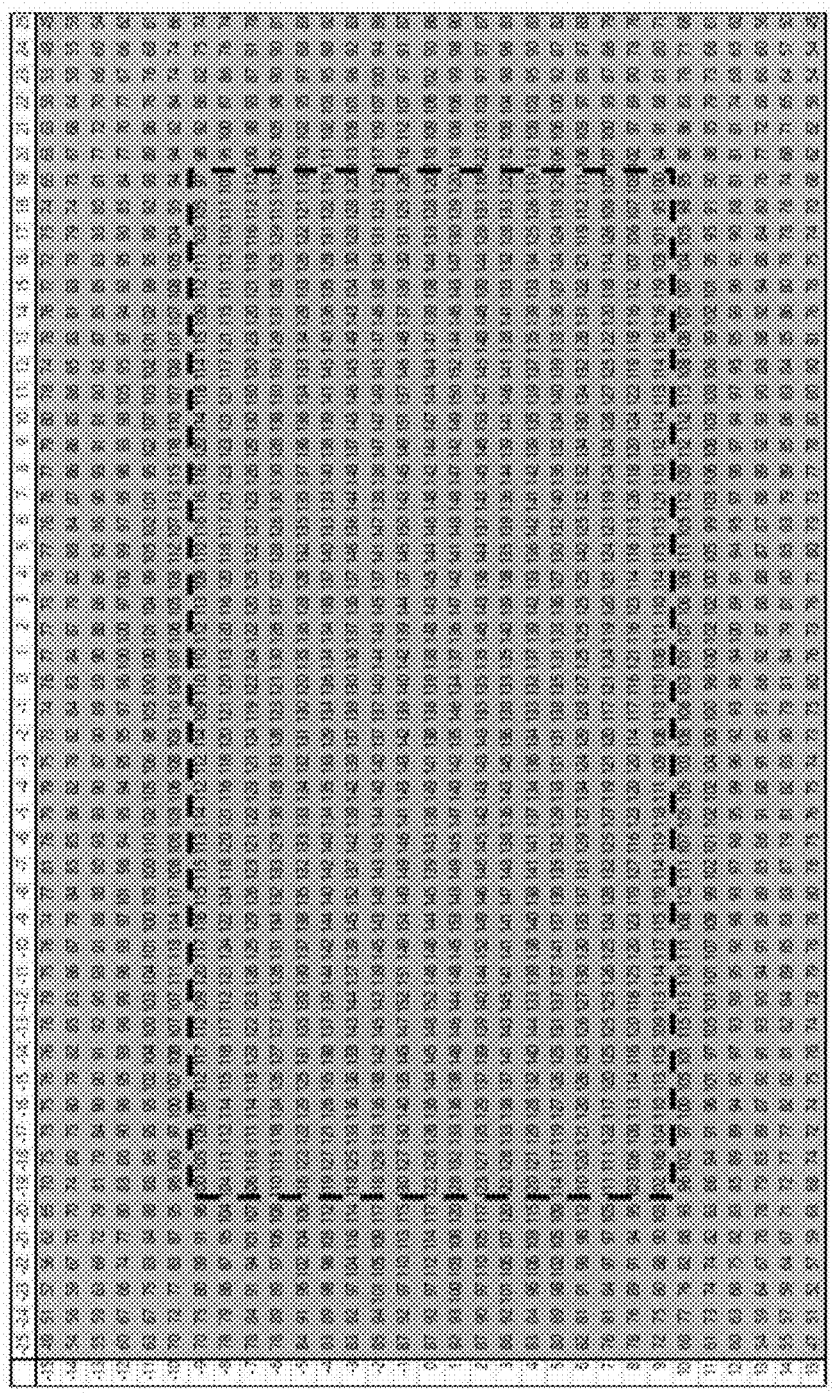
FIG. 37 shows the figure of merit of a wireless power transmitter including the primary coil of FIG. 36.

FIG. 37 shows the figure of merit of a wireless power transmitter including the primary coil of FIG. 36. FIG. 37 shows the figure of merit $Q_k$ measured at a total of 1500 points using the method for measuring figure of merit described with reference to FIG. 29.

Referring to FIG. 37, the figure of merit $Q_k$ was measured to be 45 or higher at every movement point, and the figure of merit $Q_k$ was measured to be equal to or greater than 95 in the area the same as the rectangular area of FIG. 30 indicated by a dotted line.

Figure 38:
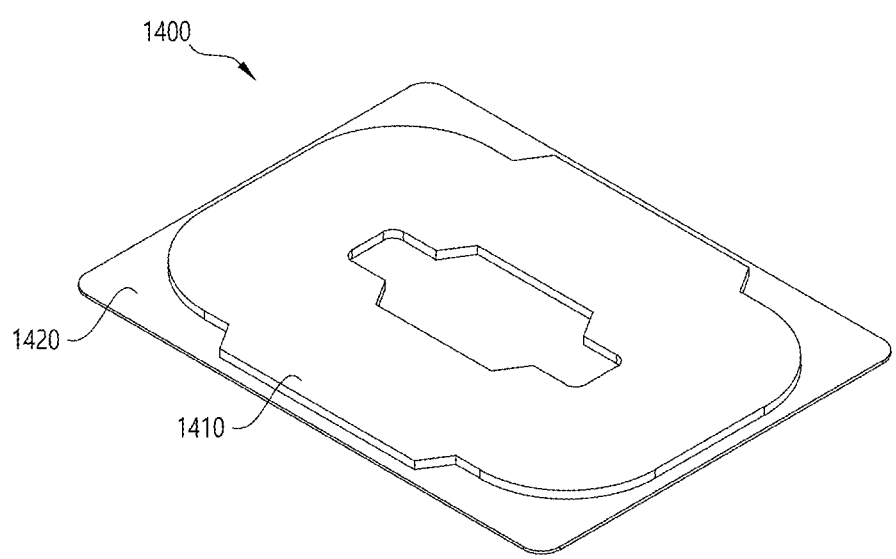
FIG. 38 is a perspective view of a primary coil and a shielding member of a conventional wireless power transmitter.

FIG. 38 is a perspective view of a primary coil and a shielding member of a conventional wireless power transmitter.

Referring to FIG. 38, the conventional wireless power transmitter 1400 according to the present embodiment comprises a primary coil 1410 and a shielding member 1420.

The outer length of major axis of the primary coil 1410 is 80 mm, the outer length of minor axis is 62 mm, the inner length of major axis is 37 mm, the inner length of minor axis is 17 mm, and thickness is 3 mm. The thickness of the shielding member 1420 is 0.3 mm.

The measured inductance of the wireless power transmitter 1400 was 10.6 pH, and the quality factor Q at 100 kHz was 50. The inductance of the simulation model based on the physical parameters of the wireless power transmitter 1400 was 10.7 pH, and the quality factor Q at 100 kHz was 51.8.

Figure 39:
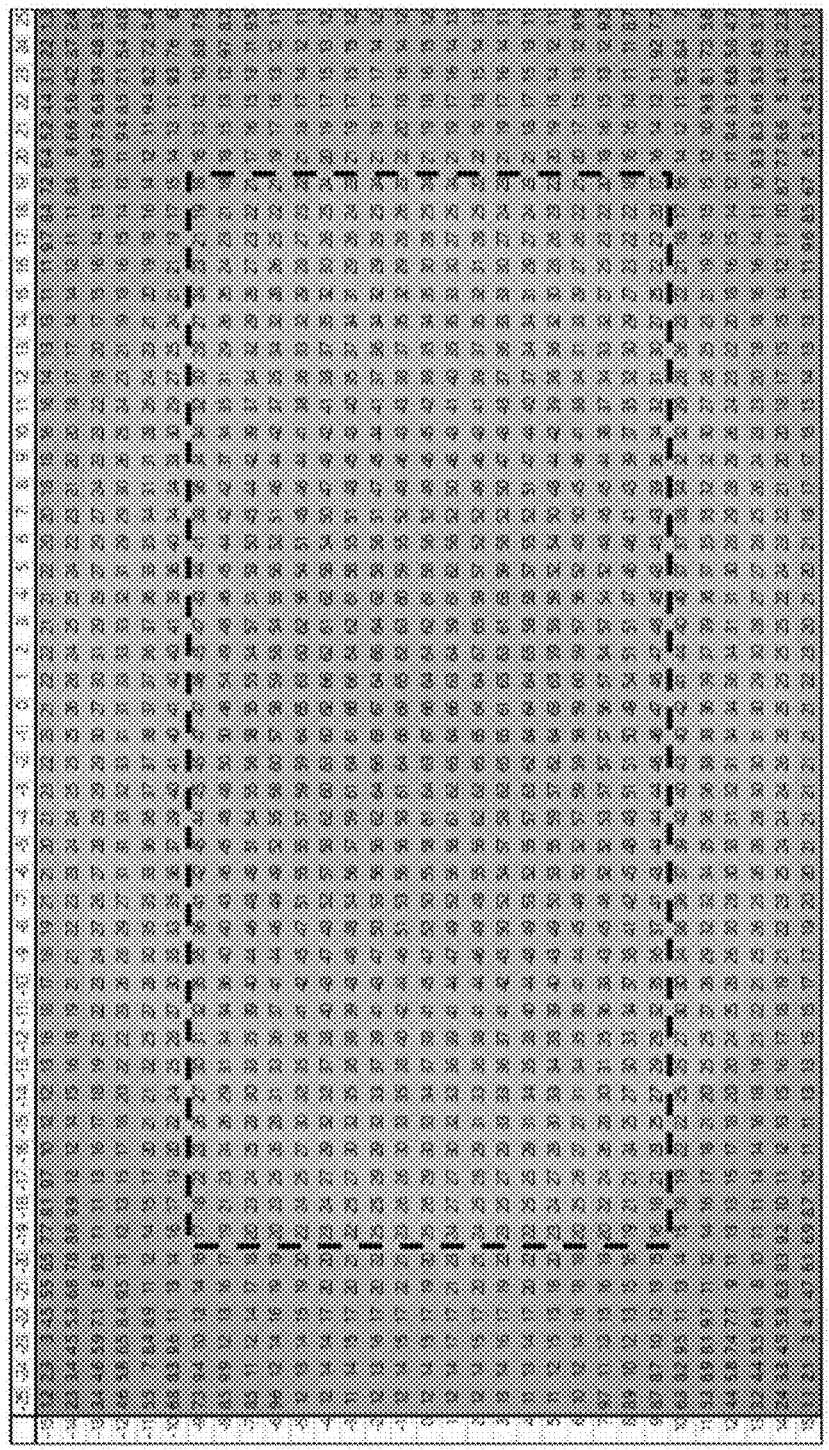
FIG. 39 illustrates the figure of merit of a conventional wireless power transmitter.

FIG. 39 illustrates the figure of merit of a conventional wireless power transmitter. FIG. 39 shows the figure of merit $Q_k$ measured at a total of 1500 points using the method for measuring figure of merit described with reference to FIG. 29.

Referring to FIG. 39, the figure of merit $Q_k$ of the conventional wireless power transmitter 1400 was measured to be 70 or lower at every movement point, and the figure of merit $Q_k$ was measured to range approximately from 16 to 70 in the area the same as the rectangular area of FIG. 30 indicated by a dotted line.

Figure 40:
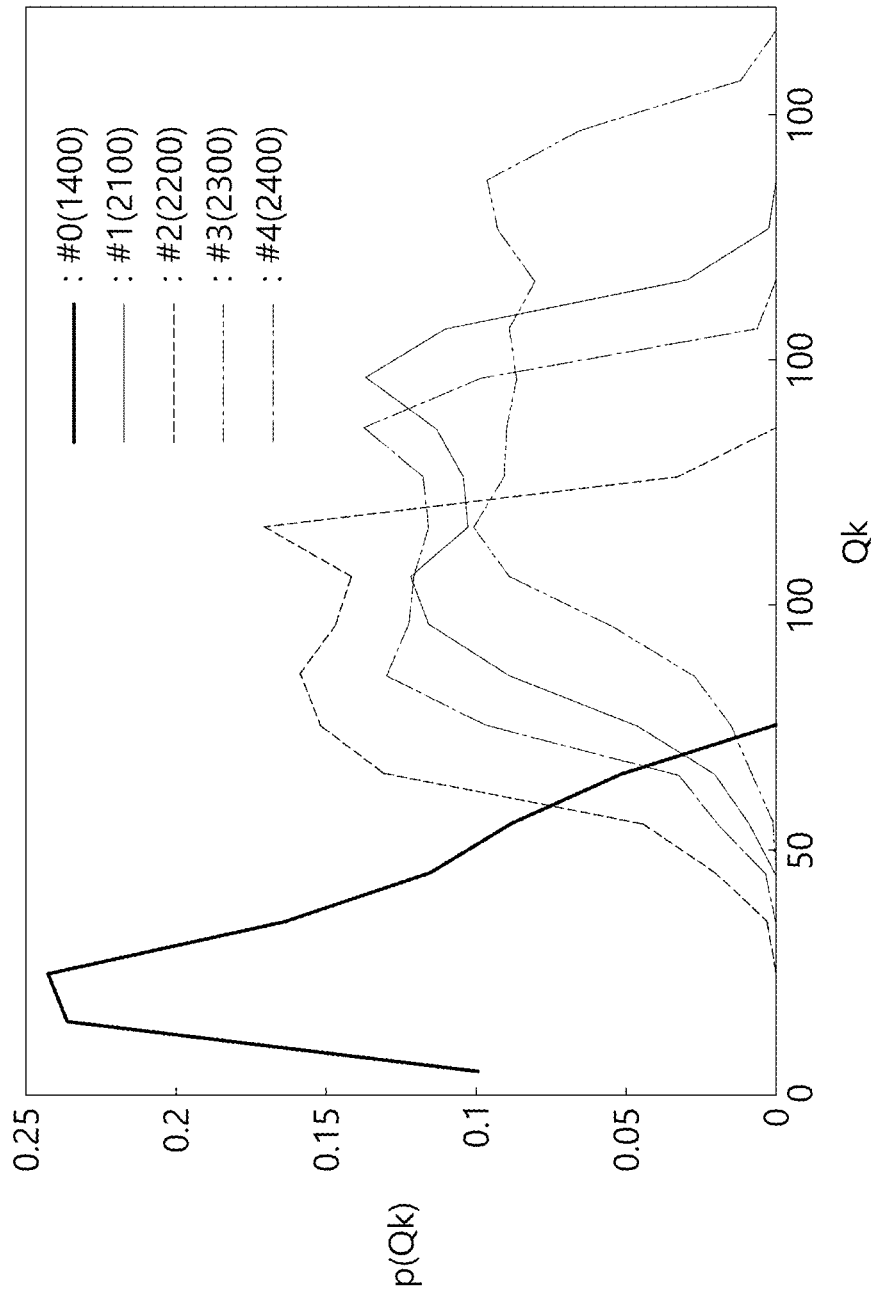
FIG. 40 shows the probability density distribution of figure of merit for each wireless power transmitter shown in FIGS. 30, 32, 35, 37, and 39.

FIG. 40 shows the probability density distribution of figure of merit for each wireless power transmitter shown in FIGS. 30, 32, 35, 37, and 39.

In FIG. 40, the graph indicated by #0 depicts the figure of merit of the conventional wireless power transmitter 1400; the graph indicated by #1 depicts the figure of merit of the primary coil 2110 described with reference to FIGS. 26 and 27; the graph indicated by #2 depicts the figure of merit of the primary coil 2210 described with reference to FIG. 31; the graph indicated by #3 depicts the figure of merit of the primary coil 2310 described with reference to FIGS. 33 and 34; and the graph indicated by #4 depicts the figure of merit of the primary coil 2410 described with reference to FIG. 36.

Referring to FIG. 40, it may be confirmed that all the primary coils 2110, 2210, 2310, 2410 according to the embodiments of the present disclosure have a significantly higher figure of merit $Q_k$ than the conventional wireless power transmitter 1400.

The primary coils 2110, 2210, 2310, 2410 according to the embodiments of the present disclosure occupy approximately the same area as the primary coil 1410 of the conventional wireless power transmitter 1400 (the outer lengths of the major and minor axes are similar).

However, while the primary coil 1410 of the conventional wireless power transmitter 1400 is formed to have a thickness of 3 mm, the primary coils 2110, 2210, the subcoils of which constitute a single layer, have a thickness of 0.75 mm or less, and the primary coils 2310, 2410, the subcoils of which constitute two layers, have a thickness of 1.5 mm or less.

In other words, a wireless power transmitter employing the primary coils 2110, 2210, 2310, 2410 according to the embodiments of the present disclosure may be designed in a slim structure while providing a significantly high figure of merit $Q_k$ at the same time.

Since the wireless power transmitting method and apparatus or the wireless power receiver and method according to an embodiment of the present disclosure do not necessarily include all the elements or operations, the wireless power transmitter and method and the wireless power transmitter and method may be performed with the above-mentioned components or some or all of the operations. Also, embodiments of the above-described wireless power transmitter and method, or receiving apparatus and method may be performed in combination with each other. Also, each element or operation described above is necessarily performed in the order as described, and an operation described later may be performed prior to an operation described earlier.

The description above is merely illustrating the technical spirit of the present disclosure, and various changes and modifications may be made by those skilled in the art without departing from the essential characteristics of the present disclosure. Therefore, the embodiments of the present disclosure described above may be implemented separately or in combination with each other.

Therefore, the embodiments disclosed in the present disclosure are intended to illustrate rather than limit the scope of the present disclosure, and the scope of the technical spirit of the present disclosure is not limited by these embodiments. The scope of the present disclosure should be construed by claims below, and all technical spirits within a range equivalent to claims should be construed as being included in the right scope of the present disclosure.

What is claimed is:

1. A wireless power transmitter transmitting wireless power to a wireless power receiver, the wireless power transmitter comprising:

a primary coil forming magnetic coupling with a secondary coil provided in the wireless power receiver and transmitting wireless power to the wireless power receiver, wherein the primary coil is formed by spirally winding a plurality of subcoils connected electrically in parallel while keeping the subcoils in contact with each other, wherein the subcoil is litz wire consisting of several conducting wires packed in a bundle, and wherein the primary coil is formed by spirally winding the plurality of subcoils on a single plane.

2. The wireless power transmitter of claim 1, wherein the subcoil is made up of 100 strands of conducting wires having a diameter of 0.05 mm.

3. The wireless power transmitter of claim 2, wherein the primary coil is formed by spirally winding three subcoils electrically connected.

4. The wireless power transmitter of claim 3, wherein the number of turns of the primary coil is 10, and
self-inductance of the primary coil ranges from 10 to 12 µH.

5. The wireless power transmitter of claim 2, wherein the primary coil is made up of two layers in which six subcoils connected electrically in parallel are wound spirally in parallel with each other while being kept in contact with each other.

6. The wireless power transmitter of claim 5, wherein the number of turns of the primary coil in each layer is 5, and
self-inductance of the primary coil ranges from 10 to 12 µH.

7. The wireless power transmitter of claim 2, wherein outer length of major axis of the primary coils is within 80 mm, and
outer length of minor axis of the primary coil is within 60 mm.

8. The wireless power transmitter of claim 7, wherein inner length of major axis of the primary coils is within 41 mm, and
inner length of minor axis of the primary coil is within 21 mm.

9. The wireless power transmitter of claim 1, wherein the subcoil consists of 65 strands of conducting wires having a diameter of 0.05 mm.

10. The wireless power transmitter of claim 9, wherein the primary coil is formed by spirally winding four subcoils electrically connected.

11. The wireless power transmitter of claim 10, wherein the number of turns of the primary coil is 10, and
self-inductance of the primary coil ranges from 10 to 12 µH.

12. The wireless power transmitter of claim 9, wherein the primary coil is made up of two layers in which eight subcoils connected electrically in parallel are wound spirally in parallel with each other while being kept in contact with each other.

13. The wireless power transmitter of claim 12, wherein the number of turns of the primary coil is 5, and
self-inductance of the primary coil ranges from 10 to 12 µH.

14. The wireless power transmitter of claim 7, wherein outer length of major axis of the primary coils is within 80 mm, and
outer length of minor axis of the primary coil is within 60 mm.

15. The wireless power transmitter of claim 14, wherein inner length of major axis of the primary coils is within 41.6 mm, and
inner length of minor axis of the primary coil is within 21.6 mm.

* * * * *